US005583531A

United States Patent [19]

Okada et al.

[11] Patent Number: 5,583,531
[45] Date of Patent: Dec. 10, 1996

[54] METHOD OF DRIVING A DISPLAY APPARATUS

[75] Inventors: Hisao Okada, Ikoma-gun; Takeshi Takarada, Tenri; Tadatsugu Nisitani, Kuze-gun; Toshihiro Yanagi, Nara; Hirofumi Fukuoka, Sakai; Yoshiharu Kanatani; Kuniaki Tanaka, both of Nara, all of Japan

[73] Assignee: Sharp Kabushiki Kaisha, Osaka, Japan

[21] Appl. No.: 295,038

[22] Filed: Aug. 25, 1994

Related U.S. Application Data

[63] Continuation of Ser. No. 886,008, May 20, 1992, abandoned.

[30] Foreign Application Priority Data

| | | | |
|---|---|---|---|
| May 21, 1991 | [JP] | Japan | 3-116283 |
| Jun. 28, 1991 | [JP] | Japan | 3-185348 |
| Apr. 2, 1992 | [JP] | Japan | 4-81176 |
| Apr. 3, 1992 | [JP] | Japan | 4-82437 |
| May 11, 1992 | [JP] | Japan | 4-117778 |

[51] Int. Cl.$^6$ .................... G02F 1/133
[52] U.S. Cl. .................... 345/89; 345/92; 345/148
[58] Field of Search .................... 340/784, 805, 340/793; 345/87, 88, 89, 90, 91, 92, 93, 94, 95, 98, 100, 101, 147, 148, 149, 208

[56] References Cited

U.S. PATENT DOCUMENTS

| | | | |
|---|---|---|---|
| 3,955,187 | 5/1976 | Bigelow | 340/784 |
| 4,297,004 | 10/1981 | Nishimura . | |

(List continued on next page.)

FOREIGN PATENT DOCUMENTS

| | | |
|---|---|---|
| 0221307 | 5/1967 | European Pat. Off. . |
| 0071911 | 2/1983 | European Pat. Off. . |
| 0387550 | 9/1990 | European Pat. Off. . |
| 0391655 | 10/1990 | European Pat. Off. . |
| 0478371 | 4/1992 | European Pat. Off. . |
| 0478386 | 4/1992 | European Pat. Off. . |
| 0484159 | 5/1992 | European Pat. Off. . |
| 0488516 | 6/1992 | European Pat. Off. . |
| 60-257683 | 12/1985 | Japan . |
| 63-118128 | 5/1988 | Japan . |

(List continued on next page.)

OTHER PUBLICATIONS

*IBM Technical Disclosure Bulletin,* vol. 33, No. 6B, Nov, 1990, "Driving Method for TFT/LCD Grayscale," pp. 384 & 385.
"Liquid Crystal Matrix Displays," B. Lechner et al, *Proceedings of the IEEE,* vol. 59, No. 11, Nov. 1971, pp. 1566–1579.
"Basics of Pulse Circuit," K. Shimizu et al, *Tips for Understanding a Pulse Circuit,* Mar. 20, 1979, pp. 6–9.
"Birth of Analog Filter Circuit," *Transistor Technology,* Toro Waza Original No. 9, May 1, 1992, p. 13, FIG. 12.
Okada et al, "TFT–LCDs Using Newly Designed 6-bit Digital Data Drivers", SID 93 Digest, pp. 11–14, 1993.
Okada et al, "An 8-bit Digital Data Driver For AMLCDs", SID 94 Digest, pp. 347–350, 1994.
Everitt, W. L., "Communication Engineering", McGraw-Hill, 2nd Ed. New York, 1937, pp. 241–247.
Okada, "A Large, Full-Color TFT-LCD System for Multi-Media Applications", ITE7 Technical Report, vol. 16, No. 11, pp. 67–72 (Jan, 1992).
G. H. Henck Van Leeuven et al, "A Digital Column Driver 1C For AMLCDs", pp. 453–456 (AMLCD–P1 1993).

*Primary Examiner*—Richard Hjerpe
*Assistant Examiner*—Kara Farnandez Stoll
*Attorney, Agent, or Firm*—Nixon & Vanderhye

[57] ABSTRACT

A method of driving a display apparatus includes the steps of receiving output requests at a interval and outputting an oscillating voltage to a source line connected to display section, the oscillating voltage including a component which oscillates during one output period of time defined by the output requests.

34 Claims, 40 Drawing Sheets

U.S. PATENT DOCUMENTS

| | | | |
|---|---|---|---|
| 4,348,666 | 9/1982 | Ogita | 340/793 |
| 4,427,978 | 1/1984 | Williams | 345/89 |
| 4,570,115 | 2/1986 | Misawa . | |
| 4,745,403 | 5/1988 | Tamura | 340/805 |
| 4,752,774 | 6/1988 | Clerc et al. | 340/784 |
| 4,775,549 | 10/1988 | Ota et al. . | |
| 4,824,211 | 4/1989 | Murata | 340/805 |
| 4,834,510 | 5/1989 | Fujita | 340/805 |
| 4,870,398 | 9/1989 | Bos . | |
| 4,872,059 | 10/1989 | Shinabe | 345/89 |
| 4,908,613 | 3/1990 | Green | 340/793 |
| 4,998,099 | 3/1991 | Ishii | 340/805 |
| 5,010,327 | 4/1991 | Wakita et al. | 340/784 |
| 5,066,945 | 11/1991 | Kanno et al. | 340/805 |
| 5,115,232 | 5/1992 | Lizuka . | |
| 5,162,786 | 11/1992 | Fukuda | 345/208 |
| 5,196,738 | 3/1993 | Takahara et al. . | |
| 5,214,417 | 5/1993 | Yamazaki . | |
| 5,266,936 | 11/1993 | Saitoh . | |
| 5,287,095 | 2/1994 | Kitazima et al. . | |
| 5,402,142 | 3/1995 | Okada et al. . | |
| 5,440,323 | 3/1995 | Okada . | |

FOREIGN PATENT DOCUMENTS

| | | |
|---|---|---|
| 1-262590 | 10/1989 | Japan . |
| 2-264294 | 10/1990 | Japan . |
| 2-281291 | 11/1990 | Japan . |
| 3-89392 | 4/1991 | Japan . |
| 3-89393 | 4/1991 | Japan . |
| 3-177890 | 8/1991 | Japan . |
| 4-69169 | 4/1992 | Japan . |
| 4-230789 | 8/1992 | Japan . |
| 7-7248 | 1/1995 | Japan . |

FREQUENCY CHARACTERISTIC

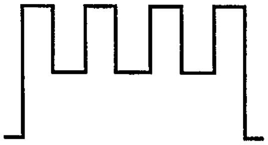
FIG. 58A
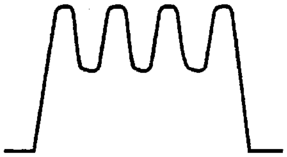
FIG. 58B
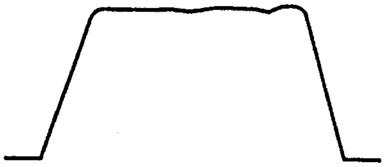
FIG. 58C
FIG. 59A
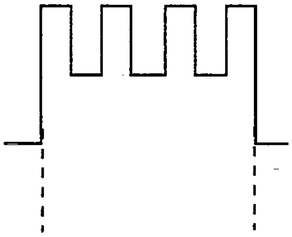
FIG. 59B
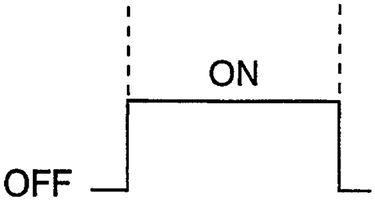

PROR ART

METHOD OF DRIVING A DISPLAY APPARATUS

This is a continuation of application Ser. No. 07/886,008, filed May 20, 1992, now abandoned.

BACKGROUND OF THE INVENTION

1. Field of the Invention

The present invention relates to a drive circuit and a drive method for use in a plane display apparatus, particularly of the type that indicates gray-scale in accordance with digital video data.

2. Description of the Prior Art

When a liquid crystal display apparatus (hereinafter referred to as "LCD apparatus") is driven, the speed of response of the liquid crystal is slower than a luminescent material used in a CRT (cathode ray tube) display apparatus. To compensate for the slow response speed, special drive circuits are often used. One such liquid crystal drive circuit does not supply video data in succession to pixels but holds the data as signal voltages for a period of time after the data has been sampled up to the horizontal period of time (the horizontal period of time is the time that is required for a video signal to be sampled for all pixels on a horizontal scanning line). The video signal voltages are then output to all of the pixels on one scanning line at the same time, which may be at the initial moment of the horizontal period of time or at an appropriate point of time within the horizontal period of time. The video signal voltages delivered to the corresponding pixels are held for a period of time exceeding the response speed of the liquid crystal, thereby allowing the liquid crystal fully to assume the desired orientation.

One known drive circuit uses capacitors to hold video signal voltage. FIG. 47 shows a signal voltage output circuit (a source driver) for supplying drive voltages $V_S$ to N pixels on a selected scanning line. The signal voltage output circuit for each pixel is composed of a first analog switch $SW_1$, a sampling capacitor $C_{SMP}$, a second analog switch $SW_2$, a holding capacitor $C_H$, and an output-buffer amplifier A. This known signal output circuit will be described below with reference to the circuit diagram of FIGS. 47 and 48 and to the timing chart of FIG. 49.

An analog video data $V_S$ input to the first analog switch $SW_1$ is sequentially sampled by the switch in accordance with a corresponding sampling clock signal $T_{SMP1}$ to $T_{SMPN}$ which correspond to the N pixels on one scanning line selected by a horizontal synchronizing signal $H_{syn}$. By this sampling, the sequential instantaneous voltages $V_{SMP1}$ to voltages $V_{SMPN}$ of the video data signal $V_s$ are applied to the corresponding sampling capacitors $C_{SMP}$. For example, the nth sampling capacitor $C_{SMP}$ will be charged to the voltage $V_{SMPn}$ of the video signal $V_S$ when the analog switch $SW_1$ corresponding to the nth pixel, receives a signal $T_{SMPN}$ an$_d$ will hold-this value. The signal voltages $V_{SMP1}$ to $V_{SMPN}$ which are sequentially sampled and held in one horizontal period of time are transferred from the sampling capacitors $C_{SMP}$ to the holding capacitors $C_H$, when an output pulse OE is supplied to all of the analog switches $SW_2$ at the same time. Then the signal voltages $V_{SMP1}$ to $V_{SMPN}$ are output to source lines $O_1$ to $O_N$ connected to the respective pixels through the buffer amplifiers A.

The drive circuit described above, which is supplied with analog video data, suffers from the following problems when the size and resolution of the liquid crystal panel are increased:

(1) When the charges in the sampling capacitors $C_{SMP}$ are transferred to the holding capacitors $C_H$, the relationship between the voltage $V_H$ of the holding capacitor $C_H$ and the sampled voltage $V_{SMP}$ is represented ed by the following equation:

$$V_H = \frac{1}{1 + \frac{C_H}{C_{SMP}}} \cdot V_{SMP}$$

Accordingly, in order to ensure that voltage $V_H$ held by the holding capacitor $C_H$ becomes equal to the sampled voltage $V_{SMP}$, a condition of $C_{SMP} \gg C_H$ must be satisfied, i.e., the capacitance of the capacitor $C_{SMP}$ must be much greater than the capacitance of capacitor $C_H$. To this end, it is necessary to use a sampling capacitor $C_{SMP}$ of a relatively large capacitance. However, if the capacitance of the sampling capacitor $C_{SMP}$ is too large, the period of time required for charging (i.e. a sampling period of time) is prolonged. However, as the size of the LCD apparatus becomes larger or the resolution is improved, the number of pixels corresponding to one horizontal period of time increases, thereby necessitating the shortening of the sampling time. Consequently, there is a limit to the increase in size or the improvement in resolution of the LCD apparatus.

(2) Analog video data are supplied to the source driver via bus lines. As the size and resolution of a display apparatus are increased, the frequency band of the video signal becomes wider and the distribution capacity of the bus lines increases. This requires a wideband amplifier in the circuit for supplying video data, thereby increasing the cost of production.

(3) A color display apparatus using RGB video data has bus lines for supplying multiple analog color video data. As the size and resolution of the display panel of such an apparatus are increased, the wideband amplifiers must have an extremely high signal quality so that no phase difference occurs from data to data and no dispersion occurs in the amplitude and frequency characteristics.

(4) In the drive circuit for a matrix type display apparatus, unlike the display in a CRT, analog video data is sampled in accordance with a clock signal and displayed in pixels arranged in a matrix. At this time, since the bus lines unavoidably cause delays of clock signals in the drive circuit, it is difficult to locate the sampling position exactly for the analog video data. Particularly, when a computer graphic image is displayed in which the video data and pixel addresses must exactly correspond to each other, any displacement in the image display position, blurring of the image, or any other faults caused by the signal delay in the drive system and deterioration of the frequency characteristics are fatal problems.

These problems which occur when using analog video data can be solved by digitizing the video signals. To supply digital data, the drive circuit shown in FIGS. 50 and 51 can be used. For simplicity, two bits ($D_1$, $D_0$) of data are illustrated. The video data thus has one of four values 0 to 3, and a signal voltage applied to each pixel is one of the four levels $V_0$ to $V_3$. FIG. 50 shows a digital source driver circuit equivalent to the analog source driver circuit shown in FIG. 47. The circuit diagram of FIG. 50 shows the entire source driver for supplying a driving voltage to N pixels. FIG. 51 shows a portion of the circuit for the nth pixel. This portion of the circuit comprises a D-type flip-flop (sampling flip-flop) $M_{SMP}$ at a first stage and a flip-flop (holding flip-flop) $M_H$ at a second stage which are provided with the respective bits ($D_1$, $D_0$) of the video data, a decoder DEC, and analog switches $ASW_0$ to $ASW_3$ corresponding to four external voltage sources $V_0$ to $V_3$ and a source lane $0_n$. For the sampling of digital video data, various circuit components other than a D-type flip-flop can be used.

The digital source driver operates as follows:

The sampling flip-flop $M_{SMP}$ samples the video data ($D_1$, $D_0$) at the rising edge of a sampling pulse $T_{SMPn}$ corresponding to the nth pixel. When the sampling for one horizontal period of time is completed, an output pulse OE is fed to the holding flip-flop $M_H$. All the video data ($D_1$, $D_0$) held in the holding flip-flops $M_H$ are then simultaneously output to the respective decoders DEC. Each of the decoders DEC decodes the 2-bit video data ($D_1$, $D_0$). In accordance with the values 0 to 3, one of the analog switches $ASW_0$ to $ASW_3$ closes, and the corresponding one of the four external voltages $V_0$ to $V_3$ is output to the source line $O_n$.

The source driver using video data for sampling has solved problems 1 to 4 occurring in the use of analog video data for sampling, but nevertheless the following other problems arise:

(1) With an increase in the number of bits of video data, the size of the memory cells, decoders, etc. constituting a drive circuit becomes large.

(2) When voltage sources $V_0$ to $V_3$ supplied from outside in FIGS. 50 and 51 are selected by analog switches, the selected voltage source is directly connected to a source line of the liquid crystal panel and drives it. Accordingly, the circuit must drive a large load like the liquid crystal panel. However, it is difficult to obtain such a high power within the LSI which must be supplied with power from outside. This increases the production cost. As the number of bits increases, the number of the voltage sources increases by $2^n$. As a result, an increase in the number of bits raises production cost. For example, when four-bit data ($D_0$ to $D_3$) is used and a 16 gray-scale is indicated, the source driver is constructed as shown in FIG. 52 which requires a signal voltage ($V_0$ to $V_{15}$) with $2^4$ (i.e. 16) levels. This requires sixteen voltage sources.

(3) In proportion to the increase in the number of voltage sources by $\mathbf{2}^2$, the number of input terminals constituting the driver circuit increases. For example, if the data is extended from 5-bits to 6-bits, the number of voltage sources (the number of input terminals) will increase from $2^5$ (32) up to $2^6$ (64). This makes it difficult to fabricate LSIs. In addition, the mounting and production of such LSIs become difficult. As a result, mass production becomes difficult. As the video data is composed of a greater number of bits, the number of analog switches increases by $2^2$. In addition, an ON resister is required to be inserted between the voltage source and the source line. It is desirable to minimize the resistance of the ON resister but there is a limit to the reduction of the size. As a result, the size of The chip cannot be reduced beyond a certain extent. As the number of components is increased, the power compsumption of the circuit correspondingly increases.

SUMMARY OF THE INVENTION

The method of driving a display apparatus of this invention comprises the steps of receiving an output request at a predetermined interval and outputting an oscillating voltage to the source line, said oscillating voltage including an component which oscillates during one output period of time, which is a period of time from receiving one of said output request to receiving next one of said output request.

In another aspect of this invention, the drive circuit for display apparatus comprises receiving means for receiving an output request at a predetermined interval and outputting means for outputting an oscillating voltage to the source line, said oscillating voltage including an component which oscillates during said one output period of time.

In still another aspect of this invention, the display apparatus comprises receiving means for receiving an output request at a predetermined interval, outputting means for outputting an oscillating voltage to the source line, said oscillating voltage including an component which oscillates during said one output period of time, and reducing means for reducing an amplitude of said component of said oscillating voltage, thereby said oscillating voltage of which said amplitude of said component is reduced by said reducing means is applied to the pixel.

Thus, the invention described herein makes possible the objectives of (1) providing a drive circuit capable of low cost production, (2) providing a drive circuit suitable for a display apparatus which has numerous pixels and numerous gray-scale levels, (3) providing a drive circuit with low power consumption.

BRIEF DESCRIPTION OF THE DRAWINGS

This invention may be better understood and its numerous objects and advantages will become apparent to those skilled in the art by reference to the accompanying drawings as follows:

FIGS. 58A, 58B and 58C show a process of the low-pass filter reducing the oscillating voltage.

FIGS. 59A and 59B show a relationship between the oscillating voltage and the gate signal.

DESCRIPTION OF THE PREFERRED EMBODIMENTS

Example 1

Figure 1:
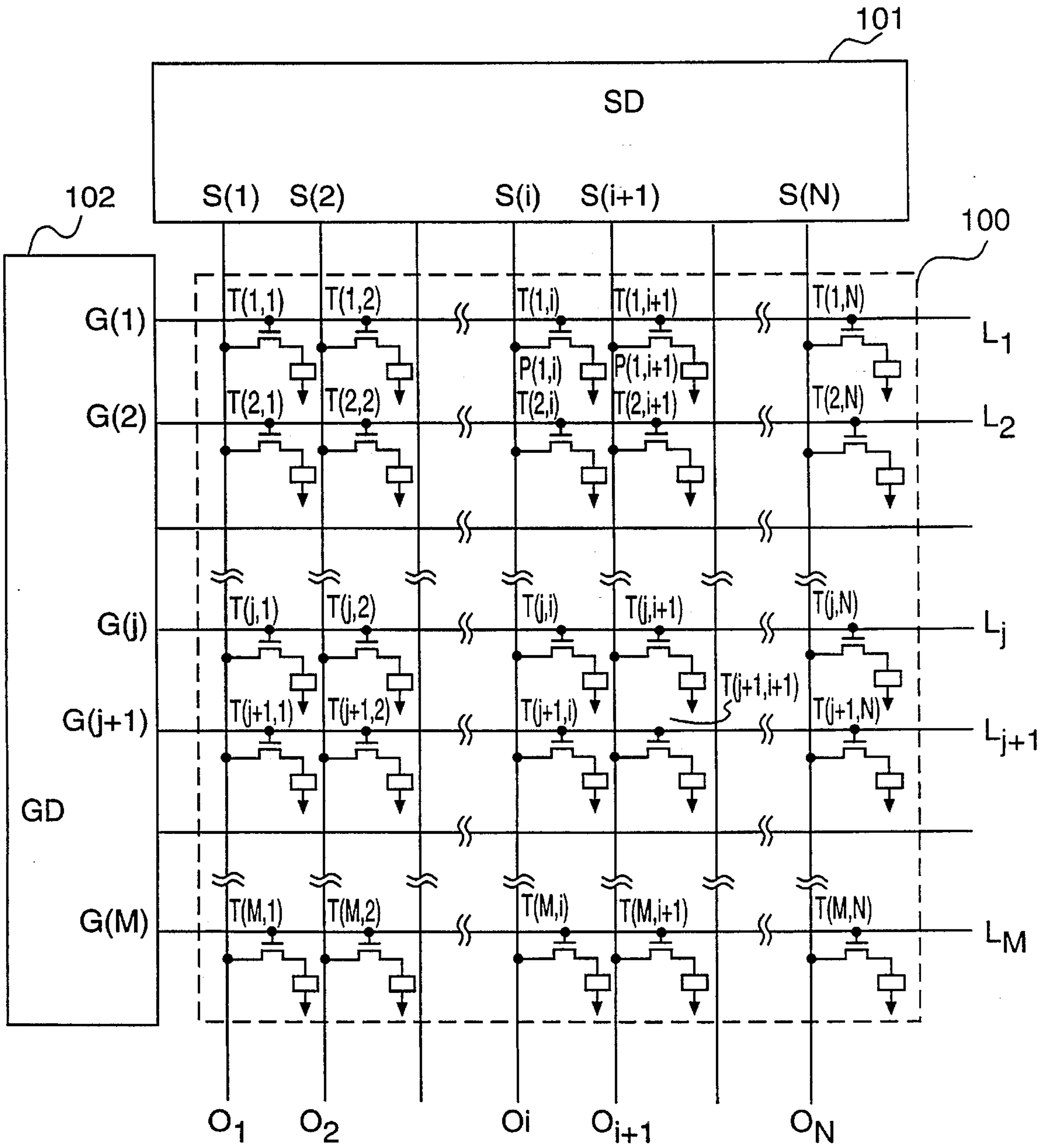
FIG. 1 is a schematic diagram showing a configuration of a display apparatus.

In FIG. 1, the exemplary display apparatus includes a display section 100 with (M×N) pixels P (J=1, 2, . . . M; i=1, 2, . . . N) each connected to a corresponding switching element T (j=1, 2, . . . M, i=1, 2, . . . N) such as thin film transistors (TFTs), a source driver 101 and a gate driver 102 both for driving the display section 100. N source lines Oi (i=1, 2, . . . N) connect the output terminals S(i) (i=1, 2, . . . N) of the source driver 101 to the switching elements T (j, i). Gate lines $L_j$ (J=1, 2, . . . M) connect the output terminals G(j) (j=1, 2, . . . M) of the gate driver 102 to the switching elements T (j, i).

A voltage of a high level is successively output to the gate lines Lj through the output terminals G(J) of the gate driver 102 in predetermined cycles over a period of time. Hereinafter, this period of time will be referred to as "one horizontal period of time j H" (j=1, 2, . . . M). The total sum of all the horizontal periods of time jH constitutes one "vertical" period of time.

When the voltage applied to the gate line Lj from the output terminals G(j) has a high level, the switching element T(j,i) is turned on. When the respective switching element T(j,i) is on, the respective pixel P(j,i) is charged in accordance with the voltage applied to the source line Oi from the output terminals S(i) of the source driver 101. The voltage is maintained at a constant level and applied to the pixel throughout the vertical period of time.

Figure 2:
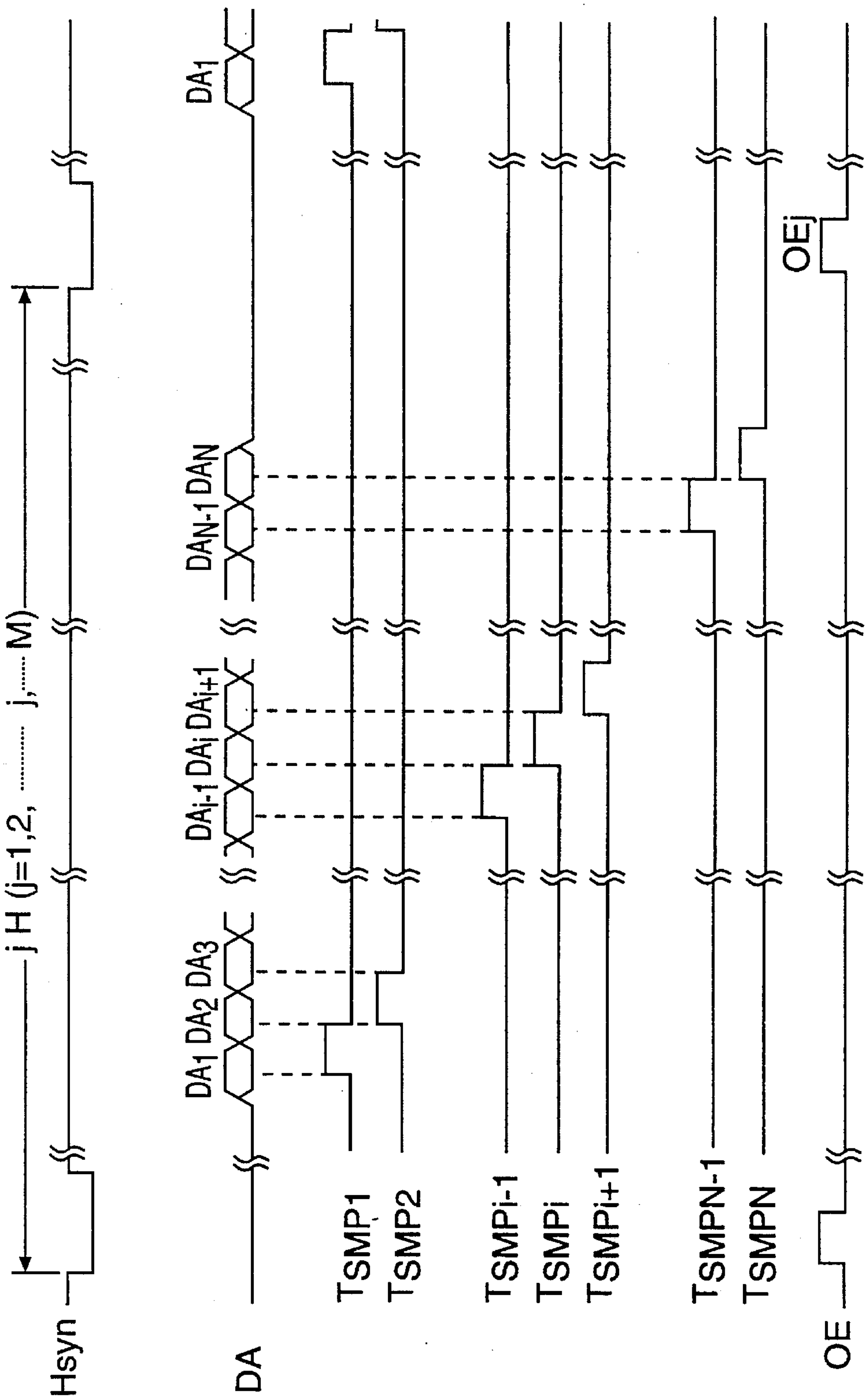
FIGS. 2, 3 and 4 are timing charts showing a relationship between input data, sampling pulses, output pulses, and output voltages.

FIG. 2 shows the relationship among digital video data DA for the jth horizontal period of time jH, a sampling pulse $T_{SMPi}$, and an output pulse signal OE. The sampling pulses $T_{SMP1}$, $T_{SMP2}$, . . . $T_{SMPi}$ . . . $T_{SMPN}$ are applied to the source driver 101, causing the digital video data $DA_1$, $DA_2$, . . . $DA_i$, . . . $DA_N$ to be latched and held by the source driver 101. When the source driver 101 receives the jth pulse signal OEj (j=1, 2, . . . M ) controlled by the output pulse signal OE, the output terminal S(i) outputs a voltage.

Figure 3:
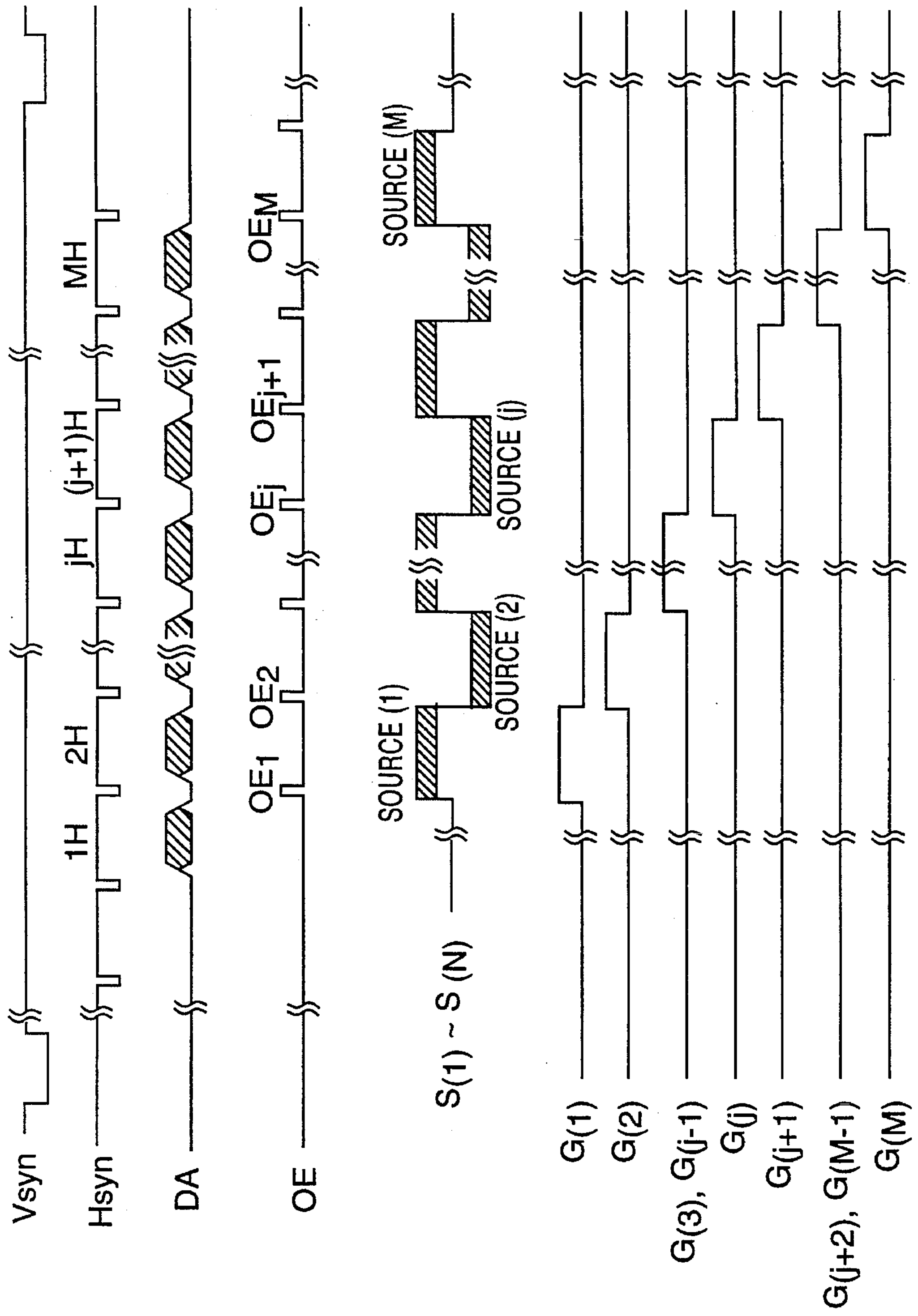

FIG. 3 shows the relationship among a horizontal synchronizing signal $H_{syn}$ for a vertical period of time controlled by a vertical synchronizing signal $V_{syn}$, digital video data DA, an output pulse signal OE, the output timing of the source driver, and the output timing of the gate driver. In FIG. 3, the source (j) are indicated by hatching, so as to totally show the levels of the voltages from N output terminals of the source driver 101 at the intervals shown in FIG. 2. While voltages represented by the source (j) are applied to the source lines Oj, the voltage through the jth output terminal G(j) has a high level, and all of the N switching elements T(J,i) (i=1, 2, . . . N) connected to the Jth gate line Lj become on. As a result, the pixels P(j,i) are charged in accordance with the voltages applied to the source lines Oj. The same procedure is repeated M times for the sources (j) being 1, 2, . . . M, and an image for one vertical period of time (in the case of non-interlace, this image covers the whole screen) is displayed.

Hereinafter, the period of time from the supply of the J th pulse signal to the supply of the next pulse signal OEj+i is called "one output period of time". One output period corresponds to each period of time indicated by the source (j) (j=1, 2, . . . M ) in FIG. 3.

Figure 4:
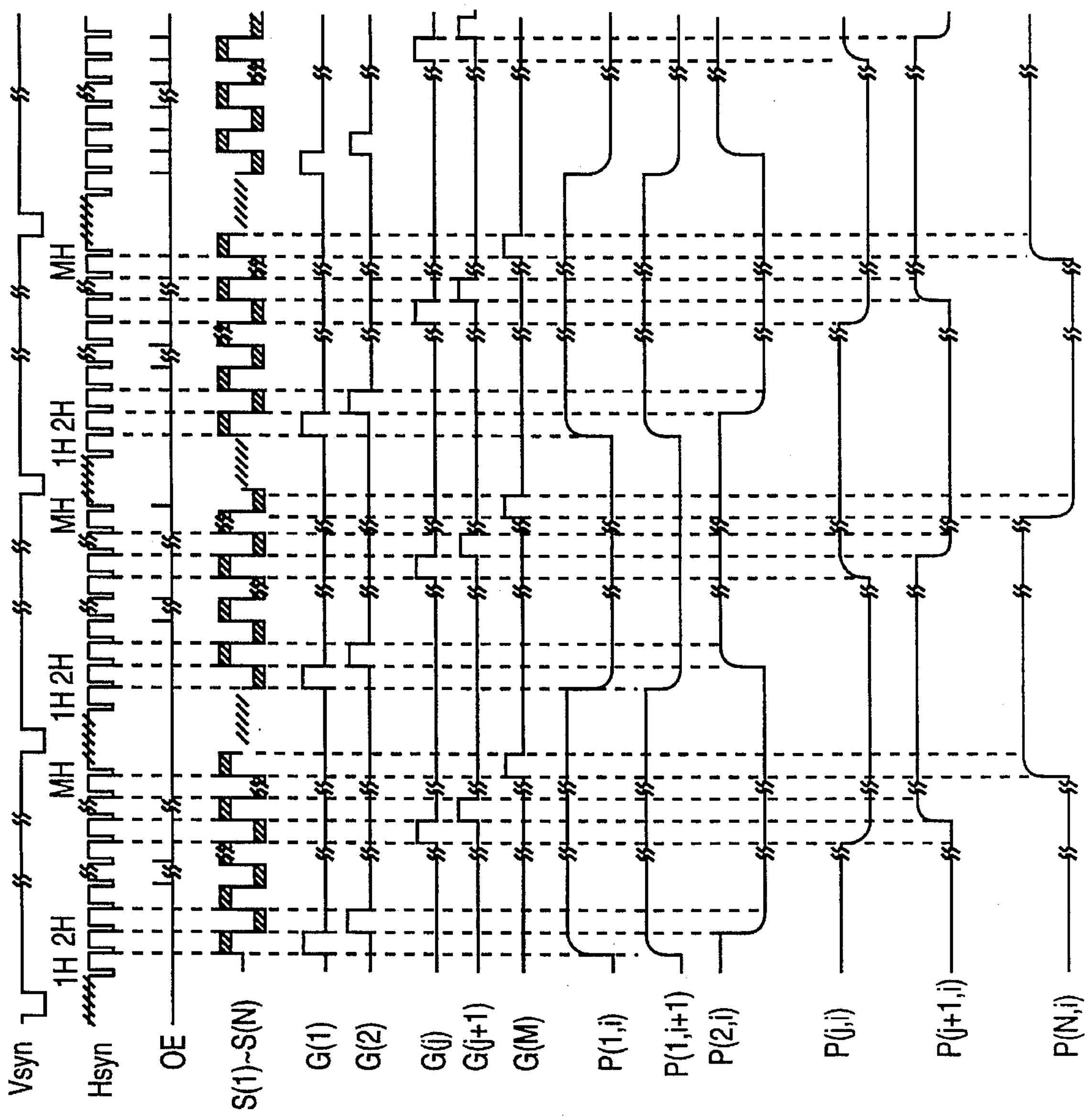

FIG. 4 shows the levels of voltages applied to the pixels P (j,i) (j=2, . . . M ).

Figure 5:
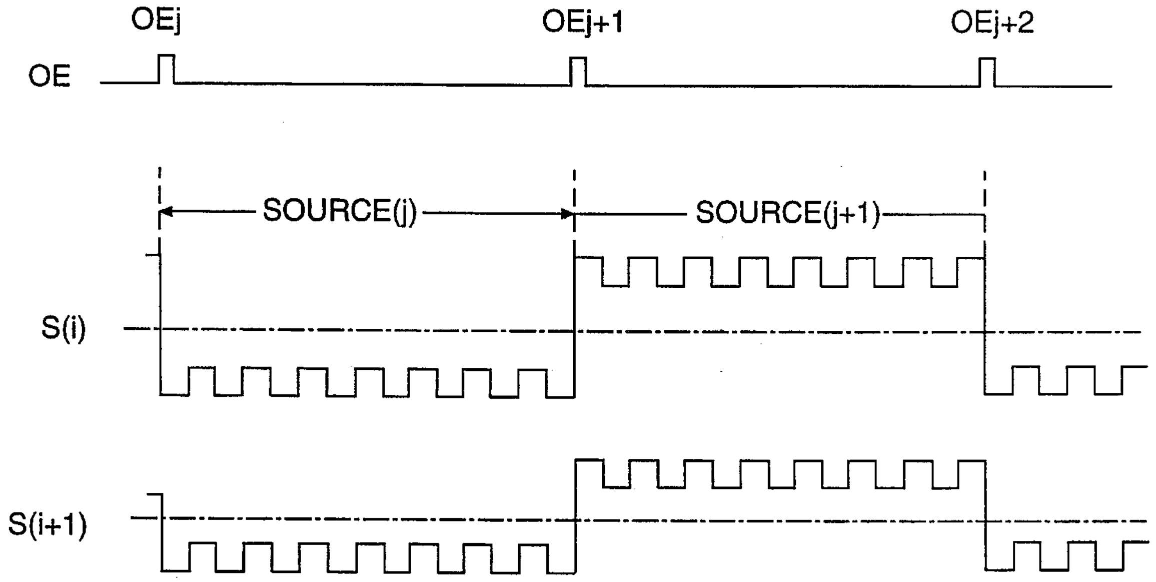
FIG. 5 shows a waveform of a voltage output from the source driver during one output period of time.
Figure 53:
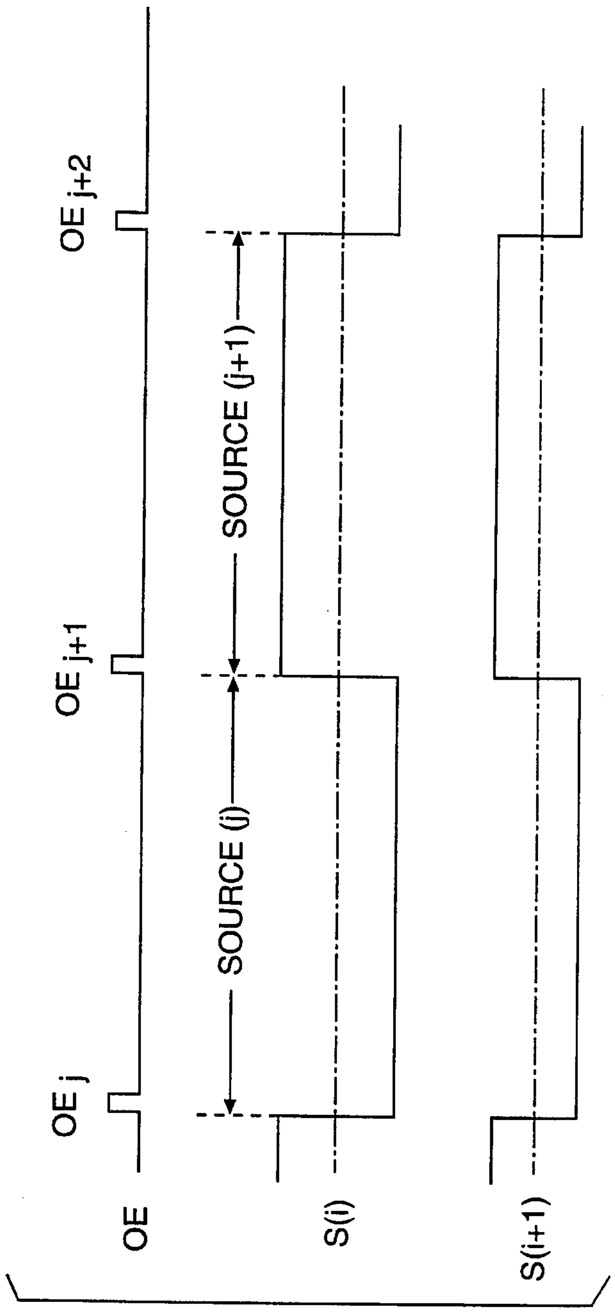
FIG. 53 PRIOR ART
FIG. 53 shows a waveform of a voltage output from a source driver during one output period of time in the prior art.

FIG. 5 shows a voltage signal waveform applied to the source line Oi for one output period of time. The voltage signals applied to the source line Oi are at a constant level for one output period of time under the conventional system (see, FIG. 53). According to the present invention, the voltage signals have oscillating components during one output period of time.

Figure 6:
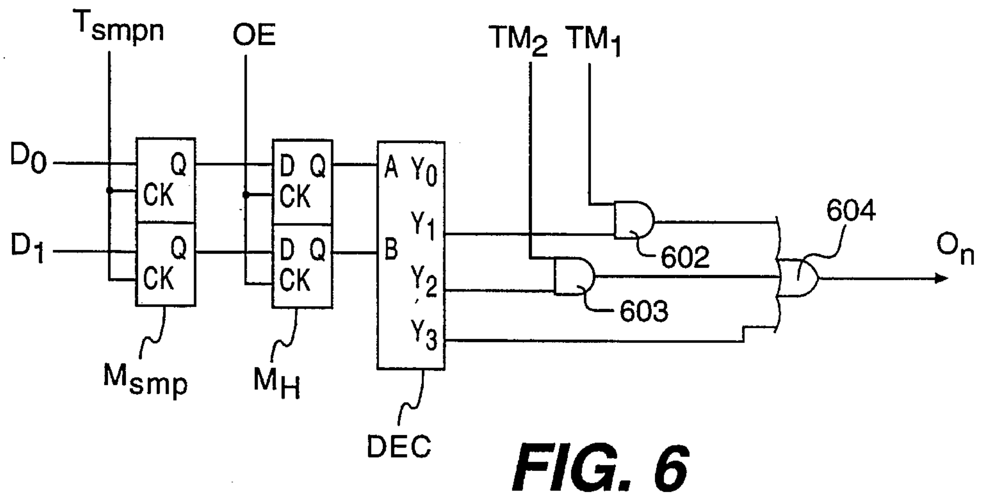
FIG. 6 shows a circuit for one output of the source driver in Example 1.

The operation of the drive circuit for outputting a voltage signal having oscillating components during one output period of time will be described:

FIG. 6 shows a portion of the driver circuit allocated for one output of the source driver 101. For simplicity, the data input to the drive circuit ($DA_i$ (i=1, 2, . . . , N) as shown in FIG. 2) consists of two bits.

Figure 51:
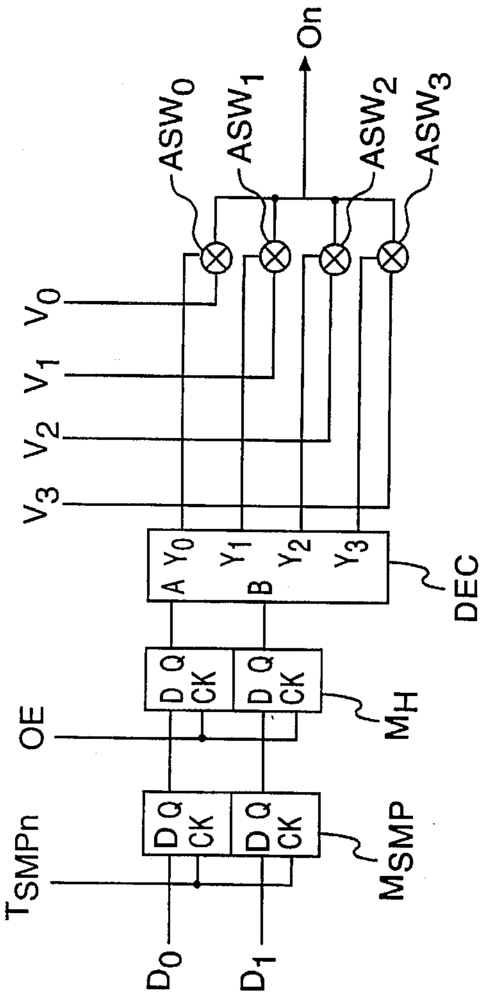
FIG. 51 PRIOR ART
FIG. 51 shows a circuit for one output of a digital source driver in the prior art.

As shown in FIG. 6, the operation of the sampling flip-flop $M_{SMP}$, the holding flip-flop $M_H$, and the decoder DEC, and the generation of sampling pulses $T_{SMPn}$, output pulse 0E, and the outputs $Y_0$ to $Y_3$ of the decoder DEC are conducted in the same manner as in the known circuit shown in FIG. 51.

AND circuits 602 and 603, and an OR circuit 604 are disposed toward the output of the decoder DEC. The outputs $Y_1$ and $Y_2$ of the decoder DEC are connected to inputs of the AND circuits 602 and 603 respectively. The outputs of the AND circuits 602 and 603 are connected to the inputs of the OR circuit 604. The output $Y_3$ is directly connected to the OR circuit 604. If any one of inputs of the OR circuit 604 are binary "1", then the OR circuit outputs a voltage of a value $V_D$ over the source line $0_n$. If all inputs of the Or circuit 604 are binary "0", then the OR circuit outputs a voltage of a value $V_{GND}$ over the source line $O_n$. The OR circuit 604 is designed to drive the source line $O_n$ regardless of any load thereof. The other inputs of the AND circuits 602 and 603 receive signals $TM_1$ and $TM_2$, respectively.

Figure 7A:
FIGS. 7A, 7B and 7C show waveforms of clock signals applied to the drive circuit in Example 1.
Figure 7B:
Figure 7C:
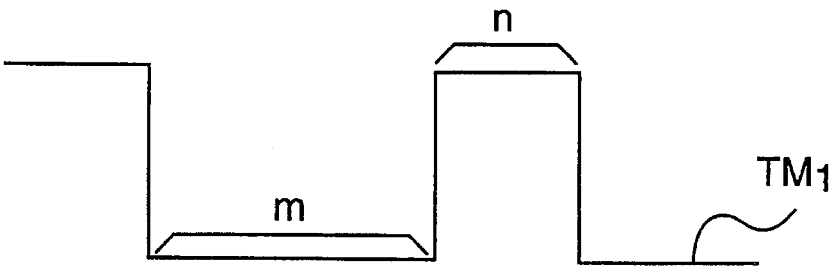

FIGS. 7A and 7B show waveforms of the signals $TM_1$ and $TM_2$, and FIG. 7C shows a portion of the signal $TM_1$. The signals $TM_1$ and $TM_2$ are a rectangular-shape pulse signal having the signal levels corresponding to and "0" which alternately appear. A signal has a ratio (*n:M) of the period at which the signal level is held at "1" to the period at which the signal level is held at "0" ratio. The signal $TM_1$ has a duty ratio as being 1:2, and the signal $TM_2$ has a duty ratio as being 2:1.

Figure 8A:
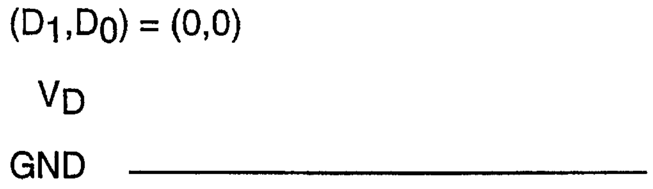
FIGS. 8A, 8B, 8C and 8D show the relationships between data input to the source driver and voltages from the source driver in Example 1.

When digital data ($D_1$, $D_0$) {(0, 0)}is input to the source driver, the output $Y_0$ of the decoder DEC becomes "1", and the other outputs $Y_1$, $Y_2$ and $Y_3$ become "0". Since all the inputs of the OR circuit 604 become "0", and the output of the OR circuit has a constant value $V_{GND}$ as shown in FIG. 8A.

Figure 8B:
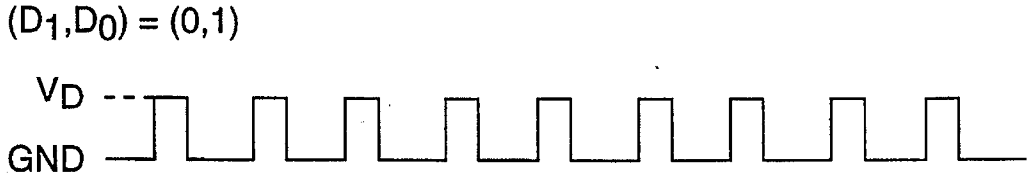

When the digital video data ($D_1$, $D_0$){(0, 1)}is input, the output $Y_1$ of the decoder DEC becomes "1", and the other outputs $Y_0$, $Y_2$ and $Y_3$ become "0". As a result, one of inputs of the OR circuit 604 becomes "1" in the same cycle as the signal $TM_1$. The output of the OR circuit 604 thus becomes an oscillating voltage having a waveform which oscillates between voltages $V_D$ and $V_{GND}$ at the same duty ratio as that of the Signal $TM_1$ (n:ml:2) as shown in FIG. 8B.

Figure 8C:
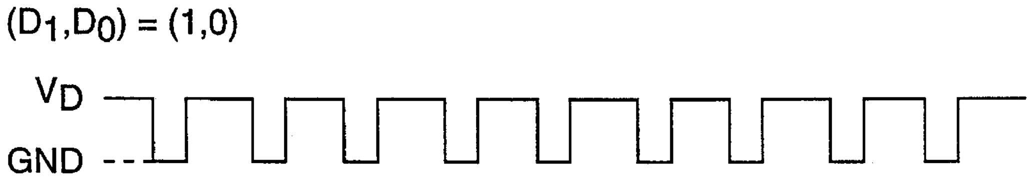

When the digital video data ($D_1$, $D_0$){(1, 0)}is input, the output $Y_2$ of the decoder DEC becomes "1", and the other outputs $Y_0$, $Y_1$ and $Y_3$ become "0". As a result, one of the inputs of the OR circuit 604 becomes "1" in the same cycle as the signal $TM_2$. The output of the OR circuit 604 thus becomes an oscillating voltage having a waveform which oscillates between voltages $V_D$ and $V_{GND}$ at the same duty ratio as that of the signal $TM_2$ (n:m-2:1) as shown in FIG. 8C.

Figure 8D:

When the digital video data ($D_1$, $D_0$){(1, 1)}is input, the output $Y_3$ of the decoder DEC becomes "1", and the other outputs $Y_0$, $Y_1$ and $Y_2$ become "0". As a result, the output of the OR circuit 604 becomes a voltage having a constant value $V_D$ as shown in FIG. 8D.

When the digital video data ($D_1$, $D_0$) is (0, 1) or (1,0), a mean value of the output of the 0R circuit 604, that is, a mean value of the voltage applied to the source line $O_n$ is expressed by:

$$\frac{n \cdot V_D + m \cdot V_{GND}}{n+m}$$

When the ground voltage level $V_{GND}$ is 0 V in the above expression, a mean value of the voltage applied to the source line $O_n$ is expressed by:

$$\frac{n}{n+m} V_D$$

Since the duty ratio (n:m) of the signal $TM_1$ is set to 1:2 as described above, if the digital video data ($D_1$, $D_0$) is (0, 1), then the mean value of oscillating voltages output from the OR circuit 604 becomes, is (⅓)$V_D$. Since the duty ratio (n:m) of the signal $TM_2$ is set to 2:1, if the digital video data ($D_1$, $D_0$) is (1,0), then the mean value of the oscillating voltage output from the OR circuit 604 becomes (⅔) $V_D$.

Figure 9:
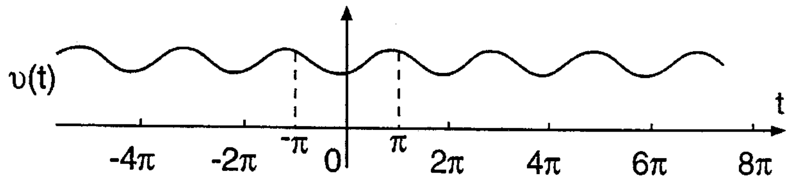
FIG. 9 shows an example of a periodical function.

When the signals $TM_1$ and $TM_2$ have a frequency higher than a cut-off frequency of a low-pass filter inherent in the source line, and the OR circuits 604 has power enough to drive the source line, the voltage applied to the pixels exhibit various values as follows:

If the digital video data ($D_1$, $D_0$)=(0, 0), then the voltage value is 0. If ($D_1$, $D_0$)=(0, 1), then it is (⅓)$V_D$. If ($D_1$, $D_0$)=(1, 0), then it is (⅔)$V_D$, and if ($D_1$, $D_0$)=(1, 1), then it is $V_D$. Thus, voltages apply to the pixels according to the digital video data. This will be described in greater detail below:

FIG. 9 shows a voltage v(t) which oscillates with a cycle of 2 τ. The oscillating voltage shown in FIG. 9 is only an example, and oscillating voltages having a given waveform are applicable if they can be a periodic function as a voltage applied to the source line from the driving circuit. The function f having a cycle 2τ is expressed by the following Fourier series:

$$f(x) \sim \frac{a_0}{2} + \sum_{n=1}^{\infty} (a_n \cos nx + b_n \sin nx)$$

$$a_n = \frac{1}{\pi} \int_{-\pi}^{\pi} f(x) \cos nx \cdot dx \quad (n = 0, 1, 2 \ldots)$$

$$b_n = \frac{1}{\pi} \int_{-\pi}^{\pi} f(x) \sin nx \cdot dx \quad (n = 1, 2, 3 \ldots)$$

It is evident that actual voltage waveform can be integrated and therefore the periodic voltage v(t) can be expressed by:

$$v(t) \sim \frac{a_0}{2} + \sum_{n=1}^{\infty} (a_n \cos nt + b_n \sin nt)$$

$$a_n = \frac{1}{\pi} \int_{-\pi}^{\pi} v(t) \cos nt \cdot dt \quad (n = 0, 1, 2 \ldots)$$

$$b_n = \frac{1}{\pi} \int_{-\pi}^{\pi} v(t) \sin nt \cdot dt \quad (n = 1, 2, 3 \ldots)$$

In the equation above, $a_0/2$ is constant. Accordingly, the equation shows that the voltage v(t) is formed by infinitely adding a d.c. component $a_0/2$, a basic periodic component having a cycle 2π, a second harmonic component, a third harmonic component and etc. When the voltage v(t) is passed through a low-pass filter having a cut-off frequency of greater length than 2π, the second term in the equation will be removed. As a result, a d.c. component $a_0/2$ can be obtained. 15 The d.c. component $a_0/2$ is expressed by:

$$\frac{a_0}{2} = \frac{1}{2\pi} \int_{-\pi}^{\pi} v(t) dt$$

The equation above shows that the d.c. component of the voltage v(t) has a mean value of the voltages v(t). Thus, it is understood a mean value of the voltage v(t) is obtained as an output from the low-pass filter, when the voltage v(t) is passed through the low-pass filter.

Figure 10:
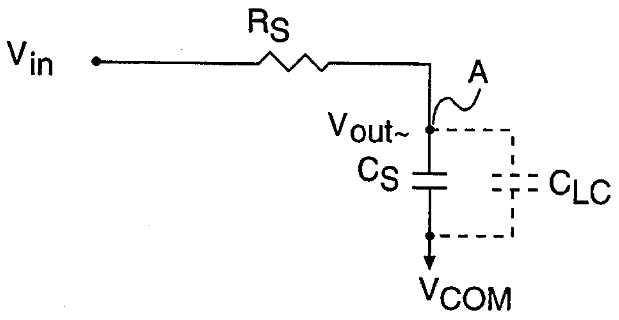
FIG. 10 shows an equivalent circuit of the display apparatus.

FIG. 10 shows an equivalent circuit extended from the drive circuit to the pixels according to the present invention. There are provided a resistance $R_s$ of the source line, a capacitance $C_s$ thereof, and a voltage $V_{COM}$ of a counter electrode. Actual capacitance $C_{LC}$ of the pixels (including an auxiliary capacitance inherent in the pixels) is connected in parallel to the capacitance $C_s$ but since the capacitance $C_S$ is greater than the capacitance $C_{LC}$, the latter is negligible as an equivalent circuit, in that the voltage applied to the pixels is equivalent to the voltage at a point A of the resistance $R_S$ and capacitance $C_S$.

It is understood that the equivalent circuit shown in FIG. 10 functions as a primary low-pass filter, which includes the resistance $R_S$ and the capacitance $C_S$. When the periodic oscillating voltage v(t) is applied to the input of this primary low-pass filter, the voltage applied to the pixels becomes almost equal to a mean value of the voltage v(t) at the point A under the condition that the cycle of the voltage v(t) is adequately shorter than that of the cut-off frequency of the low-pass filter.

A transmission function T(j ω) of the equivalent circuit an FIG. 10 is represented by:

$$T(j\omega) = \frac{V_{out}}{V_{in}} = \frac{1}{1 + j\omega CR}$$

Herein, with $1/C_S R_S = \omega_0$, the function T (jω) is represented by:

$$T(j\omega) = \frac{\omega_0}{\omega_0 + j\omega}$$

Both the denominator and the numerator are divided by $\omega_0$ to normalize the function, the function T(j ω) is represented by:

$$T(j\omega) = \frac{1}{1 + j\frac{\omega}{\omega_0}}$$

Where, $\omega/_{\omega 0}$ represents a normalized frequency. An amplitude characteristic function |T| of the function T(jω) is represented by:

$$|T| = \frac{1}{\sqrt{1 + \left(\frac{\omega}{\omega_0}\right)^2}}$$

Figure 11:
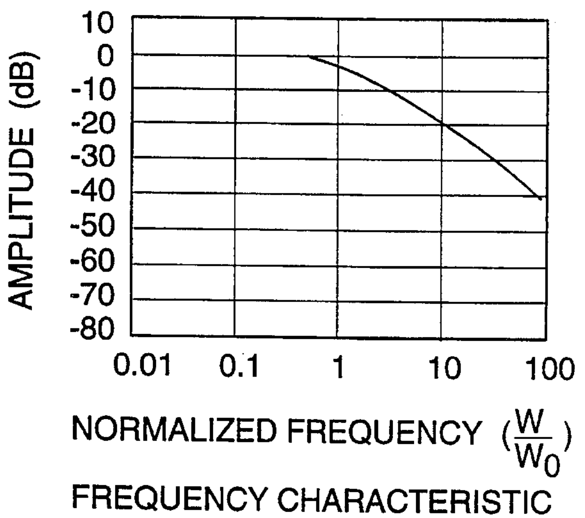
FIG. 11 shows an amplitude characteristic depending on an normalized frequency.

FIG. 11 shows an amplitude value of the function |T| according to a normalized frequency (ω/ω0) FIG. 11 teaches that if a normalized frequency $\omega/\omega_0$ is 100, the amplitude of the oscillating voltage at the point A in FIG. 10 amounts to 1/100 of that of the oscillating voltage output from the drive circuit.

The value of $\omega/\omega_0$ is appropriately determined depending upon the differences ΔV ($=V_n - V_{n-1}$) between the adjacent voltage levels and the required display quality. For example, when ΔV is 5 V, and the tolerance of the required display quality is within 0.05 V, the value $\omega/\omega_0$ must be 100 or more. If $C_S R_S$ is $10 \times 10^{-6}$ the frequency of the oscillating voltage must be 1.6 MHz or more. Refer to the following equations.

$$\frac{\omega}{\omega_0} = 100$$

$$\omega_0 = 2\pi f_0, \; \omega = 2\pi f$$

$$\frac{2\pi f}{2\pi f_0} = 100 \quad \therefore f = 100 \cdot f_0$$

$$f_0 = \frac{\omega_0}{2\pi}$$

$$\omega_0 = \frac{1}{C_S R_S} = \frac{1}{10 \times 10^{-6}} = 10^5$$

$$f_0 = \frac{10^5}{2\pi} = 1.6 \times 10^4$$

$$f_0 = 16 \text{ KHz}$$

$$\therefore f = 1.6 \text{ MHz}$$

Figure 12:
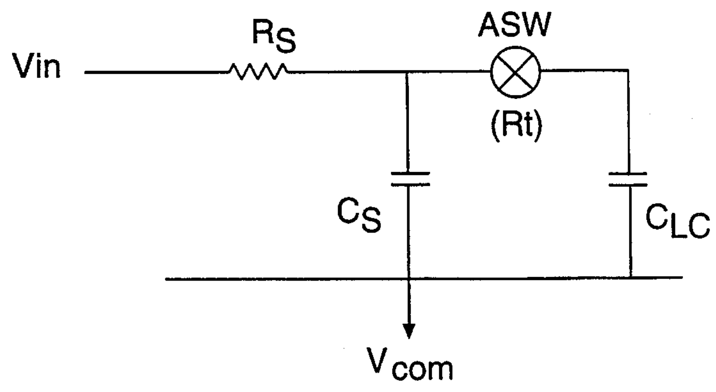
FIGS. 12 and 13 show equivalent circuits of the display apparatus.
Figure 13:
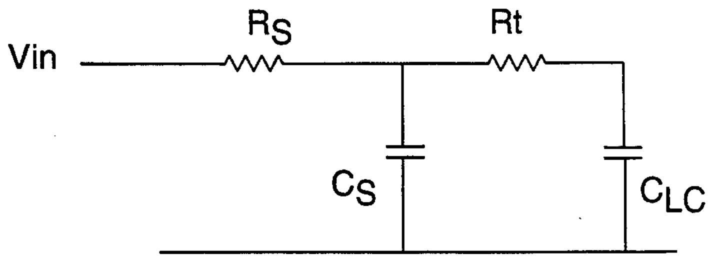

In the illustrated embodiment the low-pass filter is achieved by making use of the resistance and capacitance of the source line. Furthermore, as shown in FIG. 12 it is possible to obtain the low-pass filter by use of the capacitance $C_{LC}$ of the pixels and the resistance Rt of a switching element connecting the pixels to the source line. In the latter case, it is presupposed that the capacitance and resistance of the source line are zero. On the other hand, in the former case, the capacitance of the pixels and the resistance of the switching elements are ignored. In actual liquid crystal panels, it is considered that neither state can singly occur but they occur in combination. Actually the low-pass filter functions as a secondary low-pass filter as shown in FIG. 13.

In the illustrated embodiment, the low-pass filter is achieved by utilizing components inherent to the construction of a liquid crystal display apparatus. Furthermore, it is possible to modify a design of a display apparatus so as to adapt the characteristic of the display apparatus to the drive mechanism of the present invention, and/or to add a special filtering circuit or elements to the display apparatus (especially the source line) so as to secure an optimum cut-off frequency and/or to impart the characteristic of a secondary low-pass filter to the display apparatus.

FIGS. 58A, 58B and 58C illustrate a process of the low-pass filter reducing the amplitude of the oscillating voltage. The oscillating voltage shown-in FIG. 58A is changed to the voltage shown in FIG. 58B, and finally changed to the voltage shown in FIG. 58C through the low-pass filter.

FIGS. 59A and 59B show a relationship between the oscillating voltage and a gate signal. When the gate signal is in on-state shown in FIG. 59B, the oscillating voltage oscillates as shown in FIG. 59A.

EXAMPLE 2

Figure 14:
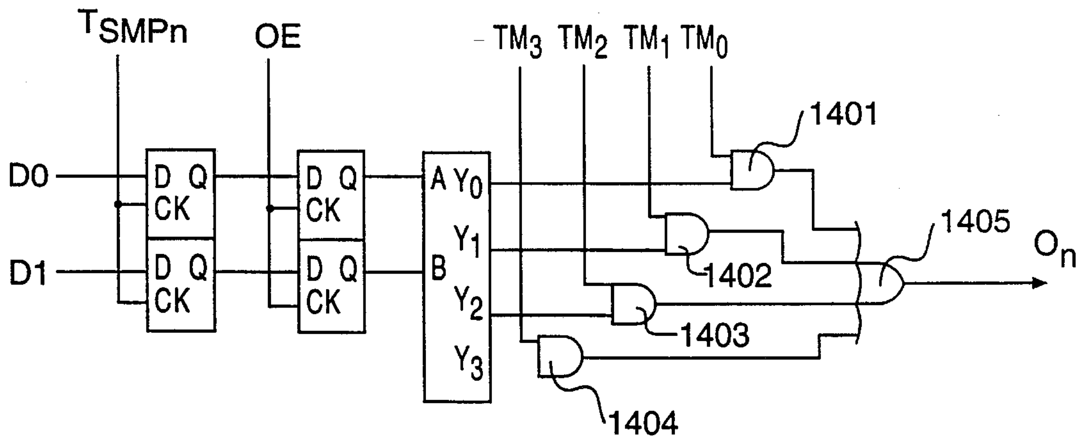
FIG. 14 shows a circuit for one output of the source driver in Example 2.

FIG. 14 shows a circuit for one output of the source driver 101 in the drive circuit- For simplicity, a digital video data input to the drive circuit consists of two bits ($D_1$, $D_0$). Outputs $Y_0$ to $Y_3$ of the decoder DEC are input to one terminal of the AND circuits 1401 to 1404 respectively, and signals $TM_0$ are input to the other terminals thereof respectively. The output of the OR circuit 1405 are applied to the source line $O_n$.

The duty ratios of the signals $TM_0$ to $TM_3$ are appropriately set so as to apply a desired voltage between a first voltage $V_D$ and a second voltage (ground level voltage) $V_{GND}$ to the pixels. When mean voltage values depending upon the duty ratios of the signals $TM_0$ to $TM_3$ are $V_0$ to $V_3$ respectively, the relationship between the digital video data ($D_1$, $D_0$) and the voltages applied to the pixels is shown in Table 1:

TABLE 1

| $D_1$ | $D_0$ | Voltages |
|---|---|---|
| 0 | 0 | $V_0$ |
| 0 | 1 | $V_1$ |
| 1 | 0 | $V_2$ |
| 1 | 1 | $V_3$ |

In this way, according to Example 2, four arbitary voltages can be applied to the pixels.

The drive circuit of Example 2 is the same as that of prior art shown in FIG. 51 in terms of the voltages which are applied to the pixels. However, the drive circuit of Example 2 requires neither the analog switches nor the external sources required by the prior art for supplying voltages $V_0$ to $V_3$. Instead, the drive circuit of Example 2 requires four AND circuits 1401 to 1404 and one OR circuit 1405. All of these circuits are basic logic circuits. The drive circuit of Example 2 also requires a signal generator circuit (not shown) for generating signals $TM_0$ to $TM_3$. As the signal generator circuit is known to be easily realized within an LSI, the description of the circuit is omitted herewith.

EXAMPLE 3

Figure 15:
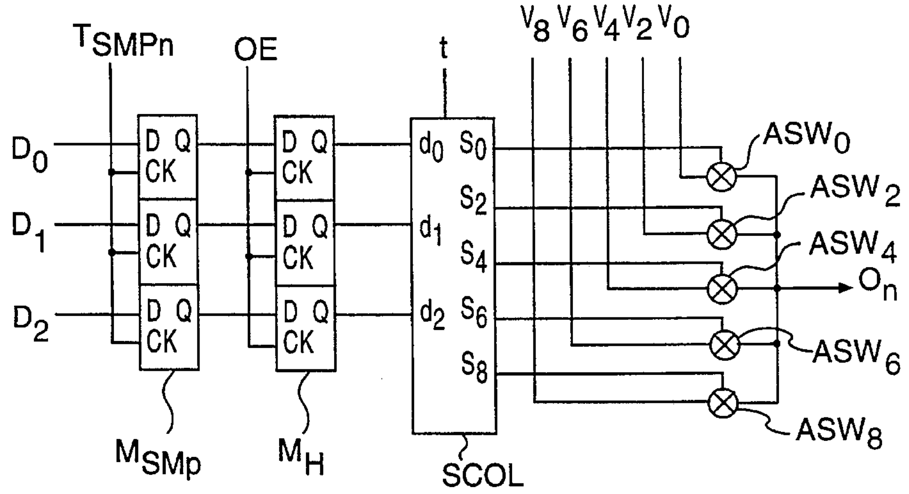
FIG. 15 shows a circuit for one output of the source driver in Example 3.

FIG. 15 shows a circuit for one output of the source driver 101 in the drive circuit. Digital video data input to the drive circuit consists of three bits ($D_2$, $D_1$, $D_0$). Hereinafter, numerals enclosed by [ ] indicate decimal numbers, and those enclosed by " " indicate binary numbers.

The sampling memory $M_{SMP}$ and the holding memory $M_H$ are operated in the same manner as shown in FIG. 51. The digital video data ($D_2$, $D_1$, $D_0$) are latched by the sampling memory $M_{SMP}$ at the rising edge of the sampling pulse $T_{SMPn}$, and latched by the holding memory $M_H$ at the rising edge of the output pulse OE. In Example 3, each output of the holding memory $M_H$ is connected to the inputs $d_0$, $d_1$ and $d_2$ of the selective control circuit SCOL to which a signal t is also applied as a clock pulse. From five output terminals $S_0$, $S_2$, $S_4$, $S_6$ and $S_8$ of the selective control circuit SCOL, control signals for controlling the "on" or "off" state of the corresponding analog switches $ASW_0$, $ASW_2$, $ASW_4$, $ASW_6$ and $ASW_8$ are output. Five distinct voltages $V_0$, $V_2$, $V_4$, $V_6$ and $V_8$ ($V_0<V_2<V_4<V_6<V_8$ or $V_8<V_6<_4<V_2<V_0$) are supplied to the input terminals of corresponding analog switches. As a device for supplying a plurality of voltages is known, the description thereof is omitted for simplicity. Table 2 shows the relationship between the inputs and outputs of the selective control circuit SCOL. The blank spaces indicate "0", t indicates that if the signal t is "1" then the output is "1" else the output iS "0" t indicates that if the signal t is "1" then the output is "0" , else the output is "1".

TABLE 2

| Decimal Numbers | $d_2$ | $d_1$ | $d_0$ | $S_0$ | $S_2$ | $S_4$ | $S_6$ | $S_8$ | $O_n$ |
|---|---|---|---|---|---|---|---|---|---|
| 0 | 0 | 0 | 0 | 1 | | | | | $V_0$ |
| 1 | 0 | 0 | 1 | t | $\bar{t}$ | | | | $\frac{V_0+V_2}{2}$ |
| 2 | 0 | 1 | 0 | | 1 | | | | $V_2$ |
| 3 | 0 | 1 | 1 | | t | $\bar{t}$ | | | $\frac{V_2+V_4}{2}$ |
| 4 | 1 | 0 | 0 | | | 1 | | | $V_4$ |
| 5 | 1 | 0 | 1 | | | t | $\bar{t}$ | | $\frac{V_4+V_6}{2}$ |
| 6 | 1 | 1 | 0 | | | | 1 | | $V_6$ |
| 7 | 1 | 1 | 1 | | | | t | $\bar{t}$ | $\frac{V_6+V_8}{2}$ |

Referring to Table 2, the operation of the selective control circuit SCOL will be described:

When digital video data is [0], the analog switch $ASW_0$ is "on" in response to a signal output from the output terminal $S_0$ of the selective control circuit SCOL. As a result, the voltage $V_0$ is applied to the source line $\mathbf{0}_n$. When the digital video data is [2], the analog switch $ASW_2$ is "on" in response to a signal output from the output terminal $S_2$. As a result, the voltage $V_2$ is applied to the source line $O_n$. When the digital video data is [4], the analog switch $ASW_4$ is "on" in response to a signal output from the output terminal $S_4$. As a result, the voltage $V_4$ is applied to the source line $O_n$. When the digital video data is [6], the analog switch $ASW_6$ is "on" in response to a signal output from the output terminal $S_6$. As a result, the voltage $V_6$ is applied to the source line $O_n$.

Figure 16:
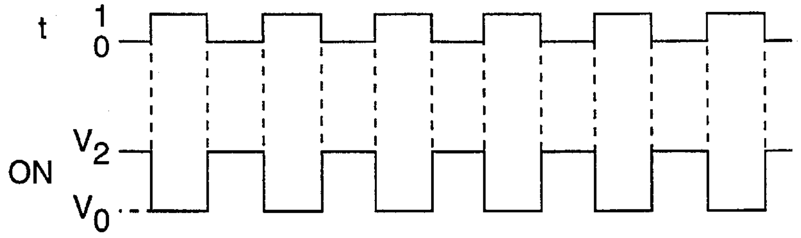
FIG. 16 shows a relationship between a clock signal applied to the source driver and an voltage output from the source driver in Example 3.

When the digital video data is [1], the signal t is output from the output terminal $S_0$ of the selective control circuit SCOL, and the signal $\bar{t}$ (i.e. the inverted signal t) is output from the output terminal $S_2$ thereof. In this way, when the signal t is "1", the analog switch $ASW_0$ becomes "on", thereby applying the voltage $V_0$ to the source line $O_n$. When the signal t is "0", the analog switch $ASW_2$ is also "on" since the signal $\bar{t}$ is "1", thereby applying the voltage $V_2$ to the source line $0_n$. Since the signal t is a clock pulse signal, the voltage applied to the source line is an voltage oscillating in the same cycles as those of the clock pulse signal t. In FIG. 16, since the duty ratio of the signal t is 50%, the mean value of the voltages applied to the source line $O_n$ becomes $(V_0+V_2)/2$. Likewise, when the video data is [3], the analog switches $ASW_2$ and $ASW_4$ alternately are "on", thereby outputting a voltage oscillating between the voltages $V_2$ and $V_4$. When the video data is [5], the analog switches $ASW_4$ and $ASW_6$ alternately are "on", thereby outputting a voltage oscillating between the voltages $V_4$ and $V_6$. When the video data is [7], the analog switches $ASW_6$ and $ASW_8$ alternately are "on", thereby outputting a voltage oscillating between the voltages $V_6$ and $V_8$. When the video data is [3], [5] and [7], the mean values of the voltages applied to the source line $O_n$ are respectively $(V_2+V_4)/2$, $(V_4+V_6)/2$, $(V_6+V_8)/2$.

Figure 54:
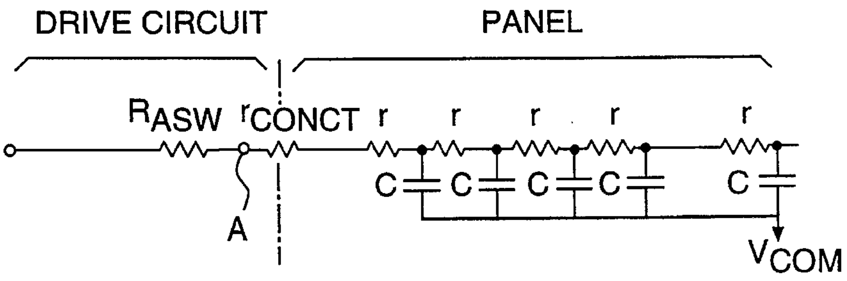
FIG. 54 shows an equivalent circuit in Example 3.

FIG. 54 shows an equivalent circuit from the drive circuit to a TFT liquid crystal panel. In FIG. 54, $R_{ASW}$ represents a resistance which occurs when an analog switch is in on-state, $r_{CONCT}$ represents a resistance which occurs because of the connection between the drive circuit and a source line of the liquid crystal panel, and r and c represent a resistance and a capacitance which exist as a distributed constant in the source line of the liquid crystal panel. $V_{COM}$ represents a counter voltage applied to the counter electrode (not shown) of the liquid crystal panel.

Figure 55:
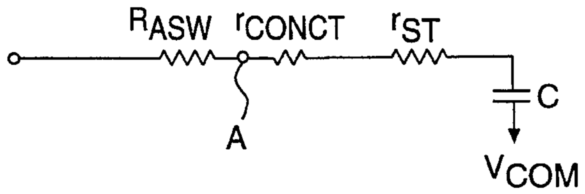
FIG. 55 shows an equivalent circuit replaced with a concentrated constant in Example 3.

In view of the load of the output terminal at the point A shown in FIG. 54, the distributed constant r and c can be replaced with a concentrated constant $r_{ST}$ and C. FIG. 55 shows such a replaced equivalent circuit.

Figure 56:
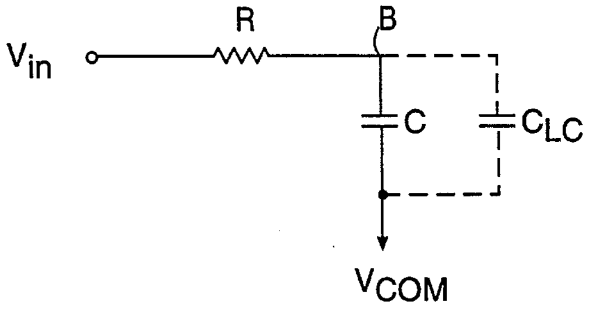
FIG. 56 shows a simplified equivalent circuit in Example 3.

A time constant which usually appears in a source line of the liquid crystal panel is equal to the concentrated constant. If $R_{ASW}+r_{CONCT}+r_{ST}$ in FIG. 55 is replaced with one resistance R, FIG. 56 is obtained. The equivalent circuit shown in FIG. 56 is regarded as an equivalent circuit for one output of the drive circuit.

As shown in FIG. 56, since the capacitance of the capacitor C is much greater than that of the capacitor $C_{LC}$ of the pixel, the capacitance of the capacitor $C_{LC}$ is negligible regarding the operation of the drive circuit. I is also presupposed that a resistance which occurs when a switching element TFT (not shown) is in on-state is negligible. Accordingly, it can be understood that the pixel is charged in accordance with the voltage at the point B in FIG. 56.

Figure 57:
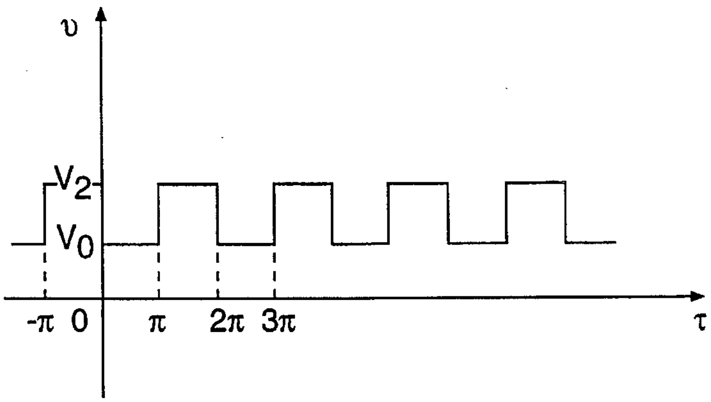
FIG. 57 shows a waveform of the voltage $V_{in}$ input to the equivalent circuit in Example 3.

FIG. 57 shows a waveform of the voltage $V_{in}$ which is input to the equivalent circuit shown in FIG. 56 (in other words, the oscillating voltage output from the output terminal of the drive circuit to the source line) when the digital video data is [1]. In FIG. 57, the oscillating voltage is normalized so that the period of the oscillating voltage is equal to $2\pi$ on the axis t.

As described in Example 1, the oscillating voltages are applied to the pixels through the low-pass filter wherein a signal t having a frequency greater than a frequency inherent to the low-pass filter is selected and applied to the selective control circuit SCOL, thereby applying a voltage which value is substantially equal to $(V_0+V_2)/2$ for practical use to the pixels. The same procedure takes place when the digital video data is [3], [5] and [7], which will be described in greater detail below:

Referring to FIG. 11, it is understood that when a normalized frequency $\omega/\omega_0$ is 10, the amplitude of the oscillating voltage at the point B in FIG. 56 amounts to 1/10 of that of the oscillating voltage output from the drive circuit.

The value of $\omega/\omega_0$ is appropriately determined depending upon the difference $\Delta V$ $(=V_n-V_{n-1})$ between the adjacent voltage levels and the required display quality. For example, when $\Delta V$ is 1 V, and the tolerance of the required display quality is within 0.1 V, it is enough that the value of $\omega/\omega_0$ is 10.

If CR is $5\times10^{-6}$, the frequency of the oscillating voltage must be 320 kHz or more. In actual liquid crystal panels, the value of CR is approximately $5\times10^{-6}$ to $10\times10^{-6}$. One output period of time is about 30 sec. If a liquid crystal panel is used as a display for a computer. As a result, when an oscillating voltage whose frequency is 320 kHz is applied, one output period of time includes 10 periods of the oscillating voltage.

There is no theoretical upper limit on the frequency of the signal t. However, the frequency of the signal t is actually limited because of the characteristics of analog switches $ASW_0$ to $ASW_8$. According to an experiment of driving an actual liquid crystal panel by the use of the signal t which has the frequency of 100 kHz –25 MHz, there is no difference in the display quality, compared to the case in which a voltage having a value $(v_n+v_{n+1})/2$ is supplied directly to the source line $O_n$.

For above-mentioned reasons, it is apparent that the tolerance for the frequency of the oscillating voltage is very broad.

The resistance R and the capacitance C as shown in FIG. 56 vary among the pixels of a liquid crystal panel. Actually some pixels are arranged close to the output terminals of the source driver 101, and others are arranged far from the output terminals of the source driver 101. As a result, it is considered that it is necessary to adjust the resistance R and the capacitance C depending upon the distances from the output terminals of the source 101 in some cases. However, since the tolerance for the frequency of the oscillating voltage is very broad as mentioned above, the smallest value of the resistance R and the capacitance C makes it possible to absorb the unevenness which depends upon liquid crystal panels and the distances from the output terminals of the source driver.

In addition, there provided a function as a low-pass filter in actual liquid crystal panels. The low-pass filter is caused by a resistance which occurs when a switching element TFT is in on-sate and a capacitance of the pixel. This is an advantageous condition especially for the pixels arranged close to the output terminals of the source driver.

Figure 17:
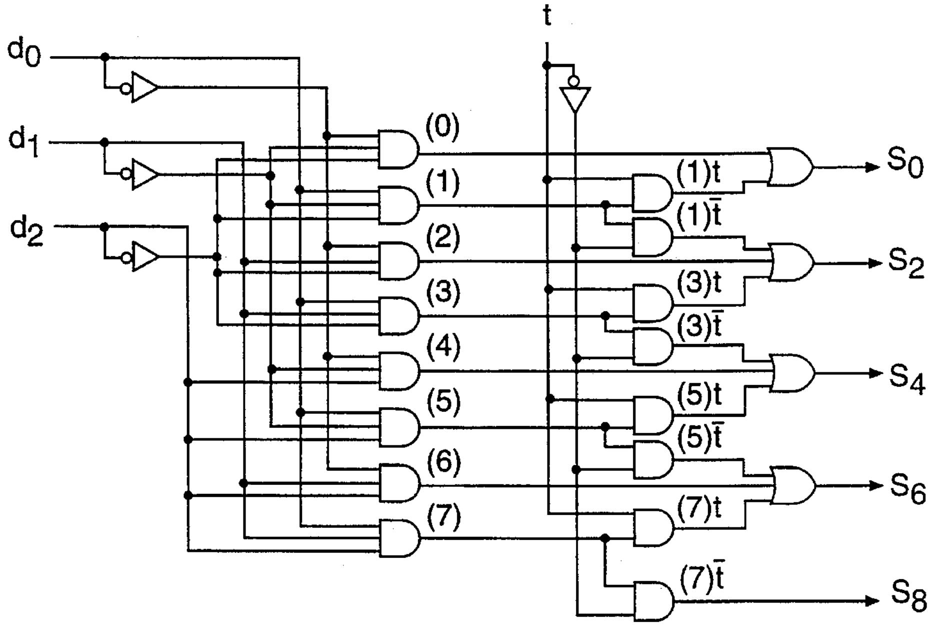
FIG. 17 shows a logic circuit for the selective control circuit in Example 3.

FIG. 17 shows a logic circuit for the selective control circuit SCOL as shown in FIG. 15. The logic circuit is provided from the following logic expressions which are derived from Table 2.

$S_0=(0)+(1)t$ $S_2=(1)\bar{t}+(2)+(3)t$ $S_4=(3)\bar{t}+(4)+(5)t$ $S_6=(5)\bar{t}+(6)+(7)t$ $S_8=(7)\bar{t}$ $(0)=\bar{d}_2\ \bar{d}_1\ \bar{d}_0$ $(1)=\bar{d}_2\ \bar{d}_1\ \bar{d}_0$ $(2)=\bar{d}_2\ \bar{d}_1\ \bar{d}_0$ $(3)=\bar{d}_2\ \bar{d}_1\ \bar{d}_0$ $(4)=\bar{d}_2\ \bar{d}_1\ \bar{d}_0$ $(5)=\bar{d}_2\ \bar{d}_1\ \bar{d}_0$ $(6)=\bar{d}_2\ \bar{d}_1\ \bar{d}_0$ $(7)=\bar{d}_2\ \bar{d}_1\ \bar{d}_0$

EXAMPLE 4

Figure 18:
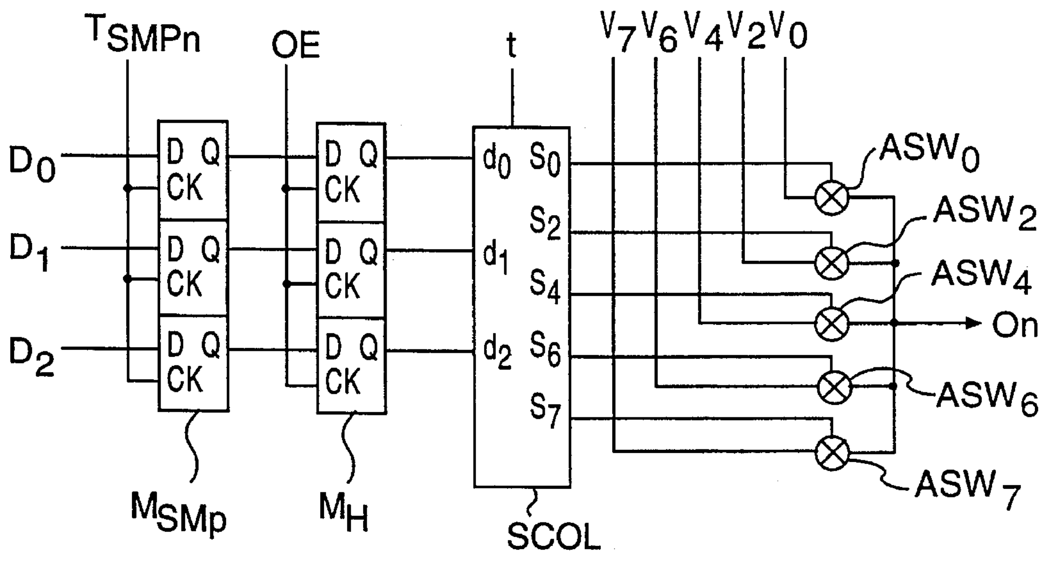
FIG. 18 shows a circuit for one output of the source driver in Example 4.
Figure 19:
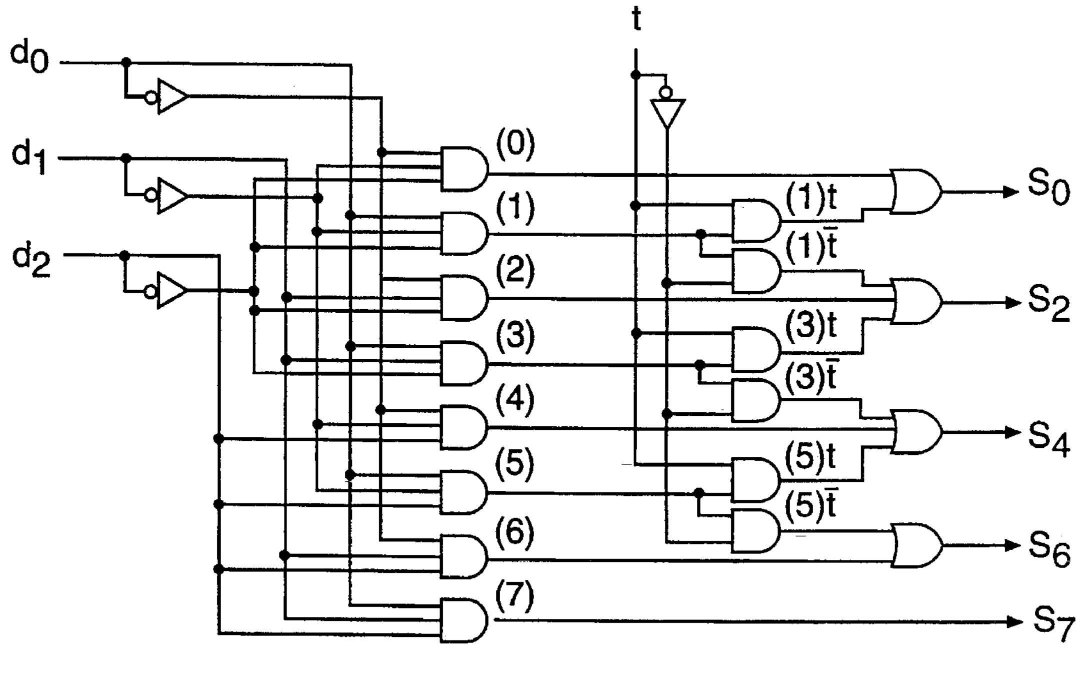
FIG. 19 shows a logic circuit for the selective control circuit in Example 4.

FIG. 18 shows a circuit for one output of the source driver 101 in the drive circuit. FIG. 19 shows a logic circuit for the selective control circuit SCOL for the source driver. In FIG. 18, the circuit is modified to change the supplied voltage $V_8$ as shown in FIG. 15 to a voltage $V_7$, and to change the analog switch $ASW_8$ as shown in FIG. 15 to a analog switch $ASW_7$. In this circuit, when digital video data is [7], the voltage $V_7$ is applied to the source line On.

Table 3 is a logic table which defines an operation of the selective control circuit SCOL in the source driver. In FIG. 15, the voltage $V_8$ is not applied to the source line. On the other hand, in FIG. 18, the voltage $V_7$ is applied to the source line. Thus, the circuit in FIG. 18 is more reasonable than that in FIG. 15 for the practical use.

TABLE 3

| Decimal Numbers | $d_2$ | $d_1$ | $d_0$ | $S_0$ | $S_2$ | $S_4$ | $S_6$ | $S_7$ | $O_n$ |
|---|---|---|---|---|---|---|---|---|---|
| 0 | 0 | 0 | 0 | 1 | | | | | $V_0$ |
| 1 | 0 | 0 | 1 | t | $\bar{t}$ | | | | $\frac{V_0+V_2}{2}$ |
| 2 | 0 | 1 | 0 | | 1 | | | | $V_2$ |
| 3 | 0 | 1 | 1 | | t | $\bar{t}$ | | | $\frac{V_2+V_4}{2}$ |
| 4 | 1 | 0 | 0 | | | 1 | | | $V_4$ |
| 5 | 1 | 0 | 1 | | | t | $\bar{t}$ | | $\frac{V_4+V_6}{2}$ |
| 6 | 1 | 1 | 0 | | | | 1 | | $V_6$ |
| 7 | 1 | 1 | 1 | | | | | 1 | $V_7$ |

EXAMPLE 5

Figure 20:
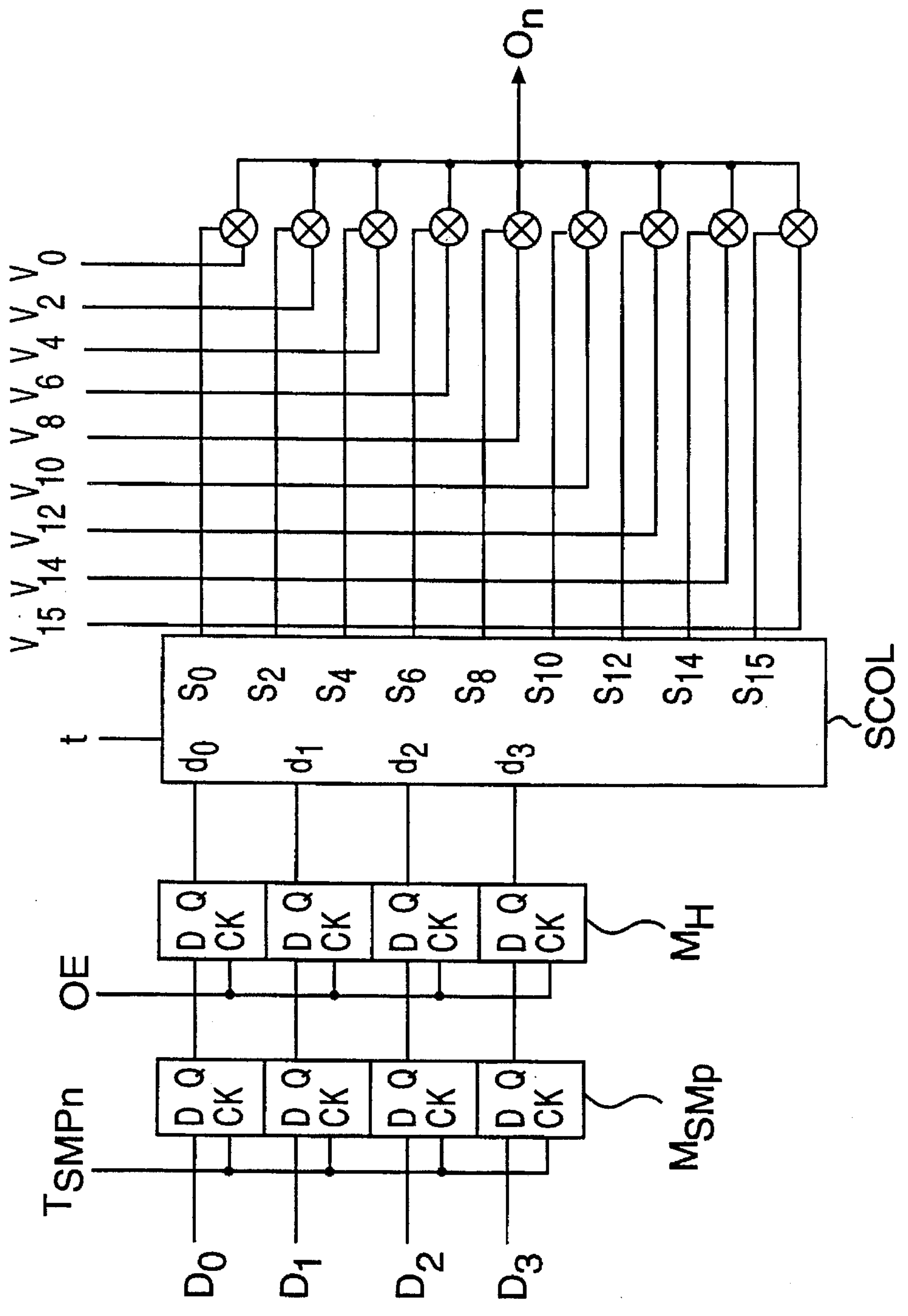
FIG. 20 shows a circuit for one output of the source driver in Example 5.

FIG. 20 shows a circuit for one output of the source driver 101 in the drive circuit. Digital video data input to the drive circuit consists of four bits.

Table 4 is a logic table which defines an operation of the selective control circuit SCOL in the source driver.

TABLE 4

| Decimal Numbers | $d_3$ | $d_2$ | $d_1$ | $d_0$ | $S_0$ | $S_2$ | $S_4$ | $S_6$ | $S_8$ | $S_{10}$ | $S_{12}$ | $3_{14}$ | $S_{15}$ |
|---|---|---|---|---|---|---|---|---|---|---|---|---|---|
| 0 | 0 | 0 | 0 | 0 | 1 | | | | | | | | |
| 1 | 0 | 0 | 0 | 1 | t | $\bar{t}$ | | | | | | | |
| 2 | 0 | 0 | 1 | 0 | | 1 | | | | | | | |
| 3 | 0 | 0 | 1 | 1 | | t | $\bar{t}$ | | | | | | |
| 4 | 0 | 1 | 0 | 0 | | | 1 | | | | | | |
| 5 | 0 | 1 | 0 | 1 | | | t | $\bar{t}$ | | | | | |
| 6 | 0 | 1 | 1 | 0 | | | | 1 | | | | | |
| 7 | 0 | 1 | 1 | 1 | | | | t | $\bar{t}$ | | | | |
| 8 | 1 | 0 | 0 | 0 | | | | | 1 | | | | |
| 9 | 1 | 0 | 0 | 1 | | | | | t | $\bar{t}$ | | | |
| 10 | 1 | 0 | 1 | 0 | | | | | | 1 | | | |
| 11 | 1 | 0 | 1 | 1 | | | | | | t | $\bar{t}$ | | |

TABLE 4-continued

| Decimal Numbers | $d_3$ | $d_2$ | $d_1$ | $d_0$ | $S_0$ | $S_2$ | $S_4$ | $S_6$ | $S_8$ | $S_{10}$ | $S_{12}$ | $3_{14}$ | $S_{15}$ |
|---|---|---|---|---|---|---|---|---|---|---|---|---|---|
| 12 | 1 | 1 | 0 | 0 | | | | | | | 1 | | |
| 13 | 1 | 1 | 0 | 1 | | | | | | | t | $\bar{t}$ | |
| 14 | 1 | 1 | 1 | 0 | | | | | | | | 1 | |
| 15 | 1 | 1 | 1 | 1 | | | | | | | | | 1 |

Table 5 teaches that seven complement voltages can be obtained from nine given voltages, thereby a source driver capable of driving a display apparatus with 16 gradation levels is realized.

TABLE 5

| Decimal Numbers | $d_3$ | $d_2$ | $d_1$ | $d_0$ | $O_n$ |
|---|---|---|---|---|---|
| 0 | 0 | 0 | 0 | 0 | $V_0$ |
| 1 | 0 | 0 | 0 | 1 | $\frac{1}{2}(V_0+V_2)$ |
| 2 | 0 | 0 | 1 | 0 | $V_2$ |
| 3 | 0 | 0 | 1 | 1 | $\frac{1}{2}(V_2+V_4)$ |
| 4 | 0 | 1 | 0 | 0 | $V_4$ |
| 5 | 0 | 1 | 0 | 1 | $\frac{1}{2}(V_4+V_6)$ |
| 6 | 0 | 1 | 1 | 0 | $V_6$ |
| 7 | 0 | 1 | 1 | 1 | $\frac{1}{2}(V_6+V_8)$ |
| 8 | 1 | 0 | 0 | 0 | $V_8$ |
| 9 | 1 | 0 | 0 | 1 | $\frac{1}{2}(V_8+V_{10})$ |
| 10 | 1 | 0 | 1 | 0 | $V_{10}$ |
| 11 | 1 | 0 | 1 | 1 | $\frac{1}{2}(V_{10}+V_{12})$ |
| 12 | 1 | 1 | 0 | 0 | $V_{12}$ |
| 13 | 1 | 1 | 0 | 1 | $\frac{1}{2}(V_{12}+V_{14})$ |
| 14 | 1 | 1 | 1 | 0 | $V_{14}$ |
| 15 | 1 | 1 | 1 | 1 | $V_{15}$ |

EXAMPLE 6

Figure 21:
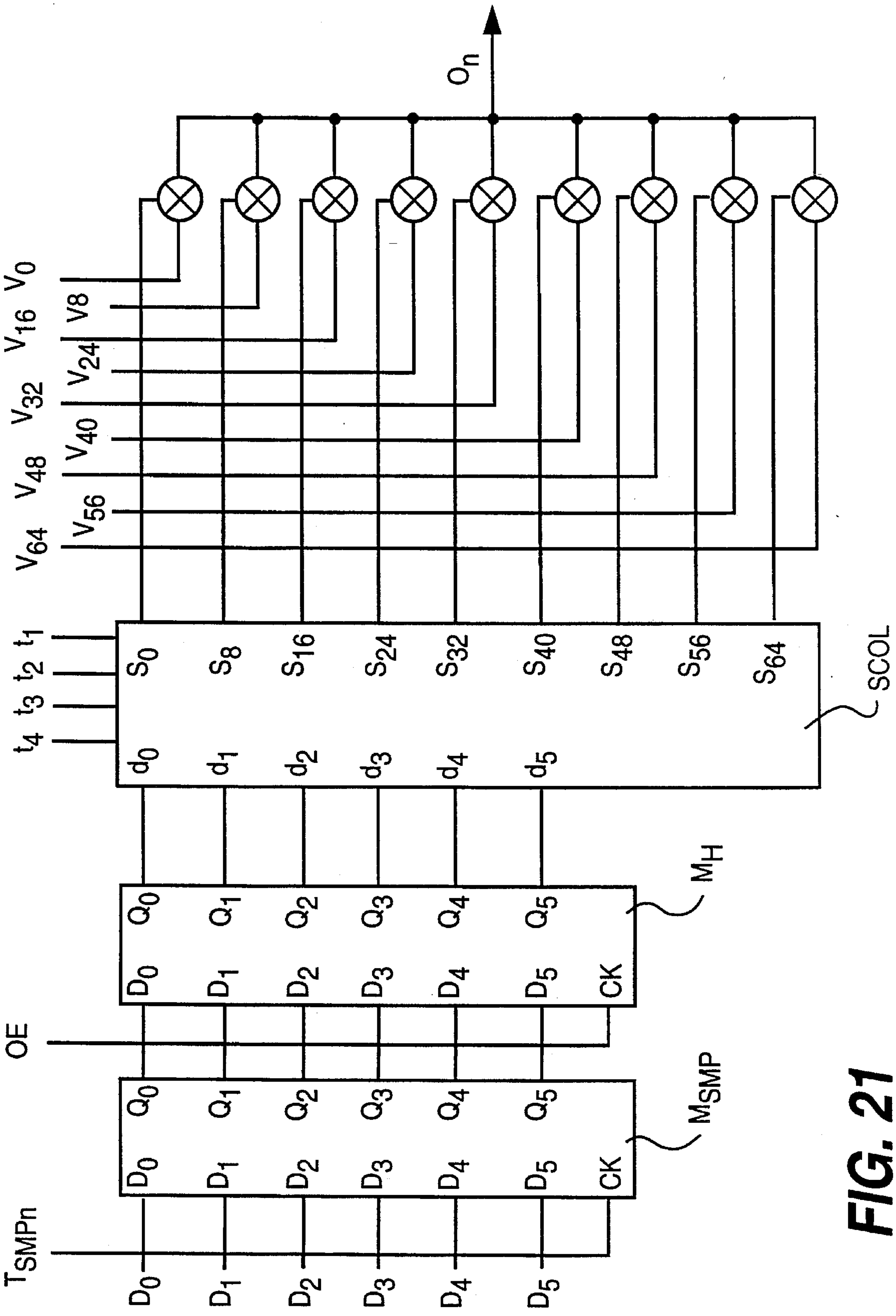
FIG. 21 shows a circuit for one output of the source driver in Example 6.

FIG. 21 shows a circuit for one output of the source driver 101 in the drive circuit. Digital video data input to the drive circuit consists of six bits.

Figure 22:
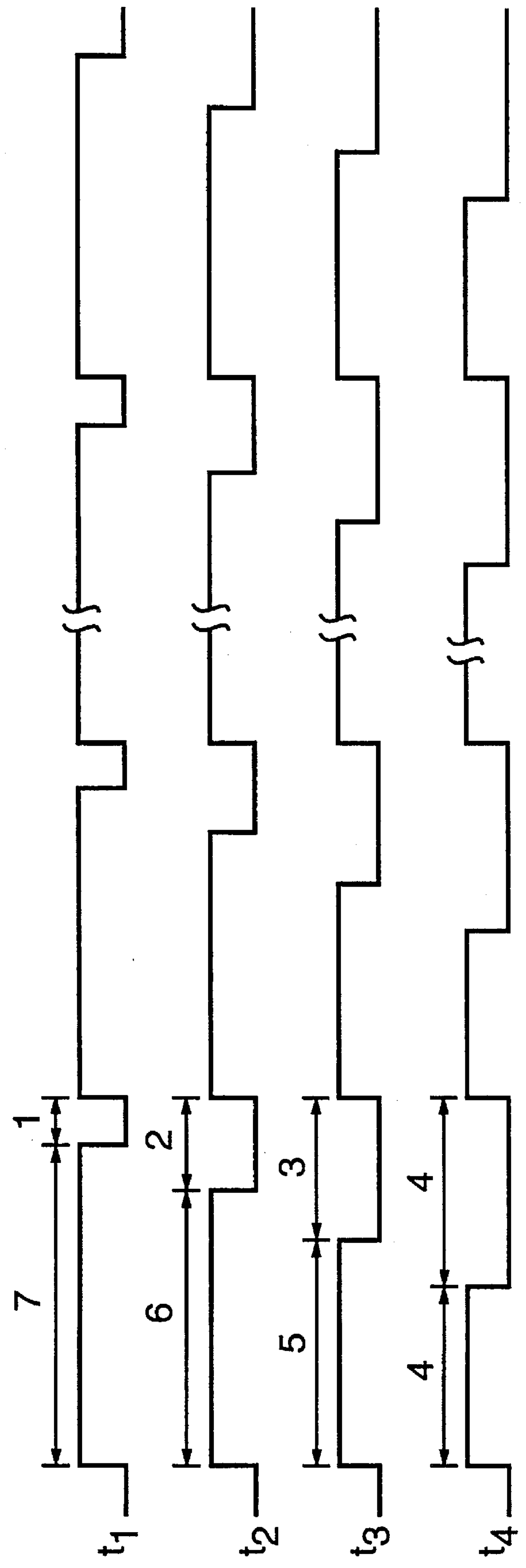
FIG. 22 shows waveforms of clock signals applied to the source driver in Example 6.

As shown in FIG. 21, four distinct signals $t_1$, $t_2$, $t_3$ and $t_4$ are applied to the selective control circuit in the source driver. FIG. 22 shows waveforms of these signals. In this example, duty ratios of the signals $t_1$, $t_2$, $t_3$ and $t_4$ are set to 7:1, 6:2, 5:3 and 4:4, respectively.

Table 6 is a logic table which defines an operation of the selective control circuit SCOL in the source driver.

TABLE 6

| $d_5$ | $d_4$ | $d_3$ | $d_2$ | $d_1$ | $d_0$ | $S_0$ | $S_8$ | $S_{16}$ | $S_{24}$ | $S_{32}$ | $S_{40}$ | $S_{48}$ | $S_{56}$ | $S_{64}$ |
|---|---|---|---|---|---|---|---|---|---|---|---|---|---|---|
| | | | 0 | 0 | 0 | 1 | 0 | | | | | | | |
| | | | 0 | 0 | 1 | $t_1$ | $\overline{t_1}$ | | | | | | | |
| | | | 0 | 1 | 0 | $t_2$ | $\overline{t_2}$ | | | | | | | |
| | | | 0 | 1 | 1 | $t_3$ | $\overline{t_3}$ | | | | | | | |
| | | | 1 | 0 | 0 | $t_4$ | $t_4$ | | | | | | | |
| | | | 1 | 0 | 1 | $\overline{t_3}$ | $t_3$ | | | | | | | |
| | | | 1 | 1 | 0 | $\overline{t_2}$ | $t_2$ | | | | | | | |
| | | | 1 | 1 | 1 | $\overline{t_1}$ | $t_1$ | | | | | | | |
| 0 | 0 | 1 | 0 | 0 | 0 | 0 | 1 | 0 | 0 | 0 | 0 | 0 | 0 | 0 |
| | | | | | | | | | $\overline{t_3}$ | $t_3$ | | | | |
| 0 | 1 | 1 | 1 | 1 | 0 | | | | $\overline{t_2}$ | $t_2$ | | | | |
| 0 | 1 | 1 | 1 | 1 | 1 | | | | $\overline{t_1}$ | $t_1$ | | | | |
| 1 | 0 | 0 | 0 | 0 | 0 | | | | | 1 | 0 | | | |
| 1 | 0 | 0 | 0 | 0 | 1 | | | | | $t_1$ | $\overline{t_1}$ | | | |
| 1 | 0 | 0 | 0 | 1 | 0 | | | | | $t_2$ | $\overline{t_2}$ | | | |
| 1 | 0 | 0 | 0 | 1 | 1 | | | | | $t_3$ | $\overline{t_3}$ | | | |
| 1 | 0 | 0 | 1 | 0 | 0 | | | | | $t_4$ | $t_4$ | | | |
| 1 | 0 | 0 | 1 | 0 | 1 | | | | | $\overline{t_3}$ | $t_3$ | | | |
| 1 | 0 | 0 | 1 | 1 | 0 | | | | | $\overline{t_2}$ | $t_2$ | | | |
| 1 | 0 | 0 | 1 | 1 | 1 | | | | | $\overline{t_1}$ | $t_1$ | | | |
| 1 | 0 | 1 | 0 | 0 | 0 | 0 | 0 | 0 | 0 | | 1 | 0 | 0 | 0 |
| | | | | | | | | | | | | $\overline{t_3}$ | $t_3$ | 0 |
| 1 | 1 | 0 | | | | | | | | | | $\overline{t_2}$ | $t_2$ | 0 |
| 1 | 1 | 0 | 0 | 0 | 0 | | | | | | | $\overline{t_1}$ | $t_1$ | 0 |
| 1 | 1 | 1 | 0 | 0 | 0 | | | | | | | | 1 | 0 |
| 1 | 1 | 1 | 0 | 0 | 1 | | | | | | | | $t_1$ | $\overline{t_1}$ |
| 1 | 1 | 1 | 0 | 1 | 0 | | | | | | | | $t_2$ | $\overline{t_2}$ |
| 1 | 1 | 1 | 0 | 1 | 1 | | | | | | | | $t_3$ | $\overline{t_3}$ |
| 1 | 1 | 1 | 1 | 0 | 0 | | | | | | | | $t_4$ | $t_4$ |
| 1 | 1 | 1 | 1 | 0 | 1 | | | | | | | | $\overline{t_3}$ | $t_3$ |
| 1 | 1 | 1 | 1 | 1 | 0 | | | | | | | | $\overline{t_2}$ | $t_2$ |
| 1 | 1 | 1 | 1 | 1 | 1 | | | | | | | | $\overline{t_1}$ | $t_1$ |

Figure 23:
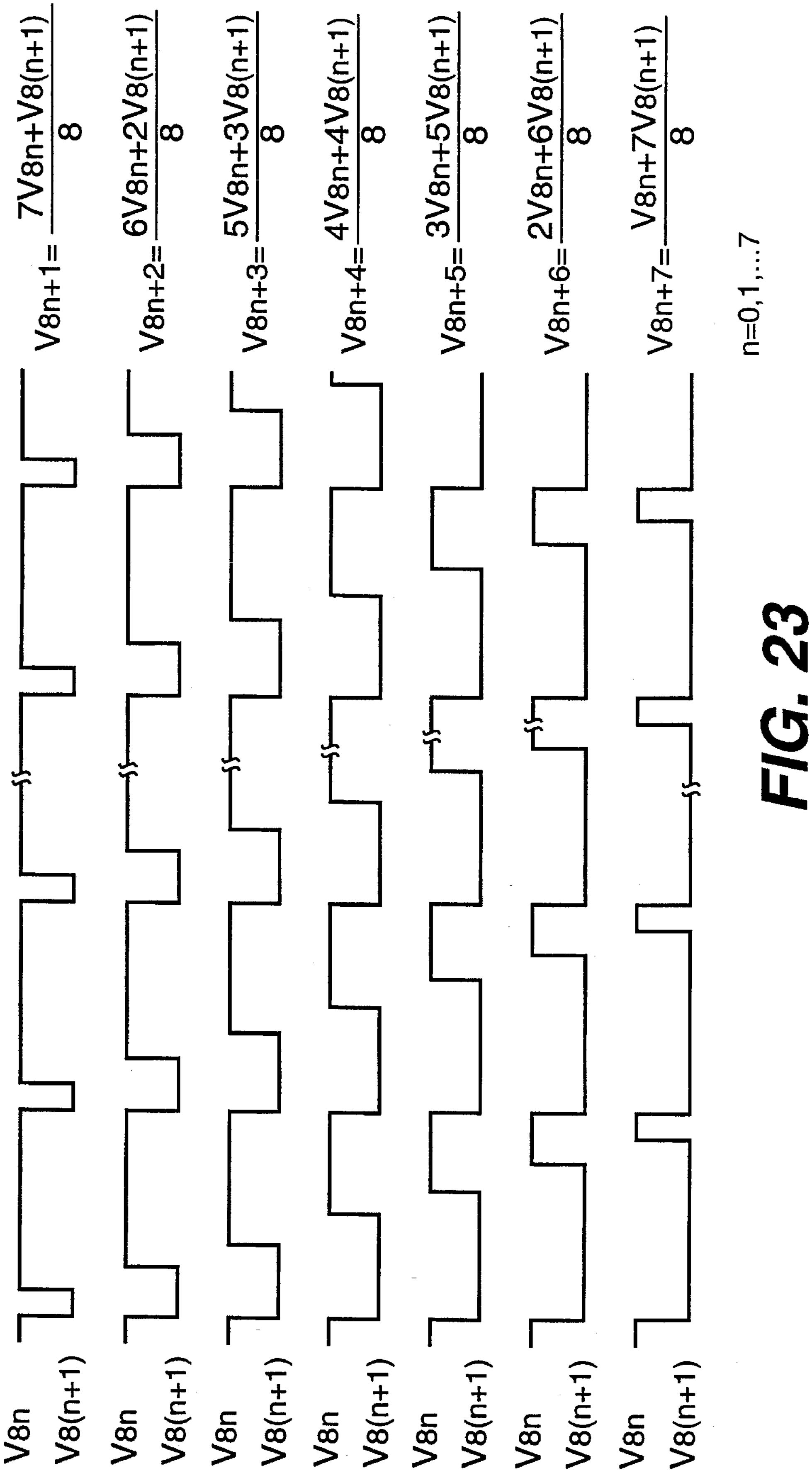
FIG. 23 shows waveforms of voltages output from the source driver in Example 6.

FIG. 23 shows oscillating voltages output to the source line according to Table 6 when the value of the digital video data is not a multiple of eight.

Thus, 56 complement voltages can be obtained from nine given voltages, thereby the source driver capable of driving a display apparatus displaying with 64 gradation levels is realized.

EXAMPLE 7

Figure 24:
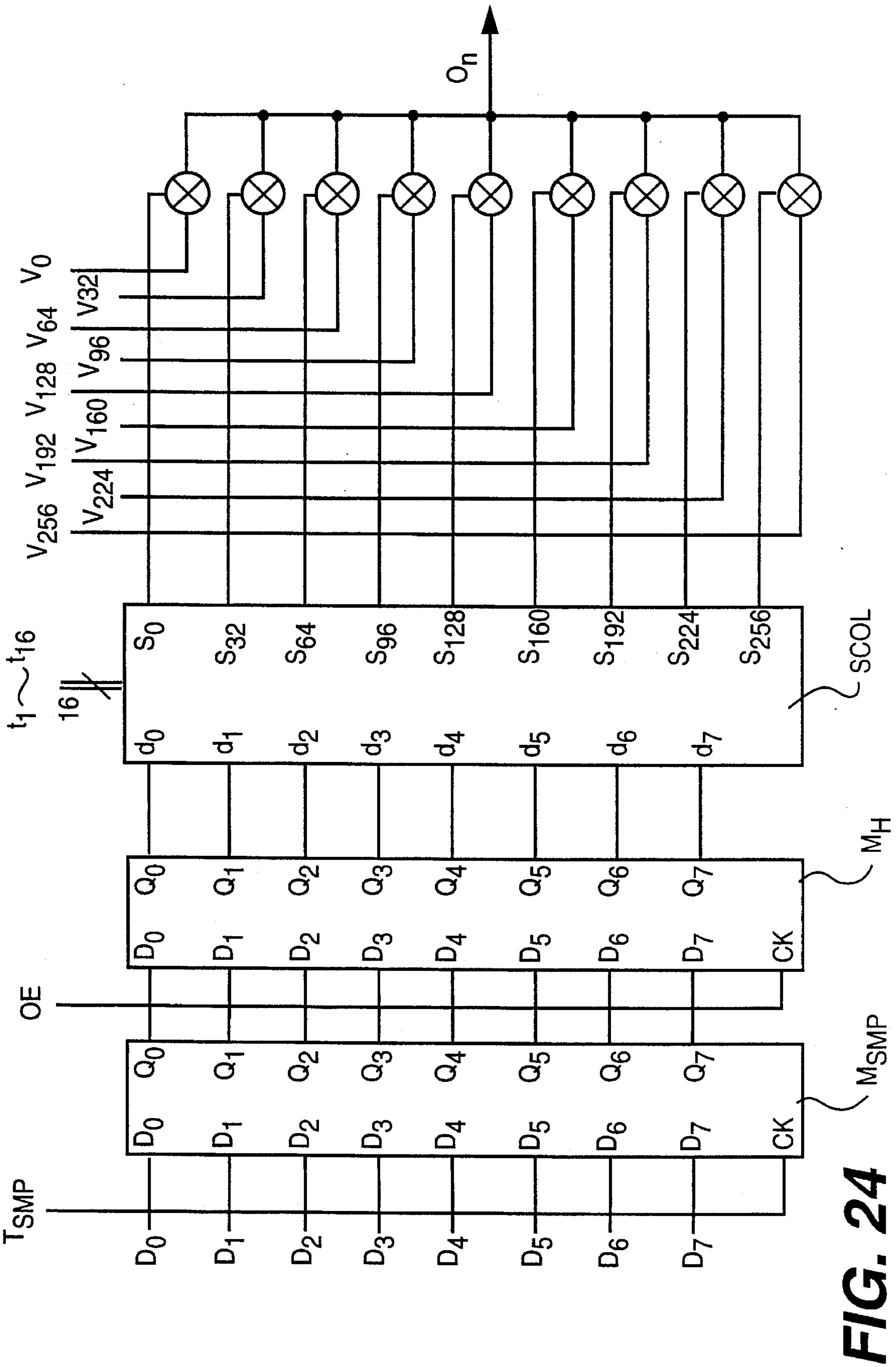
FIG. 24 shows a circuit for one output of the source driver in Example 7.

FIG. 24 shows a circuit for one output of the source driver 101 in the drive circuit. Digital video data input to the drive circuit consists of eight bits.

Figure 25:
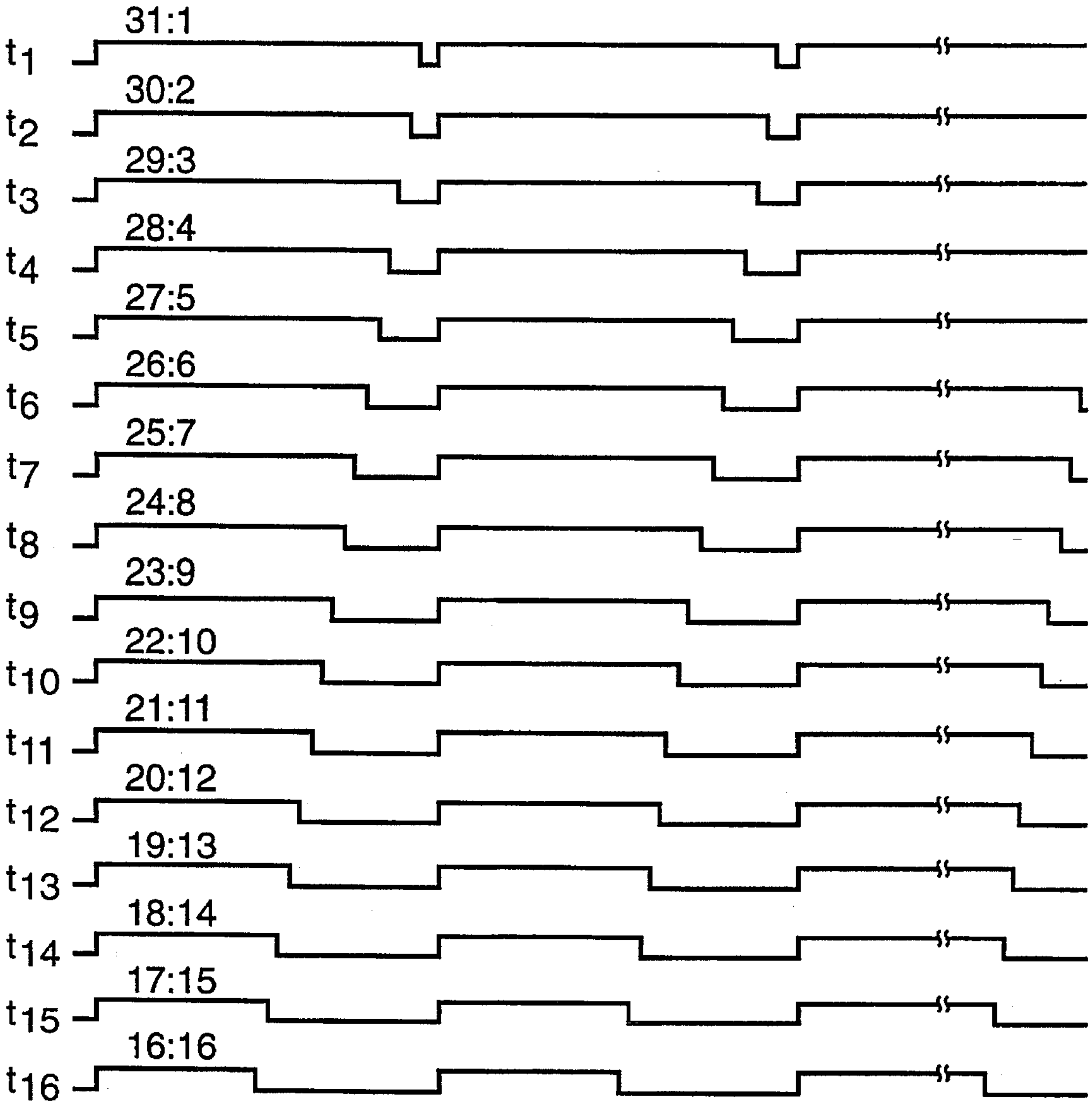
FIG. 25 shows waveforms of clock signals applied to the source driver in Example 7.

As shown in FIG. 24, sixteen distinct signals $t_1$ to $t_{16}$ are applied to the selective control circuit in the source driver. FIG. 25 shows waveforms of these signals. In this example, duty ratios of the signals $t_1$ to $t_{16}$ are set to 31:1, 30:2, 29:3, 28:4, 27:5, 26:6, 25:7, 24:8, 23:9, 22:10, 21:11, 20:12, 19:13, 18:14, 17:15 and 16:16, respectively.

According to a logic table like Table 6, a plurality of complement voltages can be obtained.

Table 7 teaches that 248 complement voltages can be obtained from nine given voltages, thereby the source driver capable of driving a display apparatus with 256 gradation levels is realized.

TABLE 7

| Value of lower five bits (Decimal numbers) | Complement voltages |
|---|---|
| 1 | $\frac{31V_{32n} + V_{32(n+1)}}{32}$ |
| 2 | $\frac{30V_{32n} + 2V_{32(n+1)}}{32}$ |
| 3 | $\frac{29V_{32n} + 3V_{32(n+1)}}{32}$ |
| 4 | $\frac{28V_{32n} + 4V_{32(n+1)}}{32}$ |
| 5 | $\frac{27V_{32n} + 5V_{32(n+1)}}{32}$ |
| 6 | $\frac{26V_{32n} + 6V_{32(n+1)}}{32}$ |
| 7 | $\frac{25V_{32n} + 7V_{32(n+1)}}{32}$ |
| 8 | $\frac{24V_{32n} + 8V_{32(n+1)}}{32}$ |
| 9 | $\frac{23V_{32n} + 9V_{32(n+1)}}{32}$ |

TABLE 7-continued

| Value of lower five bits (Decimal numbers) | Complement voltages |
|---|---|
| 10 | $\frac{22V_{32n} + 10V_{32(n+1)}}{32}$ |
| 11 | $\frac{21V_{32n} + 11V_{32(n+1)}}{32}$ |
| 12 | $\frac{20V_{32n} + 12V_{32(n+1)}}{32}$ |
| 13 | $\frac{19V_{32n} + 13V_{32(n+1)}}{32}$ |
| 14 | $\frac{18V_{32n} + 14V_{32(n+1)}}{32}$ |
| 15 | $\frac{17V_{32n} + 15V_{32(n+1)}}{32}$ |
| 16 | $\frac{16V_{32n} + 16V_{32(n+1)}}{32}$ |
| 17 | $\frac{15V_{32n} + 17V_{32(n+1)}}{32}$ |
| 18 | $\frac{14V_{32n} + 18V_{32(n+1)}}{32}$ |
| 19 | $\frac{13V_{32n} + 19V_{32(n+1)}}{32}$ |
| 20 | $\frac{12V_{32n} + 20V_{32(n+1)}}{32}$ |
| 21 | $\frac{11V_{32n} + 21V_{32(n+1)}}{32}$ |
| 22 | $\frac{10V_{32n} + 22V_{32(n+1)}}{32}$ |
| 23 | $\frac{9V_{32n} + 23V_{32(n+1)}}{32}$ |
| 24 | $\frac{8V_{32n} + 24V_{32(n+1)}}{32}$ |
| 25 | $\frac{7V_{32n} + 25V_{32(n+1)}}{32}$ |
| 26 | $\frac{6V_{32n} + 26V_{32(n+1)}}{32}$ |
| 27 | $\frac{5V_{32n} + 27V_{32(n+1)}}{32}$ |
| 28 | $\frac{4V_{32n} + 28V_{32(n+1)}}{32}$ |
| 29 | $\frac{3V_{32n} + 29V_{32(n+1)}}{32}$ |
| 30 | $\frac{2V_{32n} + 30V_{32(n+1)}}{32}$ |
| 31 | $\frac{V_{32n} + 31V_{32(n+1)}}{32}$ |

EXAMPLE 8

Figure 26:
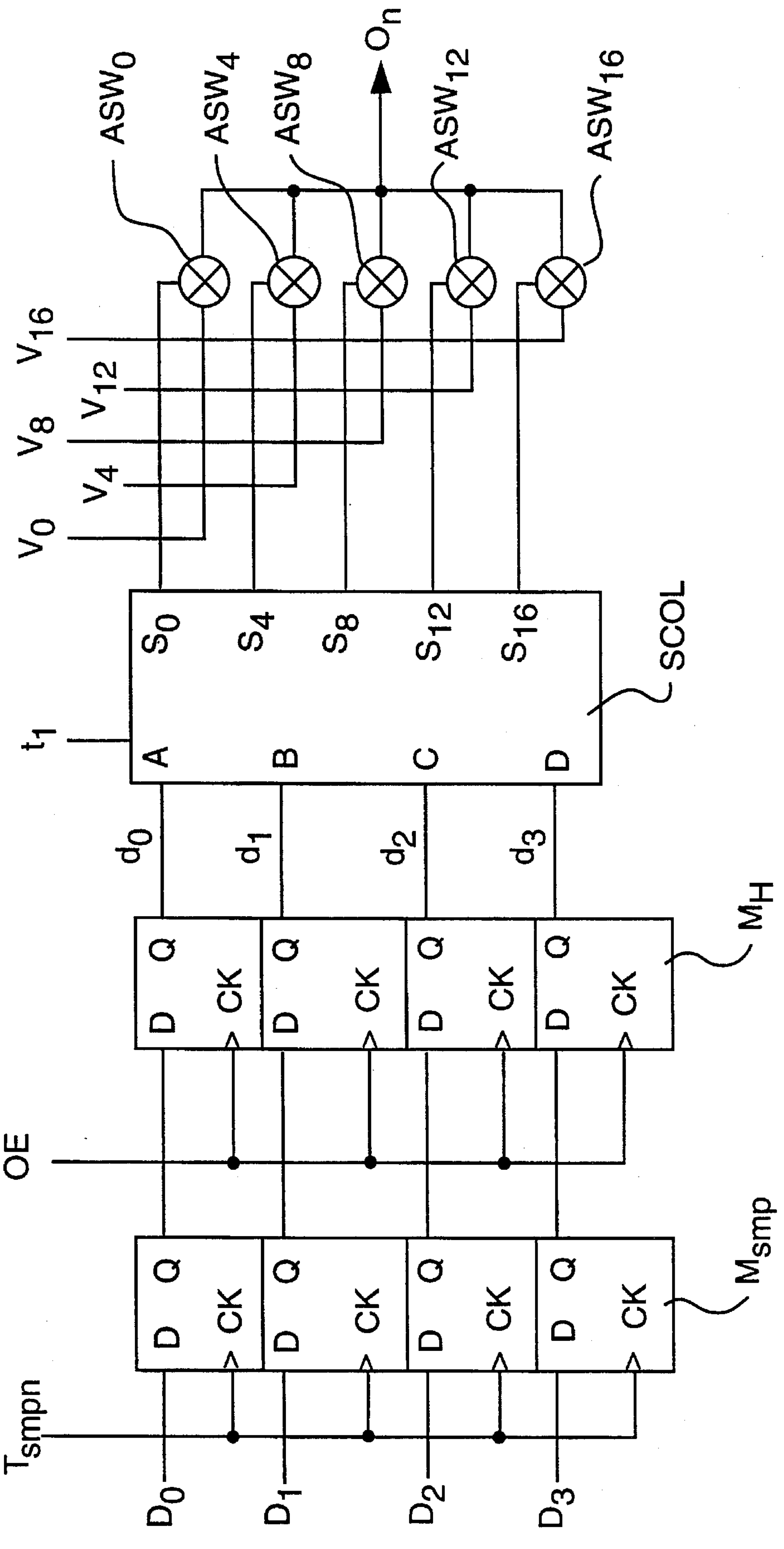
FIG. 26 shows a circuit for one output of the source driver in Example 8.

FIG. 26 shows a circuit for one output of the source driver 101 in the drive circuit. Digital video data input to the drive circuit consists of four bits ($D_3$, $D_2$, $D_1$, $D_0$).

As shown in FIG. 26, one signal $t_1$ is applied to the selective control circuit SCOL in the source driver. In this example, a duty ratio of the signal is set to 1:1.

Figure 27:
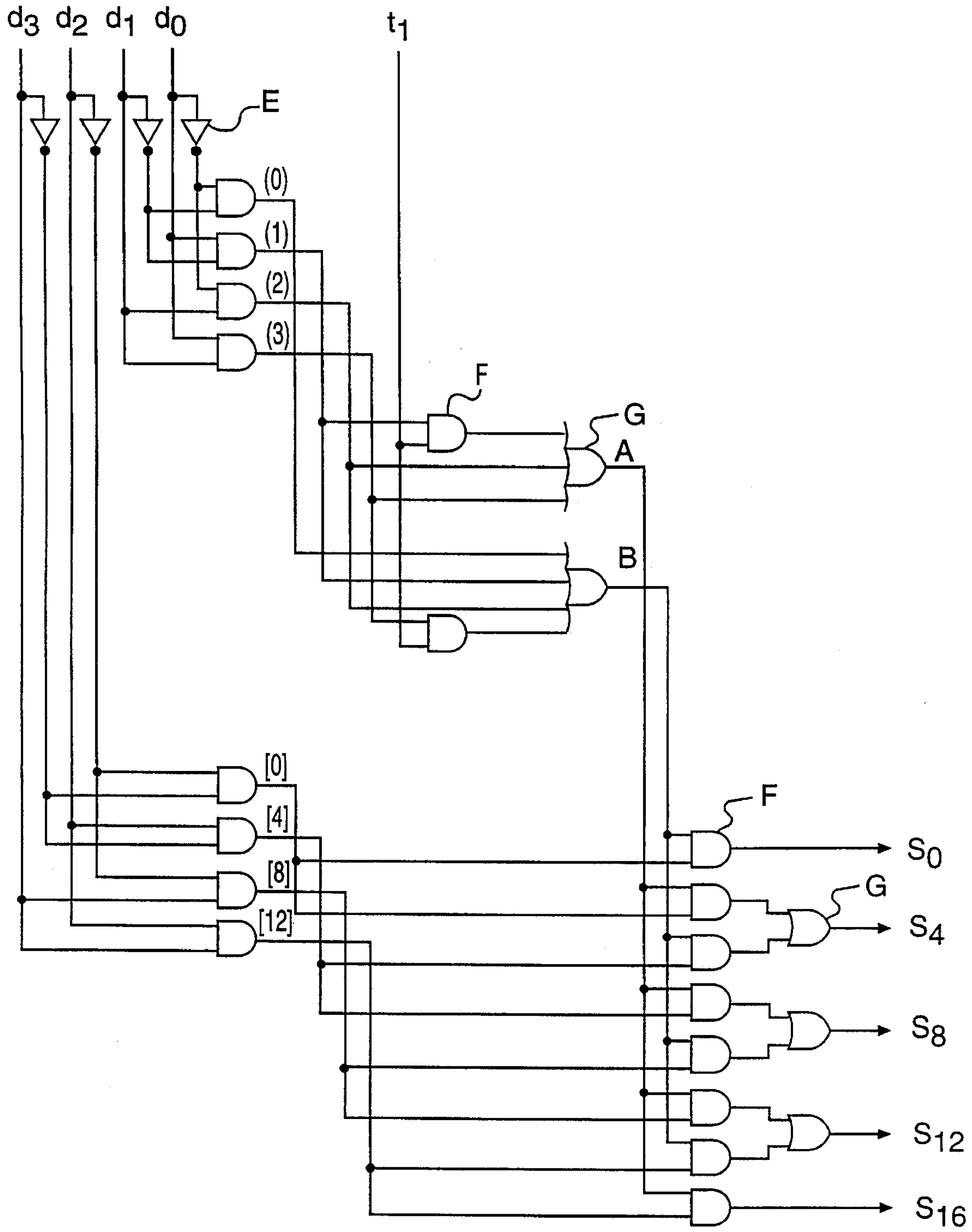
FIG. 27 shows a logic circuit for the selective control circuit in Example 8.

FIG. 27 shows a logic circuit for the selective control circuit SCOL.

Table 8 is a logic table which defines an operation of the selective control circuit SCOL.

TABLE 8

| Decimal Numbers | $d_3$ | $d_2$ | $d_1$ | $d_0$ | $S_0$ | $S_4$ | $S_8$ | $S_{12}$ | $S_{16}$ |
|---|---|---|---|---|---|---|---|---|---|
| 0 | 0 | 0 | 0 | 0 | 1 | | | | |
| 1 | 0 | 0 | 0 | 1 | 1 | $t_1$ | | | |
| 2 | 0 | 0 | 1 | 0 | 1 | 1 | | | |
| 3 | 0 | 0 | 1 | 1 | $t_1$ | 1 | | | |
| 4 | 0 | 1 | 0 | 0 | | 1 | | | |
| 5 | 0 | 1 | 0 | 1 | | 1 | $t_1$ | | |
| 6 | 0 | 1 | 1 | 0 | | 1 | 1 | | |
| 7 | 0 | 1 | 1 | 1 | | $t_1$ | 1 | | |
| 8 | 1 | 0 | 0 | 0 | | | 1 | | |
| 9 | 1 | 0 | 0 | 1 | | | 1 | $t_1$ | |
| 10 | 1 | 0 | 1 | 0 | | | 1 | 1 | |
| 11 | 1 | 0 | 1 | 1 | | | $t_1$ | 1 | |
| 12 | 1 | 1 | 0 | 0 | | | | 1 | |
| 13 | 1 | 1 | 0 | 1 | | | | 1 | $t_1$ |
| 14 | 1 | 1 | 1 | 0 | | | | 1 | 1 |
| 15 | 1 | 1 | 1 | 1 | | | | $t_1$ | 1 |

As shown in Table 8, the left column shows the value of digital video data input to the source driver in decimal notation. The center column shows data ($d_3$, $d_2$, $d_1$, $d_0$) input to the selective control circuit SCOL in binary notation. The right column shows control signals output from output terminals of the selective control circuit SCOL. In the table, $t_1$ represents that if the signal $t_1$ is "1", then the control signal is "1", else the control signals is "0".

In FIG. 26, analog switches $ASW_0$ to $ASW_{16}$ are "on" when the corresponding control signals are "1".

FIG. 27 shows a logic circuit for the selective control circuit SCOL. The logic circuit is provided from the following logic expressions which are derived from Table 8.

$S_0$=[0] A $S_4$=[0] B+[4] A $S_8$=[4] B+[8] A $S_{12}$=[8] B+[12] A $S_{16}$=[12] B

[0]=$\bar{d}_3 \cdot \bar{d}_2$ [4]=$\bar{d}_3 \cdot d_2$

[8]=$d_3 \cdot \bar{d}_2$ [12]=$d_3 d_2$

A=(0)+(1)+(2)+(30)t

B=(1)t+(2)+(3)

(0)=$\bar{d}_1 \cdot \bar{d}_0$ (1)=$\bar{d}_1 \cdot d_0$ (2)=$d_1 \cdot d_0$ (3)=$d_1 \cdot d_0$ A minimization is not considered regarding the logic circuit as shown in FIG. 27. However, since a plurality of selective control circuits SCOLs are required, the number being equal to the number of outputs of the source driver, it is required to minimize the logic circuit as possible.

As shown in Table 8, when the digital video data is 0 ($d_0$=$d_1$=$d_2$=$d_3$ "0"), the corresponding analog switch $ASW_0$ is "on" according to a control signal output from the output terminal $S_0$ of the selective control circuit SCOL, thereby the voltage $V_0$ which is supplied to the analog switch $ASW_0$ is output to the source line. In the same way, when the digital video data is 4 ($d_0$=$d_1$=$d_3$="0", $d_2$="1"), 8 ($d_0$=$d_1$=$d_2$="1", $d_3$="0"), and 12 ($d_0$=$d_1$="0", $d_2$=$d_3$="1"), the voltages $V_4$, $V_8$, and $V_{12}$ respectively are output.

Figure 28:
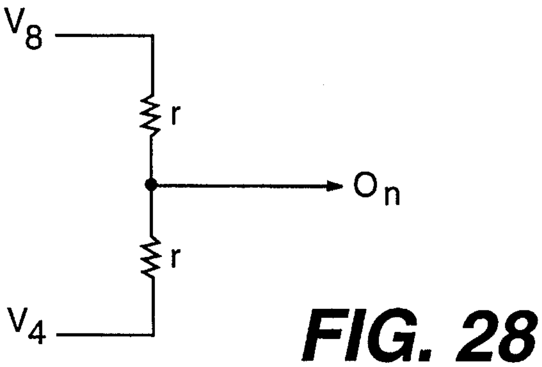
FIG. 28 shows an equivalent circuit of the source driver.

When the digital video data is 6 ($d_0$=$d_3$="0", $d_1$=$d_2$="1"), The corresponding analog switches $ASW_4$ and $ASW_8$ are "on" at the same time according to control signals output from the output terminals $S_4$ and $S_8$. FIG. 28 shows an equivalent circuit from the output terminals $S_4$ and $S_8$ to the output terminal of the drive circuit under the condition that each resistance of the analog switches $ASW_4$ and $ASW_8$ is equal to r.

Referring to FIG. 28, it is understood that the voltage applied To the source line $0_n$ is $(V_4+V_8)/2$.

In the same way, when the digital video data are 2($d_1$="1", $d_1$=$d_2$=$d_3$"0"), 10($d_0$=$d_2$="0", $d_1$=$d_3$="1"), and 14($d_0$="0", $d_1$=$d_2$=$d_3$="0"), the voltages $(V_0+V_4)/2$, $(V_8+V_{12})/2$ and $(V_{12}+V_{16})/2$ respectively are output.

When the digital video data is 5 ($d_0$=$d_2$"1", $d_1$=$d_3$="0"), the corresponding analog switch $ASW_4$ is "on" according to a control signal output from the output terminal $S_4$, and the corresponding analog switch $ASW_8$ is "on" according to a control signal which is changed based on the signal $t_7$ output from the output terminal $S_8$. Thus, in this case, there exists some time when both of the analog switches $ASW_4$ and $ASW_8$ are "on" thereby the voltage $(V_4+V_8)/2$ is output, and other time when the only $analog_9$ switch $ASW_4$ is "on", thereby the voltage $V_4$ is output. The control signal may be changed at least once during one output period of time.

Figure 29:
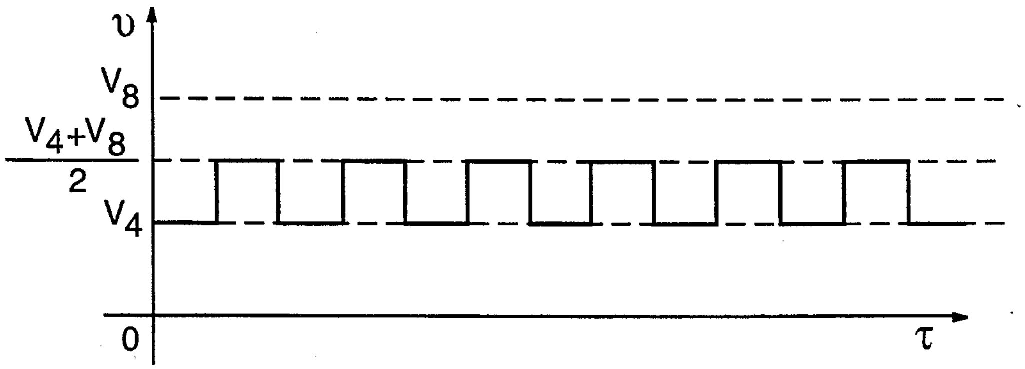
FIG. 29 shows waveforms of voltages output from the source driver in Example 8.

FIG. 29 shows an oscillating voltage output to the source line when the data video data is 5($d_0$=$d_2$="1", $d_1$=$d_3$="0"). The oscillating voltage oscillates between the voltage $V_4$ and $(V_4+V_8)/2$ and a mean value of the oscillating voltage is $\{V_4+(V_4+V_8)/2\}/2=(3\ V_4+V_8)/4$. Since the oscillating voltage is passed through the low-pass filter discussed above, the mean value of the oscillating voltage is obtained at the point B in FIG. 30.

In the same way, when the digital video data are 1($d_0$="1", $d_1$=$d_2$=$d_3$="1"), mean values of the oscillating voltages output to the source line are $(3\ V_0+V_4)/4$, $(3\ V_8+V_{12})/4$, and $(3\ V_{12}+V_{16})/4$ respectivel When the digital video data is 7($d_0$=$d_1$=$d_2$"1", $d_3$="0"), the corresponding analog switch $ASW_4$ is "on" according to a control signal which is changed based on the signal $t_1$ output from the output terminal $S_4$, and the corresponding analog switch $ASW_8$ is "on" according to a control signal output from the output terminal $S_8$. Thus, in this case, there exists some time when both of the analog switches $ASW_4$ and $ASW_8$ are "on", thereby the voltage $(V_4+V_8)/2$ is output, and the other time when the only analog switch $ASW_8$ is "on", thereby the voltage $V_8$ is output. The control signal may be changed at least once during one output period of time.

An oscillating voltage output to the source line oscillates between the voltages $(V_4+V_8)/2$ and $V_8$, and a mean value of the oscillating voltage is $\{(V_4+V_8)/2+V_8\}/2+V_4+3\ V_8)/4$.

Figure 30:
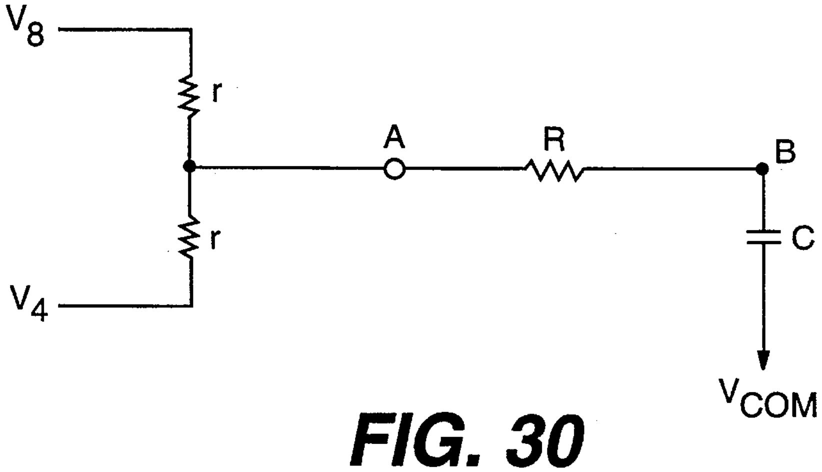
FIG. 30 shows an equivalent circuit of the display apparatus.

Since the oscillating voltage is passed through the low-pass filter discussed above, the mean value of the oscillating voltage is obtained at the point B in FIG. 30.

In the same way, when the digital video data are 3($d_0$=$d_1$="1", $d_2$=$d_3$="0"), 11($d_0$=$d_1$=$d_3$"1", $d_2$="0"), and 15($d_0$=$d_1$=$d_2$=$d_3$"1"), mean values of the oscillating voltages output to the source line are $(V_0+3\ V_4)/4$ , $(V_8+3\ V_{12})/4$, and $(V_{12}+3\ V_{16})/4$ respectively.

Table 9 shows a relationship between digital video data and obtained voltages.

TABLE 9

| Decimal Numbers | $d_3$ | $d_2$ | $d_1$ | $d_0$ | Voltages (FIG. 26) | Voltages (FIG. 52) |
|---|---|---|---|---|---|---|
| 0 | 0 | 0 | 0 | 0 | $V_0$ | $V_0$ |
| 1 | 0 | 0 | 0 | 1 | $\frac{3V_0+V_4}{4}$ | $V_1$ |
| 2 | 0 | 0 | 1 | 0 | $\frac{V_0+V_4}{2}$ | $V_2$ |
| 3 | 0 | 0 | 1 | 1 | $\frac{V_0+3V_4}{4}$ | $V_3$ |
| 4 | 0 | 1 | 0 | 0 | $V_4$ | $V_4$ |
| 5 | 0 | 1 | 0 | 1 | $\frac{3V_4+V_8}{4}$ | $V_5$ |
| 6 | 0 | 1 | 1 | 0 | $\frac{V_4+V_8}{2}$ | $V_6$ |
| 7 | 0 | 1 | 1 | 1 | $\frac{V_4+3V_8}{4}$ | $V_7$ |
| 8 | 1 | 0 | 0 | 0 | $V_8$ | $V_8$ |
| 9 | 1 | 0 | 0 | 1 | $\frac{3V_8+V_{12}}{4}$ | $V_9$ |
| 10 | 1 | 0 | 1 | 0 | $\frac{V_8+V_{12}}{2}$ | $V_{10}$ |
| 11 | 1 | 0 | 1 | 1 | $\frac{V_8+3V_{12}}{4}$ | $V_{11}$ |
| 12 | 1 | 1 | 0 | 0 | $V_{12}$ | $V_{12}$ |
| 13 | 1 | 1 | 0 | 1 | $\frac{3V_{12}+V_{16}}{4}$ | $V_{13}$ |
| 14 | 1 | 1 | 1 | 0 | $\frac{V_{12}+V_{16}}{2}$ | $V_{14}$ |
| 15 | 1 | 1 | 1 | 1 | $\frac{V_{12}+3V_{16}}{4}$ | $V_{15}$ |

Figure 52:
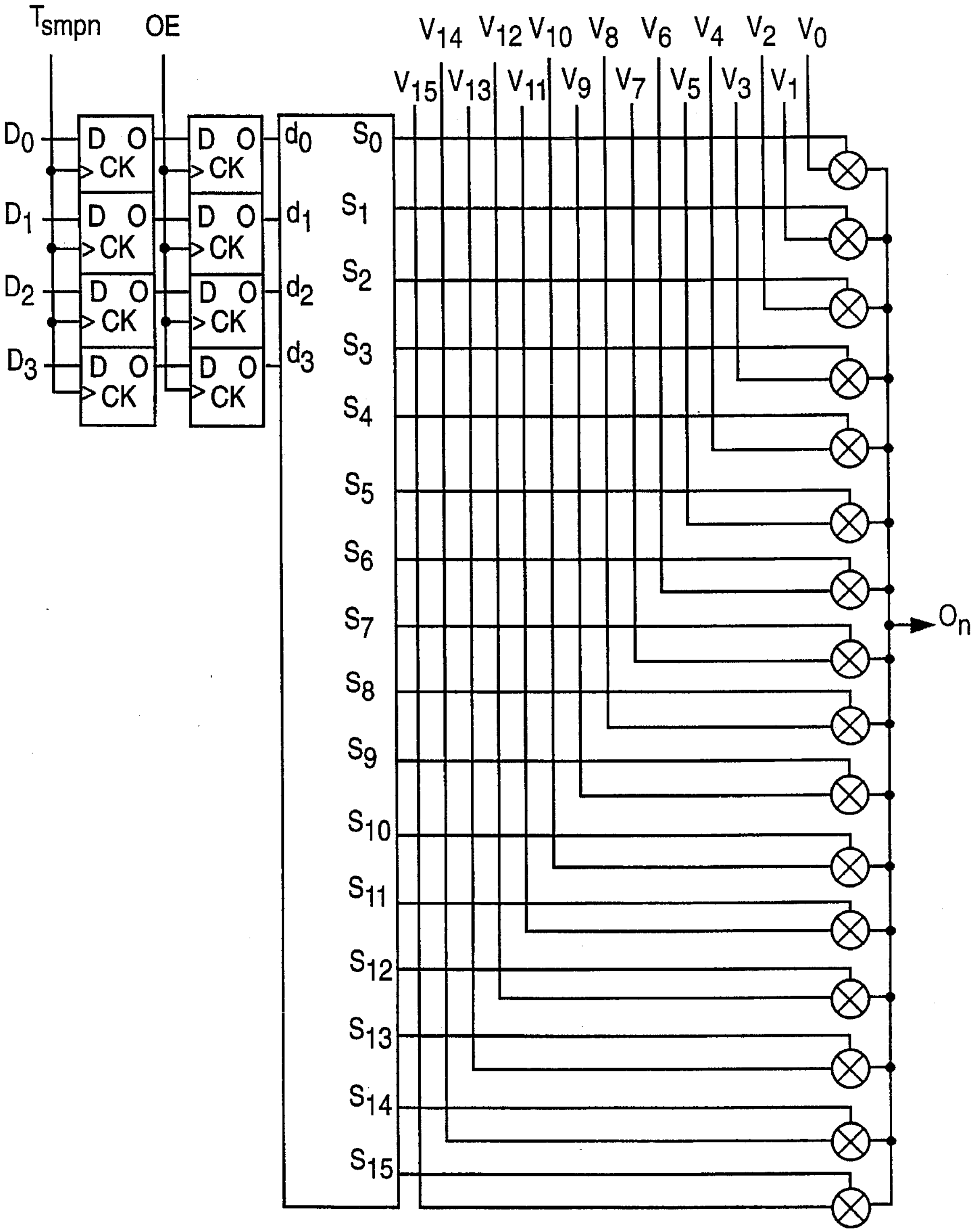
FIG. 52 PRIOR ART
FIG. 52 shows a circuit for one output of a digital source driver in the prior art.

Table 9 teaches that twelve complement voltages can be obtained from four given voltages, compared to the prior art as shown in FIG. 52, which requires sixteen voltages. Thus, according to this invention, it is possible to reduce the number of external sources for supplying voltages.

For example, when the digital video data consists of four bits, the prior art as shown in FIG. 52 requires sixteen external sources for supplying voltages. On the other hand, according to this invention, the circuit requires only five external sources for supplying voltages. Thus, the number of external sources for supplying voltages can be reduced from 16 in the prior art to 5 in this invention.

When the digital video data consists of five bits, the number if external sources for supplying voltages can be reduced from 32 in the prior art to 9 in this invention.

When the digital video data consists of six bits, the number of external sources for supplying voltages can be reduced from 64 in the prior art to 17 in this invention. In the illustrated embodiment, the duty ratio of the signal $t_1$ is set to 1:1, however, any duty ratio is available. It is possible to adjust the value of complement voltages by changing the duty ratio.

EXAMPLE 9

Figure 31:
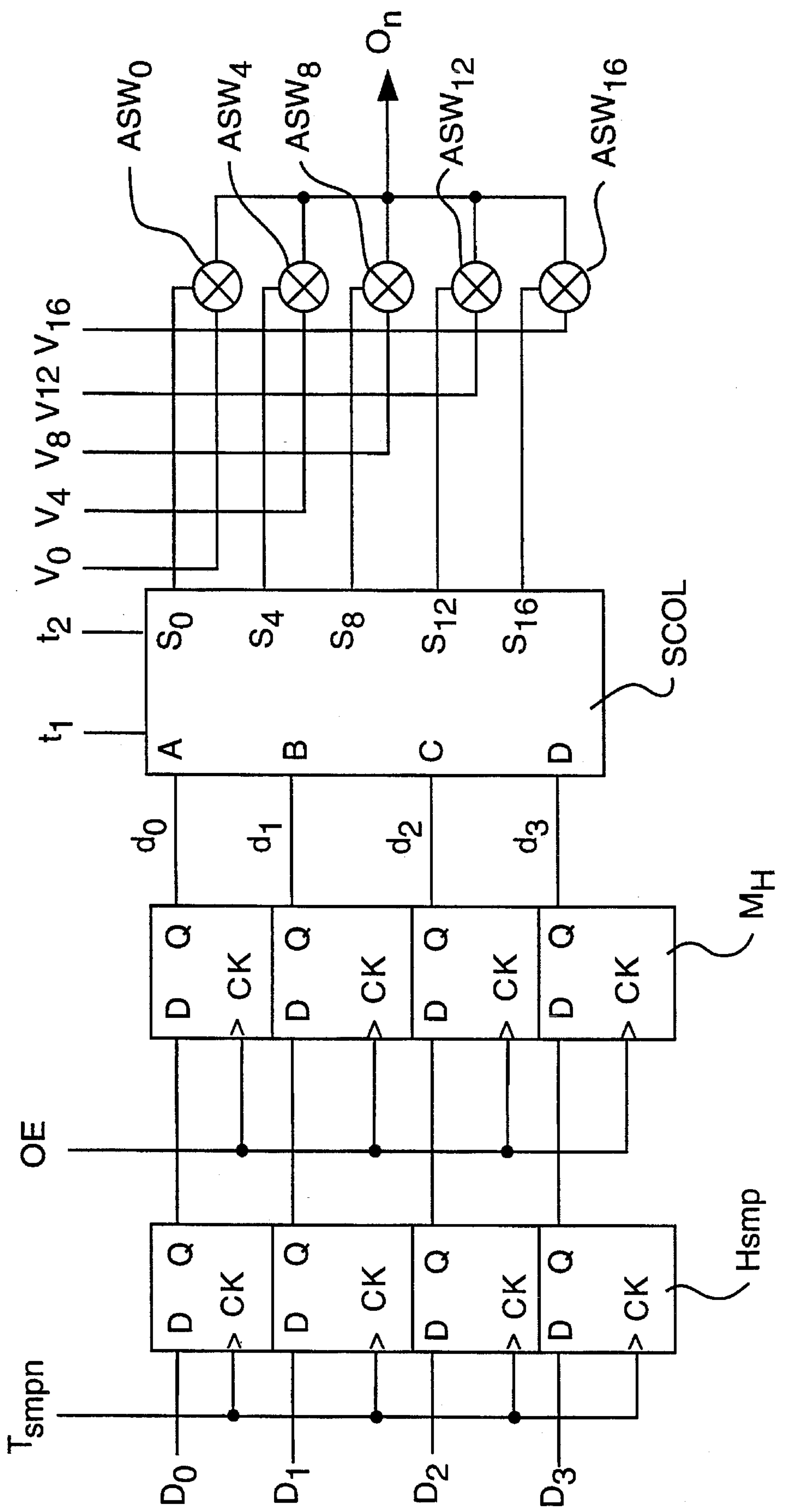
FIG. 31 shows a circuit for one output of the source driver in Example 9.

FIG. 31 shows a circuit for one output of the source driver 101 in the drive circuit. Digital video data input to the drive circuit consists of four bits.

As shown in FIG. 31, two distinct signals $t_1$ and $t_2$ are applied to selective control circuit SCOL in the source driver.

Figure 33:
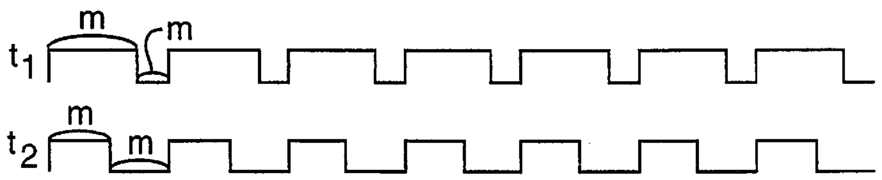
FIG. 33 shows waveforms of clock signals applied to the source driver in Example 9.

FIG. 33 shows waveforms of the signals $t_1$ and $t_2$. In this Example, duty ratios of the signals $t_1$ and $t_2$ are set to 3:1 and 1:1 respectively.

Table 10 shows a logic table which defines an operation of the selective control circuit SCOL in the drive circuit.

TABLE 10

| decimal numbers | $d_3$ | $d_2$ | $d_1$ | $d_0$ | $S_0$ | $S_4$ | $S_8$ | $S_{12}$ | $S_{16}$ |
|---|---|---|---|---|---|---|---|---|---|
| 0 | 0 | 0 | 0 | 0 | 1 | | | | |
| 1 | 0 | 0 | 0 | 1 | t1 | $\overline{t1}$ | | | |
| 2 | 0 | 0 | 1 | 0 | t2 | $\overline{t2}$ | | | |
| 3 | 0 | 0 | 1 | 1 | $\overline{t1}$ | t1 | | | |
| 4 | 0 | 1 | 0 | 0 | | 1 | | | |
| 5 | 0 | 1 | 0 | 1 | | t1 | $\overline{t1}$ | | |
| 6 | 0 | 1 | 1 | 0 | | t2 | $\overline{t2}$ | | |
| 7 | 0 | 1 | 1 | 1 | | $\overline{t1}$ | t1 | | |
| 8 | 1 | 0 | 0 | 0 | | | 1 | | |
| 9 | 1 | 0 | 0 | 1 | | | t1 | $\overline{t1}$ | |
| 10 | 1 | 0 | 1 | 0 | | | t2 | $\overline{t2}$ | |
| 11 | 1 | 0 | 1 | 1 | | | $\overline{t1}$ | t1 | |
| 12 | 1 | 1 | 0 | 0 | | | | 1 | |
| 13 | 1 | 1 | 0 | 1 | | | | t1 | $\overline{t1}$ |
| 14 | 1 | 1 | 1 | 0 | | | | t2 | $\overline{t2}$ |
| 15 | 1 | 1 | 1 | 1 | | | | $\overline{t1}$ | t1 |

As shown in Table 10, the left column shows the value of digital video data input to the source driver in decimal notation. The center column shows data ($d_3$, $d_2$, $d_1$, $d_0$) input to the selective control circuit SCOL in binary notaton. The right column shows control signals output from output terminals of the selective control circuit SCOL. In the table, $t_1$ represents that if the signal $t_1$ is "1", then the control signal is "1", else the control signal is "0". Similarly, $t_2$ represents that if the signal $t_2$ is "1", then the control signal is "1", else the control signal is "0". The blanks represent that the control signal is "0".

In FIG. 31, analog switches $ASW_0$ to $ASW_{16}$ are "on" when the corresponding control signals are "1".

Figure 32:
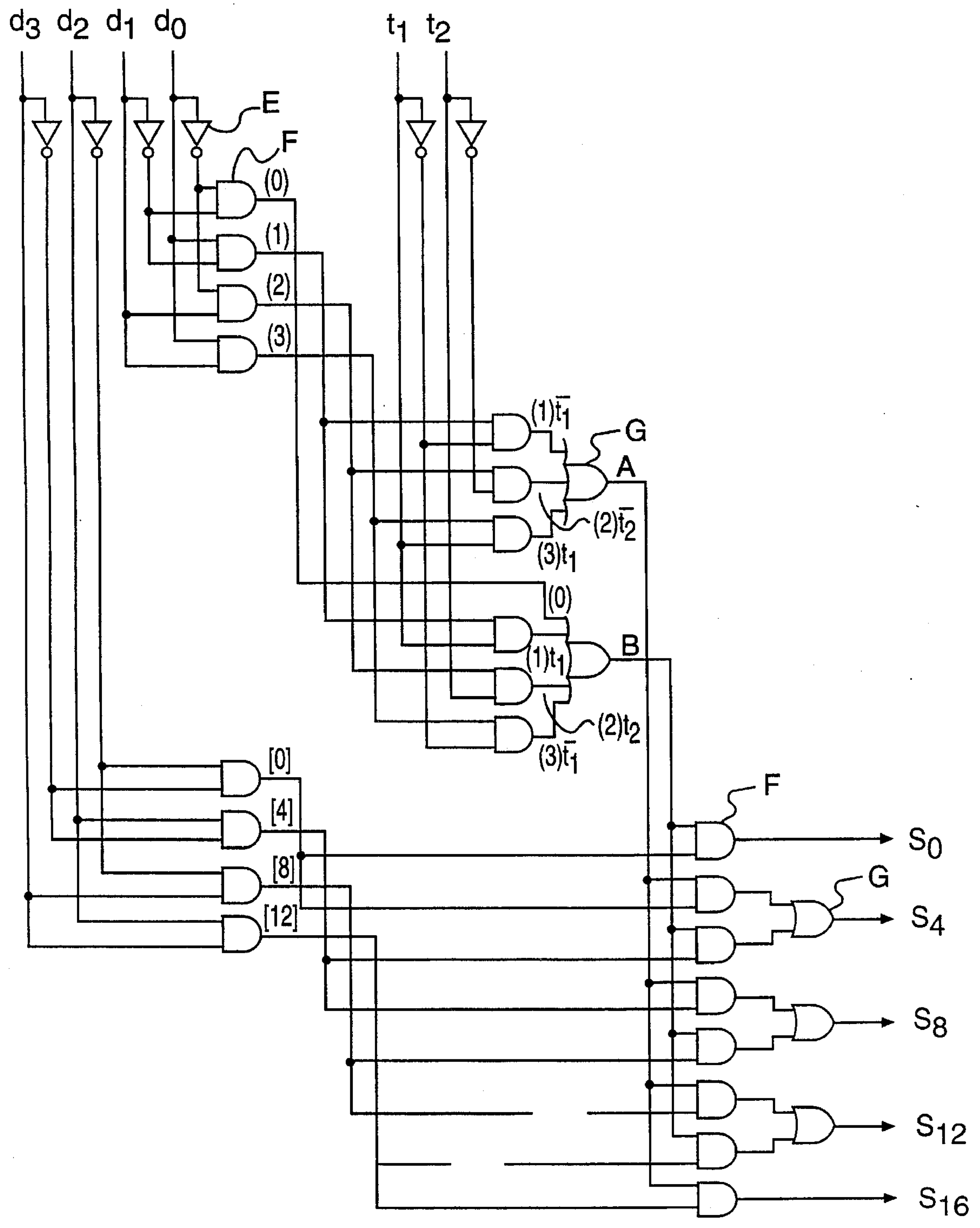
FIG. 32 shows a logic circuit for the selective control circuit in Example 9.

FIG. 32 shows a logic circuit for the selective control circuit SCOL. The logic circuit is provided from the following logic expressions which are derived from Table 10.

$S_0=[0]\cdot B$ $S_4=[0]\cdot A+[4]\cdot B$ $S_8=[4]\cdot A+[8]\cdot B$ $S_{12}=[8]\cdot A+[12\ ]\cdot B$ $S_{16}=[12]\cdot A$ $A=(1)\bar{t}_1+(2)\bar{t}_2+(3)t_1$ $B=(0)+(1)t_1+(2)t_2+(3)\bar{t}_1$ $(0)=\bar{d}_1\bar{d}_0$ $(1)=\bar{d}_1 d_0$ $(2)=d_1 d_0$ $(3)=d_1 d_0$ $[0]=d_{\bar{d}3}d_2$ $[4]=d_3 d_2$ $[8]=d_3\bar{d}_2$ $[12]=d_3 d_2$ A minimization is not considered regarding the logic circuit as shown in FIG. 31. However, since a plurality of selective control circuits SCOLs are required, the number being equal to the number of outputs of the source driver, it is required to minimize the logical circuit as possible.

As shown in Table 10, when the digital video data is 0, the analog switch $ASW_0$ is "on" according to a control signal output from the output terminal $S_0$ of the selective control circuit SCOL, thereby the voltage $V_0$ which is supplied to the analog switch $ASW_0$ is output to the source line. In the same way, when the digital video data are 4, 8 and 12, the voltages $V_4$, $V_8$ and $V_{12}$ respectively are output.

When the digital video data is 2, the analog switch $ASW_0$ is controlled to be "on" or "off" based on the signal $t_2$ and the analog switch $ASW_4$ is controlled to be "on" or "off" based on the signal $t_2$ (i.e., the inverted signal $t_2$). As a result, the analog switches $ASW_0$ and $ASW_4$ are controlled so that when one of the analog switches $ASW_0$ and $ASW_4$ are controlled so that when one of the analog switches $ASW_0$ and $ASW_4$ is "on", the other is "off".

In this Example, since the duty ratio of the signal $t_2$ is set to 1:1, a first period and a second period is repeated alternatively. The first period is a period when the analog switch $ASW_0$ is "on" and the analog switch $ASW_4$ is "off", and the second period is a period when the analog switch $ASW_0$ is "off" and the analog switch $ASW_4$ is "on", the duration of the first period being equal to that of the second period.

Figure 34A:
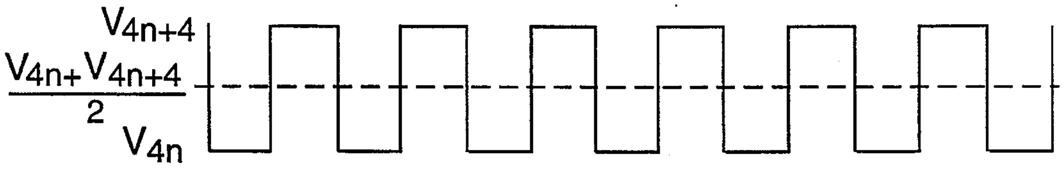
FIGS. 34A, 34B and 34C show waveforms of voltages output from the source driver in Example 9.

Thus, an oscillating voltage between the voltages $V_0$ and $V_4$ is output to the source line as shown in FIG. 34A.

Since the oscillating voltage is passed through the low-pass filter discussed above, a mean value of the oscillating voltage $(V_0+V_4\ )/2$ is applied to the pixel of the display apparatus.

In the same way, when the digital video data are 6, 10 and 14, mean values of the voltages output to the source line are $(V_4+V_8)/2$, $(V_8+V_{12})/2$, and $(V_{12}+V_{16})/2$, respectively. As a result, the voltage $(V_{4n}+V_{4n+4})/2$ is applied to the pixel of the display apparatus when the digital video data is 4n+2, wherein n=0, 1, 2 and 3.

When the digital data is 1, the analog switch $ASW_0$ is controlled to be "on" or "off" based on the signal $t_1$, and the analog switch $ASW_4$ is controlled to be "on" or "off" based on the signal $t_1$ (i.e., the inverted signal $t_1$). As a result, the analog switches $ASW_0$ and $ASW_4$ are controlled so that when one of the analog switches $ASW_0$ and $ASW_4$ is "on", the other is "off".

In this Example, since the duty ratio of the signal $t_1$ is set to 3:1, the first period and the second period mentioned above are repeated alternatingly, the length of the first period being three times that of the second period.

Figure 34B:
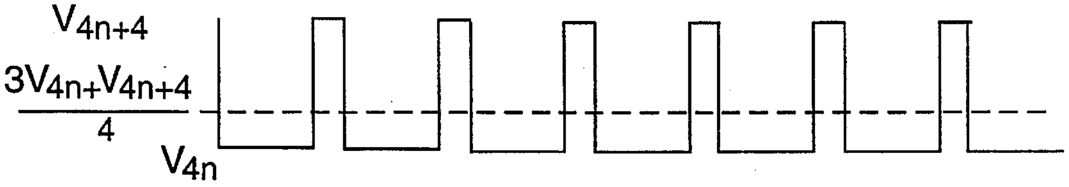

Thus, a voltage oscillating between the voltages $v_0$ and $v_4$ is output to the source line as shown in FIG. 34B.

Since the oscillating voltage is passed through the low-pass filter discussed above, a mean value of the oscillating voltage $(3\ V_0+V_4)/4$ is applied to the pixel of the display apparatus.

In the same way, when the digital video data are 5, 9 and 13, mean values of the voltages output to the source line are $(3\ V_4+V_8)/4$, $(3\ V_8+V_{12})/4$ and $(3\ V_{12}+V_{16})/4$ respectively. As a result, the voltage $(3\ V_{4n}+V_{4n+4})/4$ is applied to the pixel of the display apparatus when the digital data is 4n+1, wherein n=1, 2 and 3.

When the digital data is 3, the analog switch $ASW_0$ is controlled to be "on" or "off" based on the signal $\bar{t}_1$ (i.e., the inverted signal $t_1$), and the analog switch $ASW_4$ is controlled to be "on" or "off" based on the signal $t_1$. As a result, the analog switches $ASW_0$ and $ASW_4$ are controlled so that when one of the analog switches $ASW_0$ and $ASW_4$ is "on", the other is "off".

In this Example, since the duty ratio of the signal $t_1$ is set to 3:1, the first period and the second period mentioned above are repeated alternatingly, the length of the first period being one-third as that of the second period.

Figure 34C:
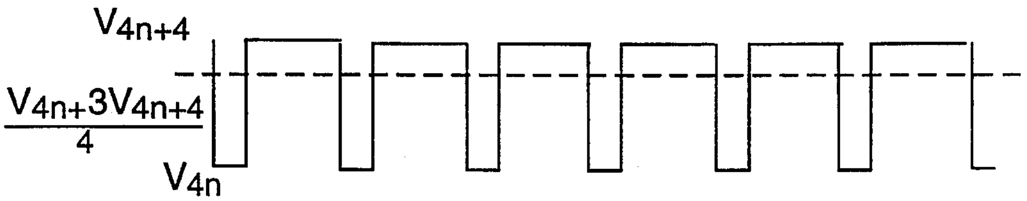

Thus, a voltage oscillating between the voltages $v_0$ and $V_4$ is output to the source line as shown in FIG. 34C.

Since the oscillating voltage is passed through the low-pass filter discussed above, a mean value of the oscillating voltage $(V_0+3V_4)/4$ is applied to the pixel of the display apparatus.

In the same way, when the digital video data are 7, 11 and 15, mean values of the voltages output to the source line are $(V_4+3\ V_8)/4$, $(V_8+3\ V_{12})/4$, and $(V_{12}+3\ V_{16})/4$ respectively. As a result, the voltage $(V_{4n}+3\ V_{4n+4})/4$ is applied to the pixel of the display apparatus when the digital data is 4n+3, wherein n=0, 1, 2 and 3.

Table 11 shows a relationship between digital video data and obtained voltages.

TABLE 11

| Decimal numbers | $d_3$ | $d_2$ | $d_1$ | $d_0$ | Voltages (FIG. 31) | Voltages (FIG. 52) |
|---|---|---|---|---|---|---|
| 0 | 0 | 0 | 0 | 0 | $V_0$ | $V_0$ |
| 1 | 0 | 0 | 0 | 1 | $\frac{3V_0+V_4}{4}$ | $V_1$ |
| 2 | 0 | 0 | 1 | 0 | $\frac{V_0+V_4}{2}$ | $V_2$ |
| 3 | 0 | 0 | 1 | 1 | $\frac{V_0+3V_4}{4}$ | $V_3$ |
| 4 | 0 | 1 | 0 | 0 | $V_4$ | $V_4$ |
| 5 | 0 | 1 | 0 | 1 | $\frac{3V_4+V_8}{4}$ | $V_5$ |
| 6 | 0 | 1 | 1 | 0 | $\frac{V_4+V_8}{2}$ | $V_6$ |
| 7 | 0 | 1 | 1 | 1 | $\frac{V_4+3V_8}{4}$ | $V_7$ |
| 8 | 1 | 0 | 0 | 0 | $V_8$ | $V_8$ |
| 9 | 1 | 0 | 0 | 1 | $\frac{3V_8+V_{12}}{4}$ | $V_9$ |
| 10 | 1 | 0 | 1 | 0 | $\frac{V_8+V_{12}}{2}$ | $V_{10}$ |
| 11 | 1 | 0 | 1 | 1 | $\frac{V_8+3V_{12}}{4}$ | $V_{11}$ |
| 12 | 1 | 1 | 0 | 0 | $V_{12}$ | $V_{12}$ |
| 13 | 1 | 1 | 0 | 1 | $\frac{3V_{12}+V_{16}}{4}$ | $V_{13}$ |
| 14 | 1 | 1 | 1 | 0 | $\frac{V_{12}+V_{16}}{2}$ | $V_{14}$ |
| 15 | 1 | 1 | 1 | 1 | $\frac{V_{12}+3V_{16}}{4}$ | $V_{15}$ |

Table 11 teaches that twelve complement voltages can be obtained from four given voltages. When the digital video data consists of four bits, the prior art as shown in FIG. 52 requires sixteen external sources for supplying voltages. On the other hand, the circuit according to this invention, requires only five external source for supplying voltages as shown in FIG. 31. Thus, the number of external sources for supplying voltages can be reduced from 16 in the prior art to 5 in this invention.

In the illustrated embodiment, the signals applied to the selective control circuit are described as being generated outside the selective control circuit. Of course, the signals can be generated in any circuits. However, since the source driver requires a plurality of selective control circuits SCOLs, it is not a good choice to generate the signals in each of the selective control circuits.

It is desired that the signals are generated in one common circuit of the LSI by which the drive circuit is composed, and applied to each of the selective control circuits. The clocks signals can be generated from sampling clocks input to the drive circuit and can alternatively be supplied from external sources.

When the clock signals are supplied from the external sources, it is possible to adjust the period of an oscillating voltage as desired with the demerit that the LSI requires one more input Terminal to receive the clock signals.

EXAMPLE 10

Figure 35:
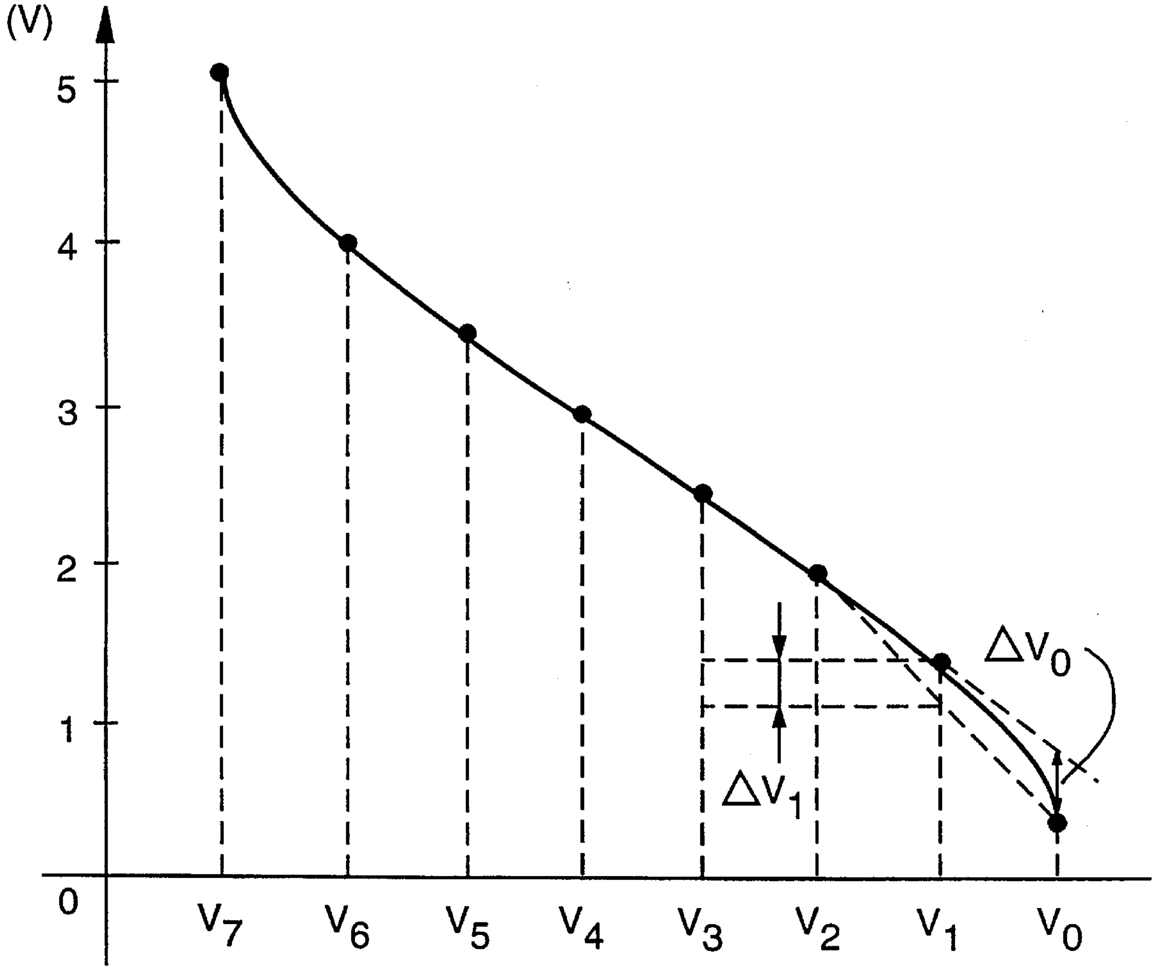
FIG. 35 shows a voltage characteristic for a display with multiple gradation levels.

FIG. 35 shows an example of the voltages $V_0$ to $V_7$ used to make a liquid crystal panel with eight gradation levels. FIG. 35 teaches the voltages have a linear characteristic from $V_1$ to $V_6$.

According to the drive circuit described in Example 4, the voltages $V_3$ and $V_5$ shown in FIG. 35 can be obtained. The voltage $V_7$ shown in FIG. 35 can also obtained by adjusting the voltage $V_7$ shown in Table 3 (Example 4).

However, there remains a problem regarding the voltage $V_1$ shown in FIG. 35. FIG. 35 teaches that the voltages have an non-linear characteristic from $V_0$ to $V_1$. If the voltages $V_0$ and $V_2$ are adjusted as shown in FIG. 35, the difference $\Delta V_1$ occurs between the obtained voltage and the desired voltage. If the voltages $V_2$ and $V_1$ are adjusted as shown in FIG. 32, the difference $\Delta V_0$ occurs between the obtained voltage and the desired voltage.

Figure 36:
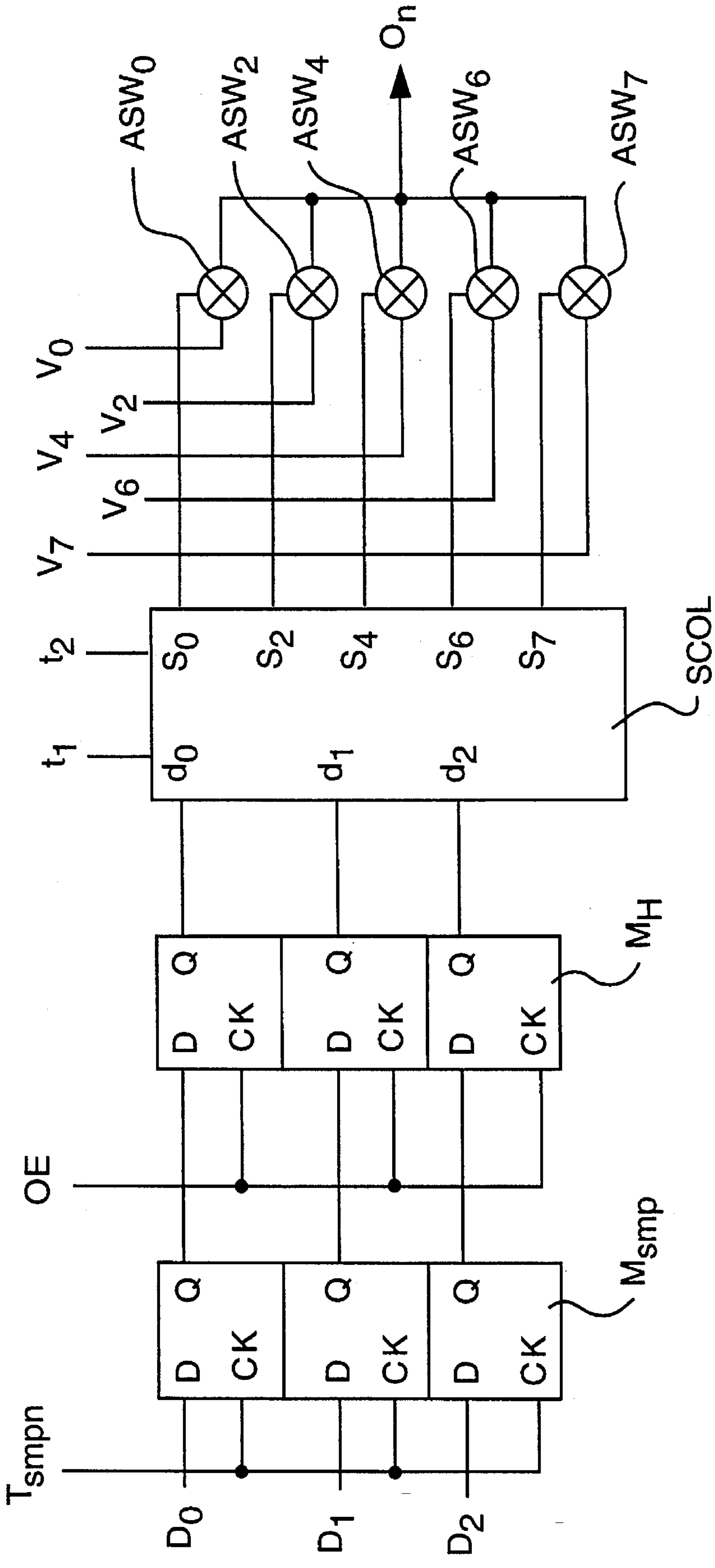
FIG. 36 shows a circuit for one output of the source driver in Example 10.

The drive circuit capable of providing an appropriate voltage regarding the portion of the non-linear characteristic shown in FIG. 35 is described in detail below:

FIG. 36 shows a circuit for one output of the source driver 101 in the drive circuit. Digital video data input to the drive circuit consists of three bits.

As shown in FIG. 36, two distinct signals $t_1$ and $t_2$ are applied to the selective control circuit in the source driver.

In this Example, the duty ratio of the signal $t_1$ is set to 1:1, and the duty ratio of the signal $t_2$ is set to 1:2. The signal $t_2$ is used to provide a voltage $V_1$.

Figures 37A, 37B:
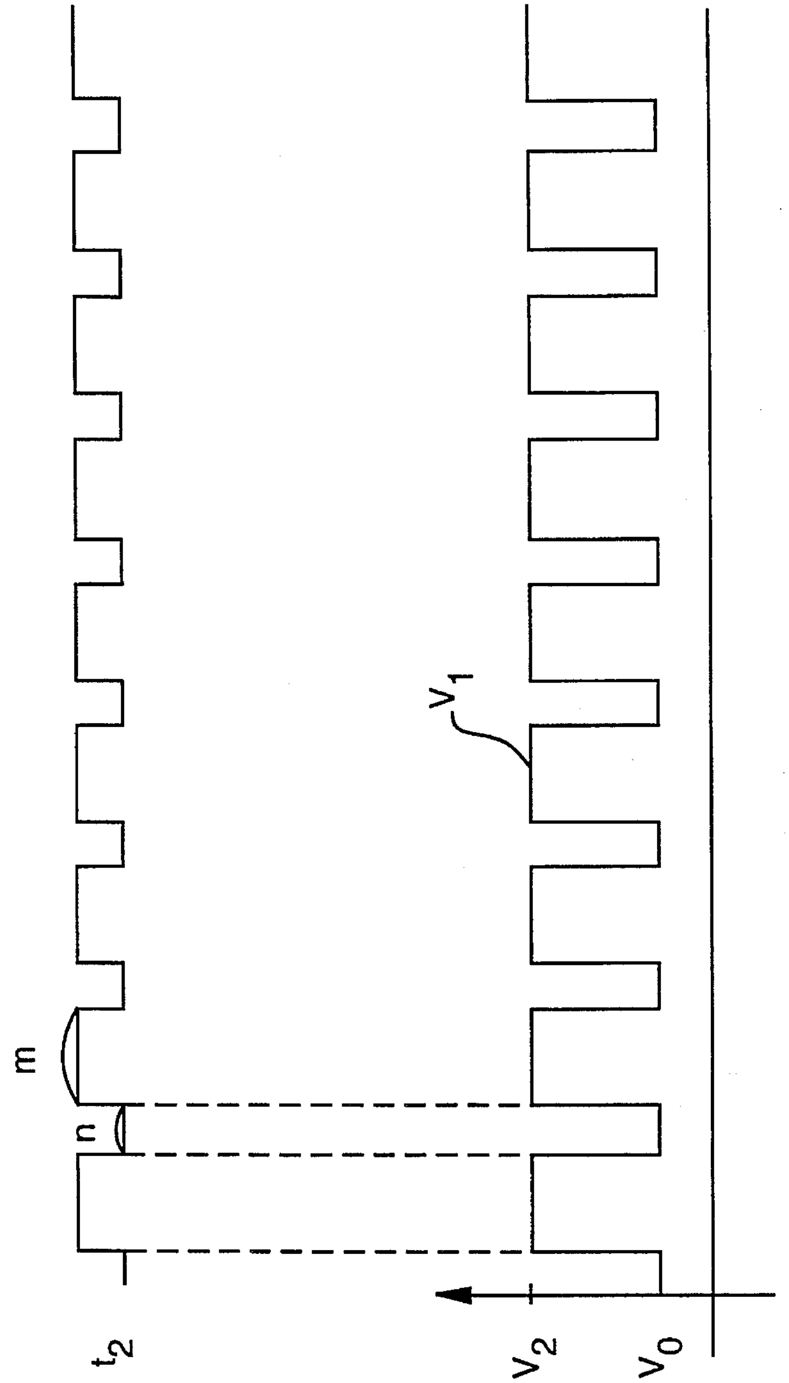
FIGS. 37A and 37B show a relationship between a clock signal applied to the source driver and a voltage output from the source driver in Example 10.

FIG. 37A shows a waveform of the signal $t_2$, and FIG. 37B shows a waveform of a voltage $V_1$ provided from the signal $t_2$.

As shown in FIG. 37B, the ratio of the voltages $V_0$ and $v_2$ is 1:2 corresponding to the duty ratio of the signal $t_2$. As a result, a mean value of the voltage $V_1$ is $(V_0+2\ V_2)/3$, which satisfies the condition of the voltage $V_1$ shown in FIG. 35.

Thus, the drive circuit mentioned above can provide an appropriate voltage regarding the portion of the non-linear characteristic shown in FIG. 35.

Table 12 shows a logic table which defines the operation of the selective control circuit.

TABLE 12

| $d_2$ | $d_1$ | $d_0$ | $S_0$ | $S_2$ | $S_4$ | $S_6$ | $S_7$ |
|---|---|---|---|---|---|---|---|
| 0 | 0 | 0 | 1 | | | | |
| 0 | 0 | 1 | $t_2$ | $\overline{t_2}$ | | | |
| 0 | 1 | 0 | | 1 | | | |
| 0 | 1 | 1 | | $t_1$ | $\overline{t_1}$ | | |
| 1 | 0 | 0 | | | 1 | | |
| 1 | 0 | 1 | | | $t_1$ | $\overline{t_1}$ | |
| 1 | 1 | 0 | | | | 1 | |
| 1 | 1 | 1 | | | | | 1 |

In Table 12, the left column shows data ($d_2$, $d_1$, $d_0$) input to the selective control circuit, and the right column shows control signals output from the output terminals $S_0$ to $S_7$ to the corresponding analog switches $ASW_0$ to $ASW_7$. In Table 12, $t_1$ represents that if the signal $t_1$ is "0", then the control signal is "0" else the control signal is "1". $\bar{t}_1$ represents that if the signal $t_1$ is "0", then the control signal is "1", else the control signal is "0". $t_2$ and $t_2$ are defined similarly as $\bar{t}_1$ .

In FIG. 36, analog switches $ASW_0$ to $ASW_7$ are "on" when the corresponding control signals are "1".

Figure 38:
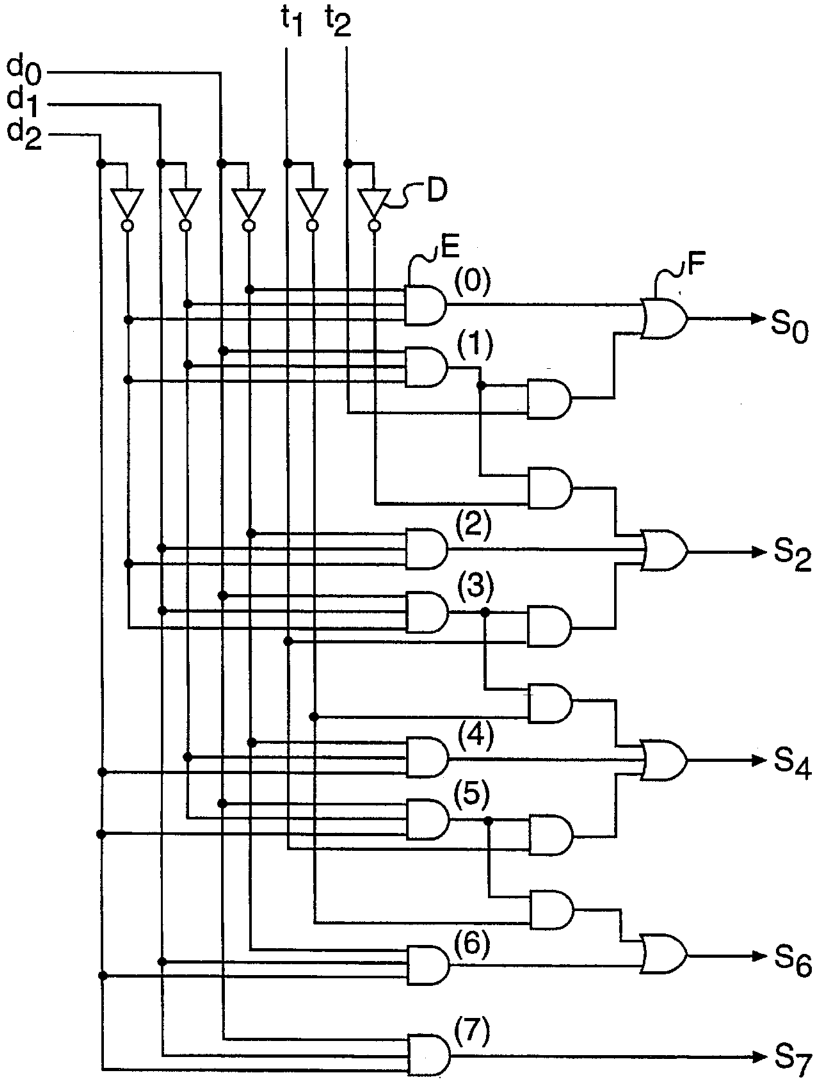
FIG. 38 shows a logic circuit for the selective control circuit in Example 10.

FIG. 38 shows a logic circuit for the selective control circuit SCOL. The logic circuit is provided from the following logic expressions which are derived from Table 12.

$S_0=(0)+(1)t_2$ $S_2=(1)t_2+(2)+(3)t_1$ $S_4=(3)t_1$ $S_6=(5)t_1+(6)$ $S_7=(7)$ $(0)=\bar{d}_1\bar{d}_1\bar{d}_0$ $(1)=\bar{d}_2\bar{d}d_1d_0$ $(2)=\bar{d}_2d_1d_0$ $(3)=\bar{d}_2d_1d_0$ $(4)=d_2d_1d_0$ $(5)=d_2d_1d_0$ $(6)=d_2d_1d_0$ $(7)=d_2d_1d_0$ In this example, the duty ratio of the signal $t_2$ is set to 1:2. However, any duty ratio except 1:1 is available for adjusting the voltages.

EXAMPLE 11

Figure 39:
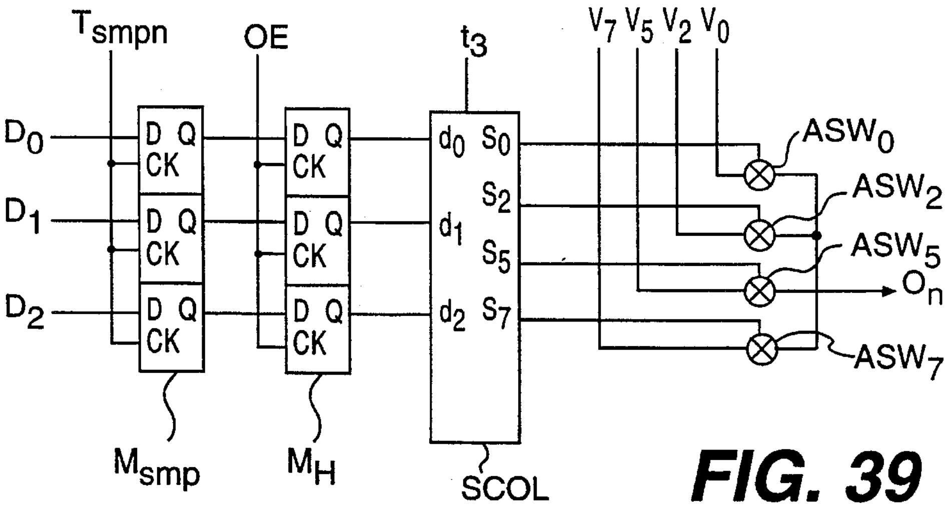
FIG. 39 shows a circuit for one output of the source driver in Example 11.

FIG. 39 shows a circuit for one output of the source driver 101 in the drive circuit. Digital video data input to the drive circuit consists of three bits.

As shown in FIG. 39, one signal $t_3$ is applied to the selective control circuit SCOL in the source driver. The duty ratio of the signal $t_3$ is set to 1:2.

Figure 40A:
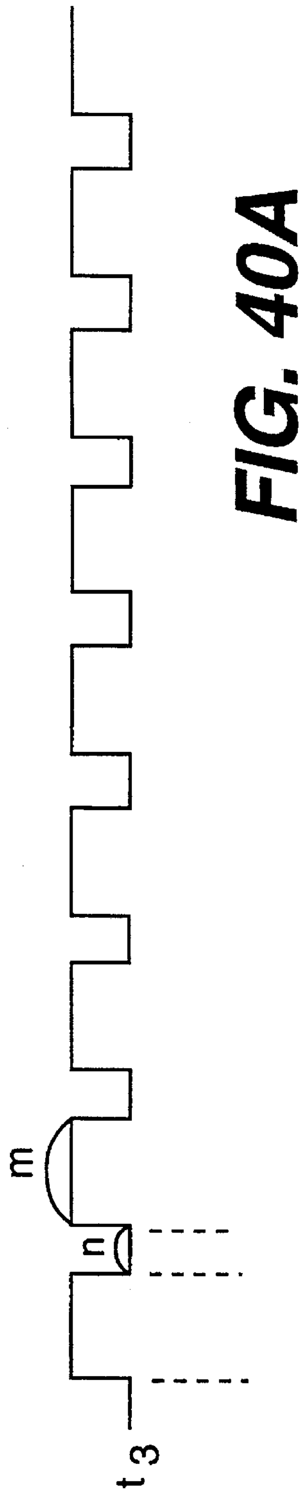
FIGS. 40A and 40B show a relationship between a clock signal applied to the source driver and an voltage output from the source driver in Example 11.
Figure 40B:
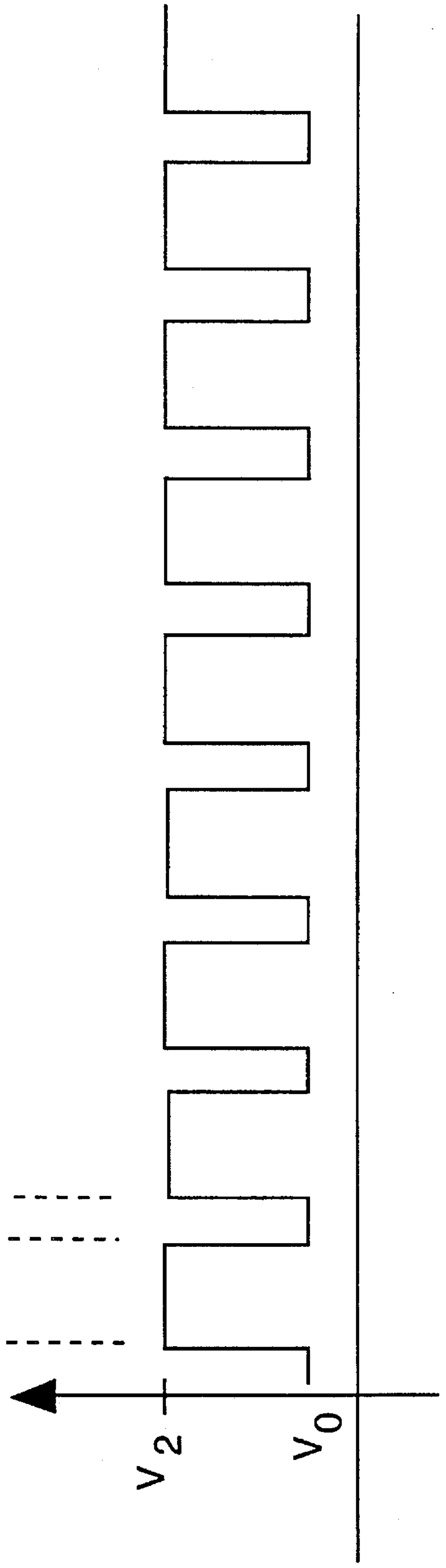

FIG. 40A shows a waveform of the signal $t_3$, and FIG. 40B shows a waveform of a voltage provided from the signal $t_3$.

Table 13 shows a logic table which defines an operation of the selective control circuit SCOL in the drive circuit.

TABLE 13

| $d_2$ | $d_1$ | $d_0$ | $S_0$ | $S_2$ | $S_5$ | $S_7$ |
|---|---|---|---|---|---|---|
| 0 | 0 | 0 | 1 | | | |
| 0 | 0 | 1 | $\bar{t}_3$ | $t_3$ | | |
| 0 | 1 | 0 | | 1 | | |
| 0 | 1 | 1 | | t | $\bar{t}_3$ | |
| 1 | 0 | 0 | | $\bar{t}_3$ | $t_3$ | |
| 1 | 0 | 1 | | | 1 | |
| 1 | 1 | 0 | | | $t_3$ | $\bar{t}_3$ |
| 1 | 1 | 1 | | | | 1 |

As shown in Table 13, when the digital video data is 0, the analog switch $ASW_0$ is "on" according to a control signal output from the output terminals $S_0$ of the selective control circuit, thereby the voltage $V_0$ which is supplied to the analog switch $ASW_0$ is output to the source line. In the same way, when the digital video data are 2, 5 and 7, the voltages $V_2$, $V_5$ and $V_7$ respectively are output.

When the digital data is 1, the analog switch $ASW_0$ is controlled to be "on" or "off" based on the signal $\bar{t}_3$ (i.e. the inverted signal $t_3$), and the analog switch $ASW_2$ is controlled to be "on" and "off" based on the signal $t_3$. As a result, the analog switches $ASW_0$ and $ASW_2$ are controlled so that when one of the analog switches $ASW_0$ and $ASW_2$ is "on", the other is "off", thereby an voltage oscillating between the voltages $V_0$ and $V_2$ is output to the source line. A mean value of the oscillating voltage is $(V_0+2\ V_2)/3$. In the same way, when the digital video data are 3, 4 end 6, mean values of the voltages output to the source line are $(2\ V_2+V_5)/3$, $(V_2+2\ V_5)/3$, and $(2\ V_5+V_7)/3$.

Figure 60:
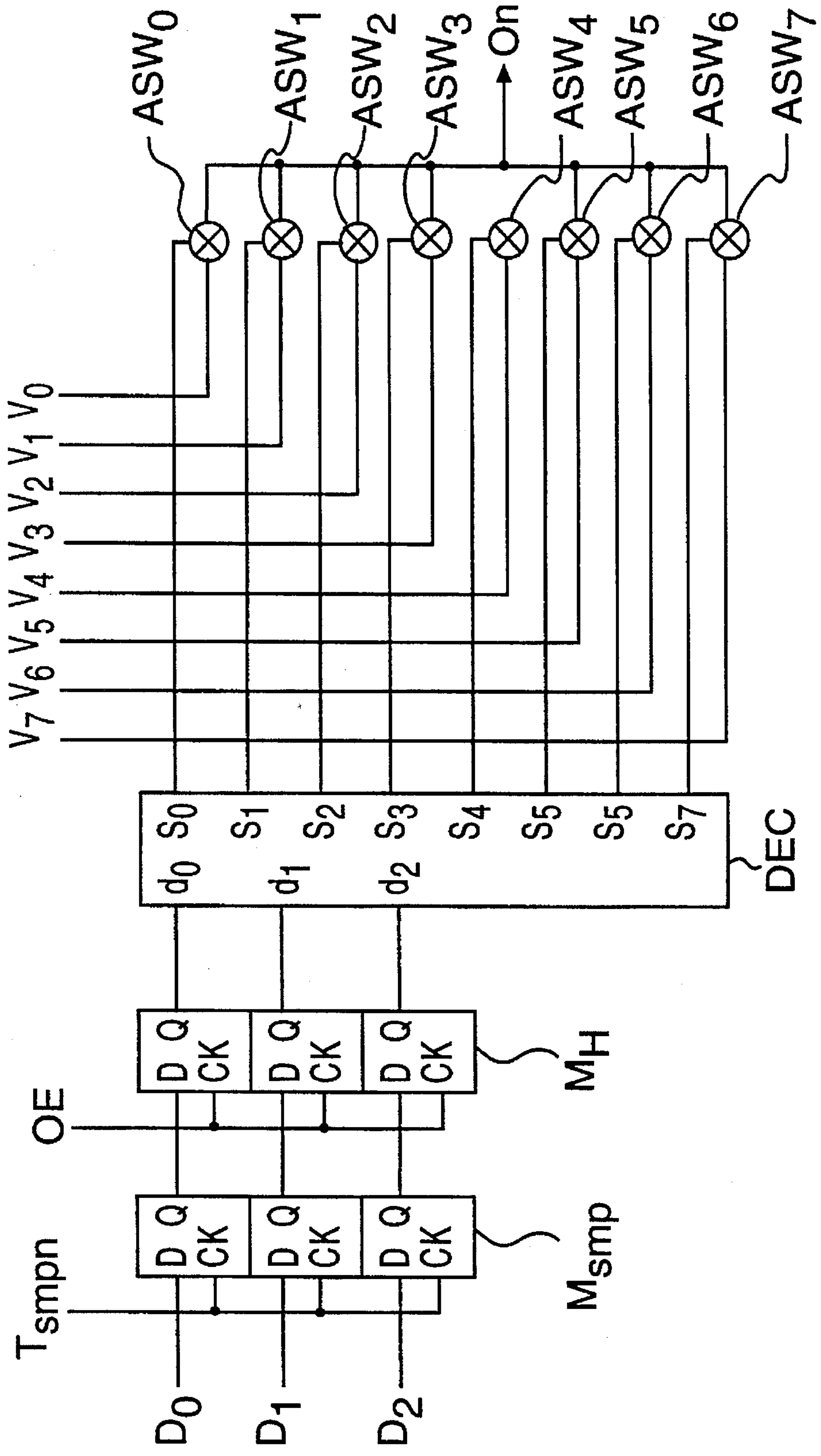
FIG. 60 shows a circuit for one output of a digital source driver in the prior art.

Table 14 shows the voltages output to the source line in the right column, compared with the voltages in the prior art shown in FIG. 60 in the center column.

TABLE 14

| $d_2$ | $d_1$ | $d_0$ | Voltages (FIG. 60) | Voltages (FIG. 39) |
|---|---|---|---|---|
| 0 | 0 | 0 | $V_0$ | $V_0$ |
| 0 | 0 | 1 | $V_1$ | $\frac{V_0+2V_2}{3}$ |
| 0 | 1 | 0 | $V_2$ | $V_2$ |
| 0 | 1 | 1 | $V_3$ | $\frac{2V_2+V_5}{3}$ |
| 1 | 0 | 0 | $V_4$ | $\frac{V_2+2V_5}{3}$ |
| 1 | 0 | 1 | $V_5$ | $V_5$ |
| 1 | 1 | 0 | $V_6$ | $\frac{2V_5+V_7}{3}$ |
| 1 | 1 | 1 | $V_7$ | $V_7$ |

Figure 41:
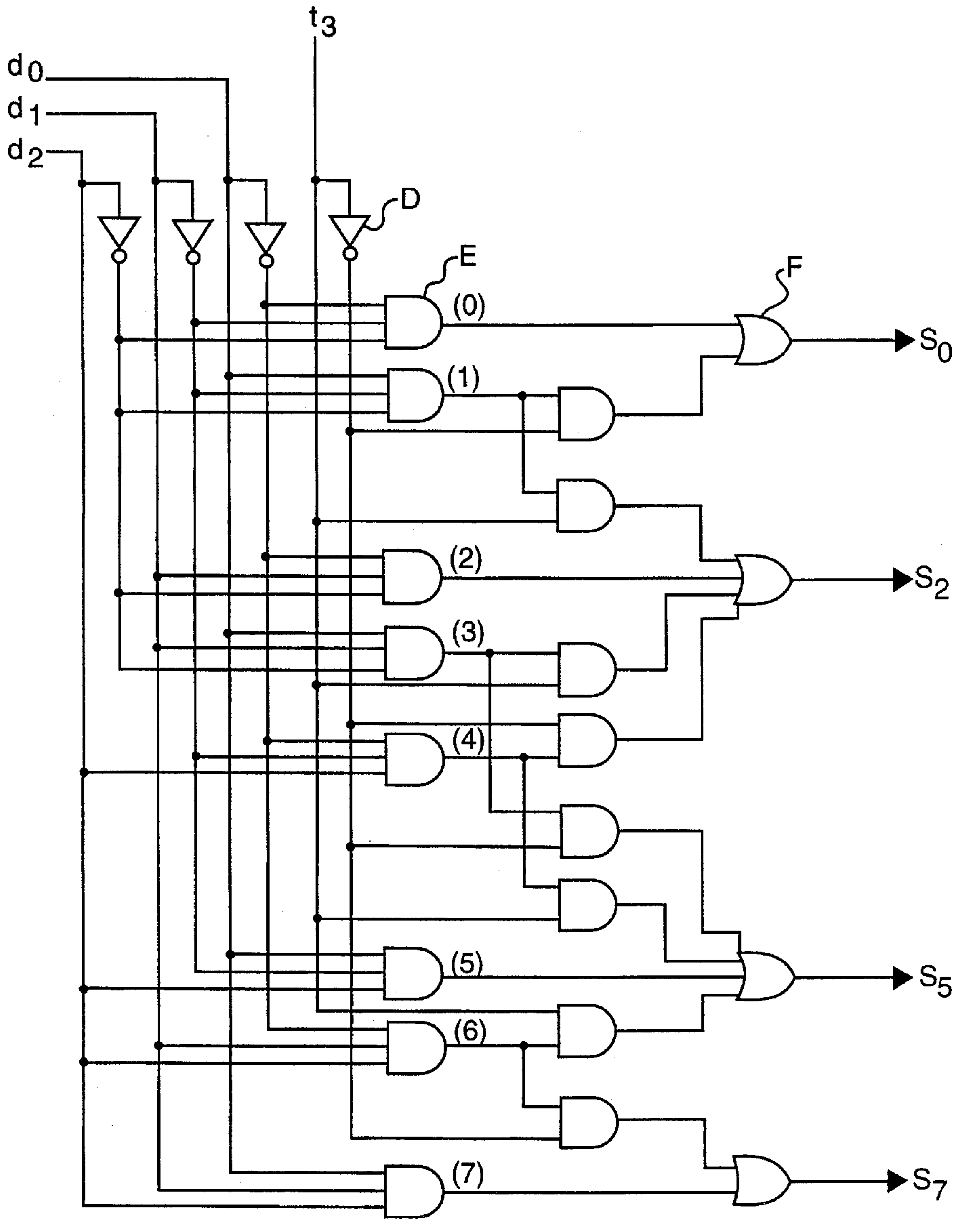
FIG. 41 shows a logic circuit for the selective control circuit in Example 11.

FIG. 41 shows a logic circuit for the selective control circuit. The logic circuit is provided from the following logic expressions which ere derived from Table 13.

$S_0=(0)+(1)\bar{t}_3$ $S_2=(1)t_3+(3t_3+(4)\bar{t}_3+(2)$ $S_5=(3)t_3+(4)t_3+(5)+(6)t_3$ $S_7=(6)\bar{t}_3+t_3+(7)$ $(0)=\bar{d}_2\bar{d}_1\bar{d}_0(1)\bar{d}_0$ $(2)=\bar{d}_2d_1\bar{d}_0(3)=\bar{d}_2d_1d_0$ $(4)=d_2\bar{d}_1\bar{d}_0(5)=d_2\bar{d}_1d_0$ $(6)=d_2d_1d_0(7)=d_2d_1d_0$ As a result, if the $V_0$, $V_2$, $V_5$ and $V_7$are adjusted as shown in FIG. 35, the voltages $(V_0+2V_2)/3$, $(2V_2+V_5)/3$, $(V_2+2V_{v5})/3$, and $(2V_5+V_7)/3$ satisfy the condition of the desired voltages $V_1$, $V_3$, $V_4$ and $V_6$, respectively.

It is understood that the drive circuit shown in FIG. 39 causes the same effect as the drive circuit in the prior art shown in FIG. 60.

Thus, the drive circuit mentioned above can provide appropriate voltages regarding the portion of the non-linear characteristic shown in FIG. 35. Furthermore, the number of external sources for supplying voltages can be reduced.

In this example, the duty ratio of the signal $t_3$ is set to 1:2. However, the duty ratio 2:1 is also available for adjusting the voltages.

EXAMPLE 12

Figure 42:
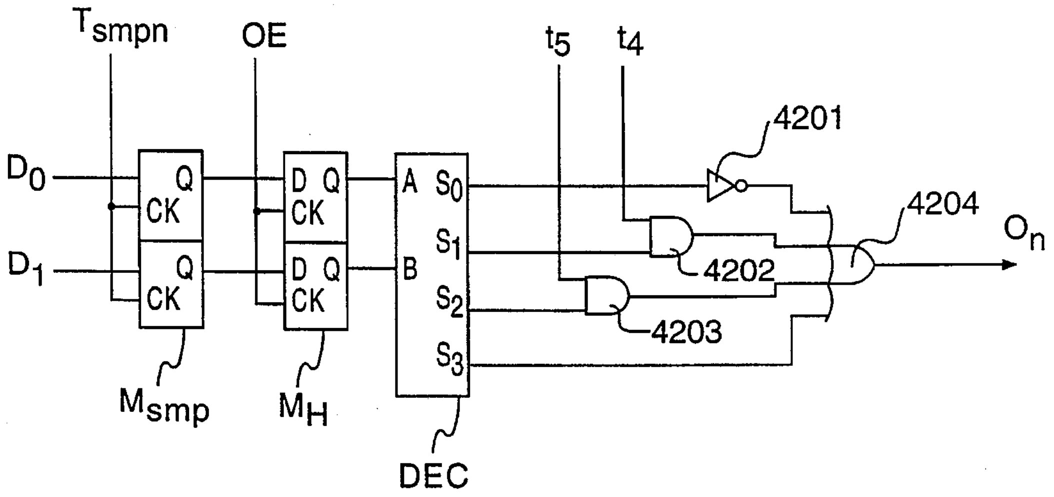
FIG. 42 shows a circuit for one output of the source driver in Example 12.

FIG. 42 shows a circuit for one output of the source driver 101 in the drive circuit. Digital video data input o the drive circuit consists of two bis.

Figure 43A:
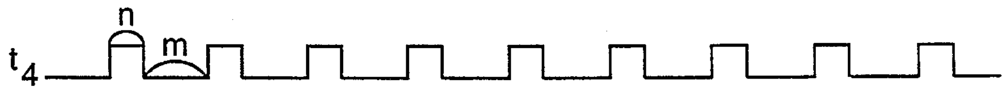
FIGS. 43A, 43B and 44 show waveforms of clock signals applied to the source driver in Example 12.
Figure 43B:

As shown in FIG. 42, two distinct signals $t_4$ and $t_5$ are applied to the selective control circuit in the source diver. FIGS. 43a and 43B show waveforms of the signals $t_4$ and $t_5$.

Figure 44:
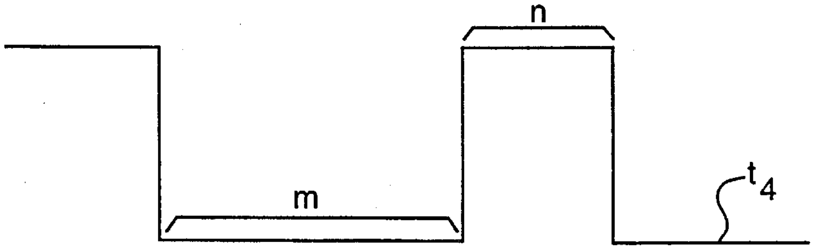

FIG. 44 shows a magnification of the signal $t_4$. The duty ratios of he signals $t_4$ and $5_5$ are set to 1:2 and 2:1 respectively.

Figures 45A, 45B, 45C, 45D:
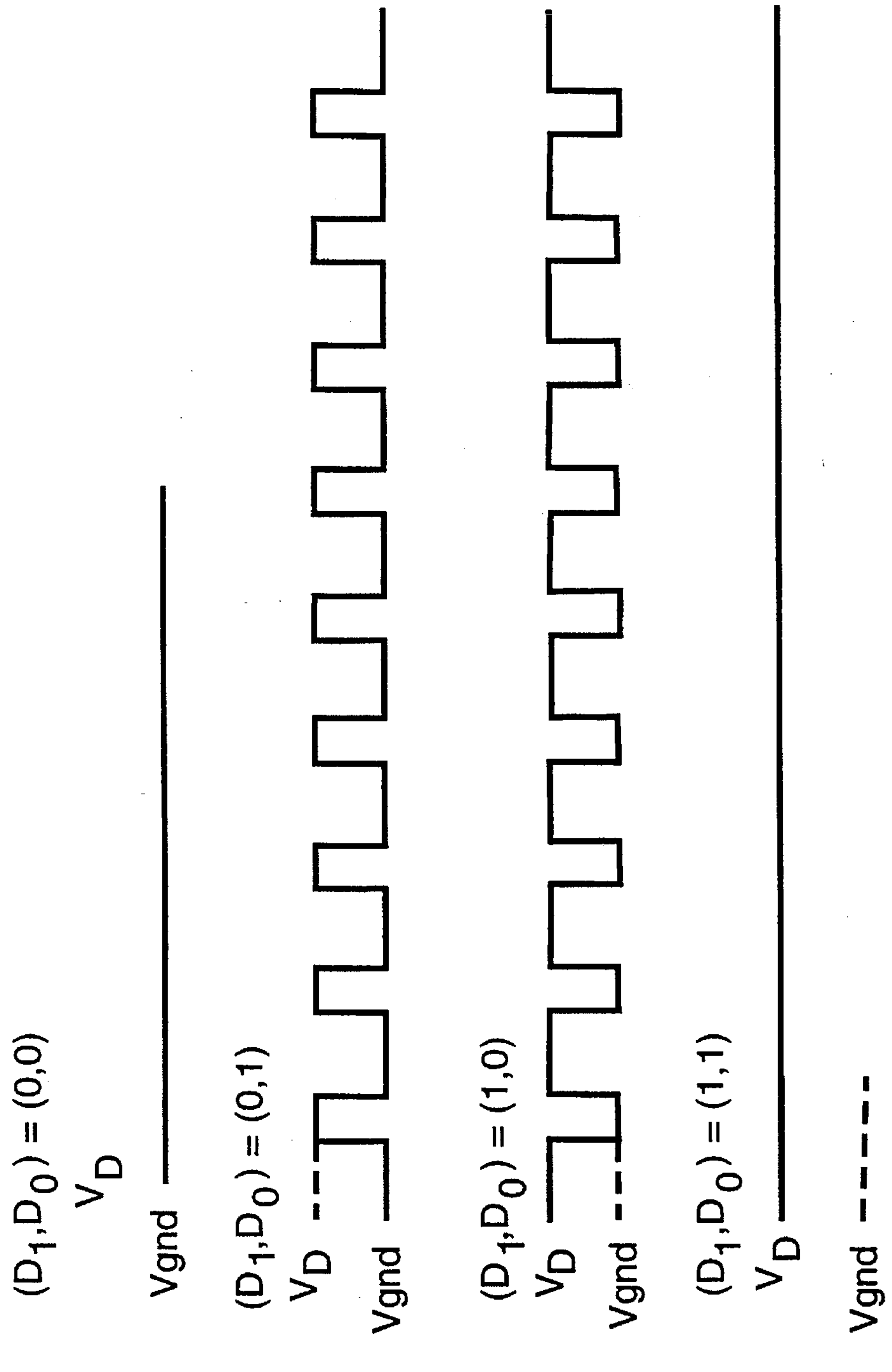
FIGS. 45A, 45B, 45C and 45D show a relationship between data input to the source driver and voltages output from the source driver in Example 12.

When the digital video data $(D_1, D_0)\{(0, 0)\}$ is input to the source driver, the output $S_0$ of the decoder DEC becomes "1", and the other outputs $S_1$, $S_2$ and $S_3$ become "0". Since all the inputs of the 0R circuit 4204 become "0", the output of the OR circuit becomes a constant voltage $V_{gnd}$ as shown in FIG. 45A.

When the digital video data $(D_1, D_0)\{(0, 1)\}$ is input, the output $S_1$ of the decoder DEC becomes "1", and the other outputs $S_0$, $S_2$ and $S_3$ become "0". As a result, one of inputs of the OR circuit 4204 becomes "1" in the same cycle as the signal $t_4$. The output of the OR circuit 4204 becomes an voltage oscillating between the voltages $v_D$ and $V_{gnd}$ at the same duty ratio as that of the signal $t_4$ (n:m=1:2) as shown in FIG. 45B.

When the digital video data $(D_1, D_0)\{(1, 0)\}$ is input, the output $S_2$ of the decoder DEC becomes "1", and the other outputs $S_0$, $S_1$ and $S_3$ become "0". As a result, one of the inputs of the OR circuit 4204 becomes "1" in the same cycle as the signal $t_5$. The output of the OR circuit 4204 becomes a voltage oscillating between the voltages $V_D$ and $V_{gnd}$ a the same duty ratio as that of the signal $t_5$ (n:m=2:1) as shown in FIG. 45C.

When the digital video, data $(D_1, D_0)\{(1, 1)\}$ is input, the output $S_3$ of the decoder DEC becomes "1", and the other outputs $S_0$, $S_1$ and $S_2$ become "0". As a result, the output of the OR circuit 4204 becomes a constant voltage $v_D$ as shown in FIG. 45D.

When the ground video data $(D_1, D_0)$ is (0, 1) or (1, 0), a mean value of the output of the OR circuit 4204, that is, a mean value of the voltage applied to the source line is expressed by:

$$\frac{n \cdot V_D + m \cdot V_{gnd}}{n + m}$$

When the ground level $V_{gnd}$ is 0 V in the above expression, a mean value of the voltage applied to the source line is expressed by:

$$\frac{n}{n+m} V_D$$

Accordingly, if the digital video data $(D_1, D_0)$ (0, 0), then a mean value of the voltage output o the source line is 0. If $(D_1, D_0)$ (0, 1) then it is (⅓)$V_D$. If $(D_1, D_0)$ (1, 0), then it is (⅔) $V_D$. If $(D_1, U_0)$ (1, 1), then It is $V_D$.

Thus, two complement voltages can be obtained from two given voltages $V_D$ and $V_{gnd}$. The two complement voltages can be adjusted appropriately by changing the duty ratios of the signals $t_4$ and $t_5$.

Therefore, the drive circuit mentioned above can provide appropriate voltages regarding the portion of the non-linear characteristic shown in FIG. 35.

In this example, the duty ratio of the signals $t_4$ and $t_5$ are set to 1:2 and 2:1 respectively. However, any duty ratio is also available for adjusting the voltages.

EXAMPLE 13

Figure 46:
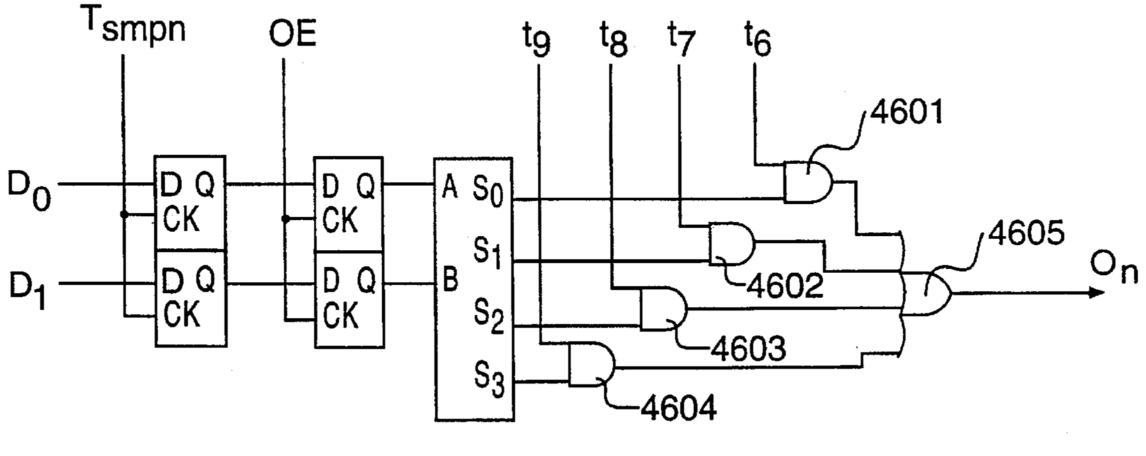
FIG. 46 shows a circuit for one output of the source driver in Example 13.
Figure 48:
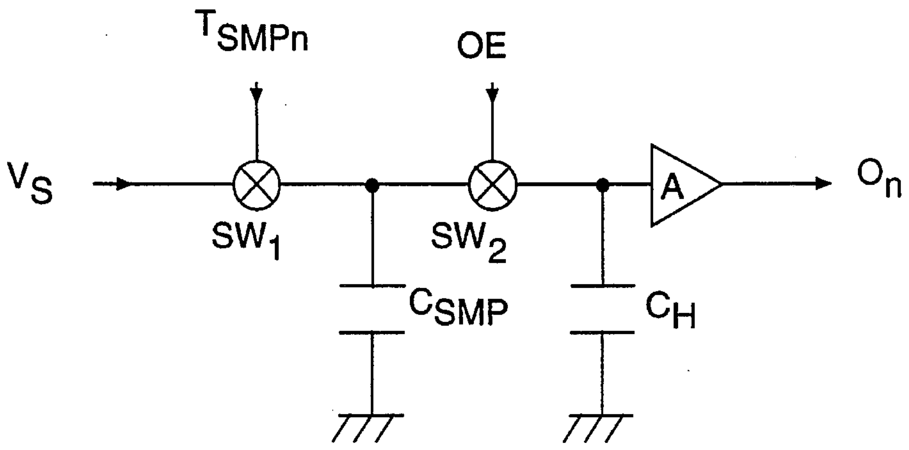
FIG. 48 PRIOR ART
FIG. 48 shows a circuit for one output of an analog source driver in the prior art.
Figure 47:
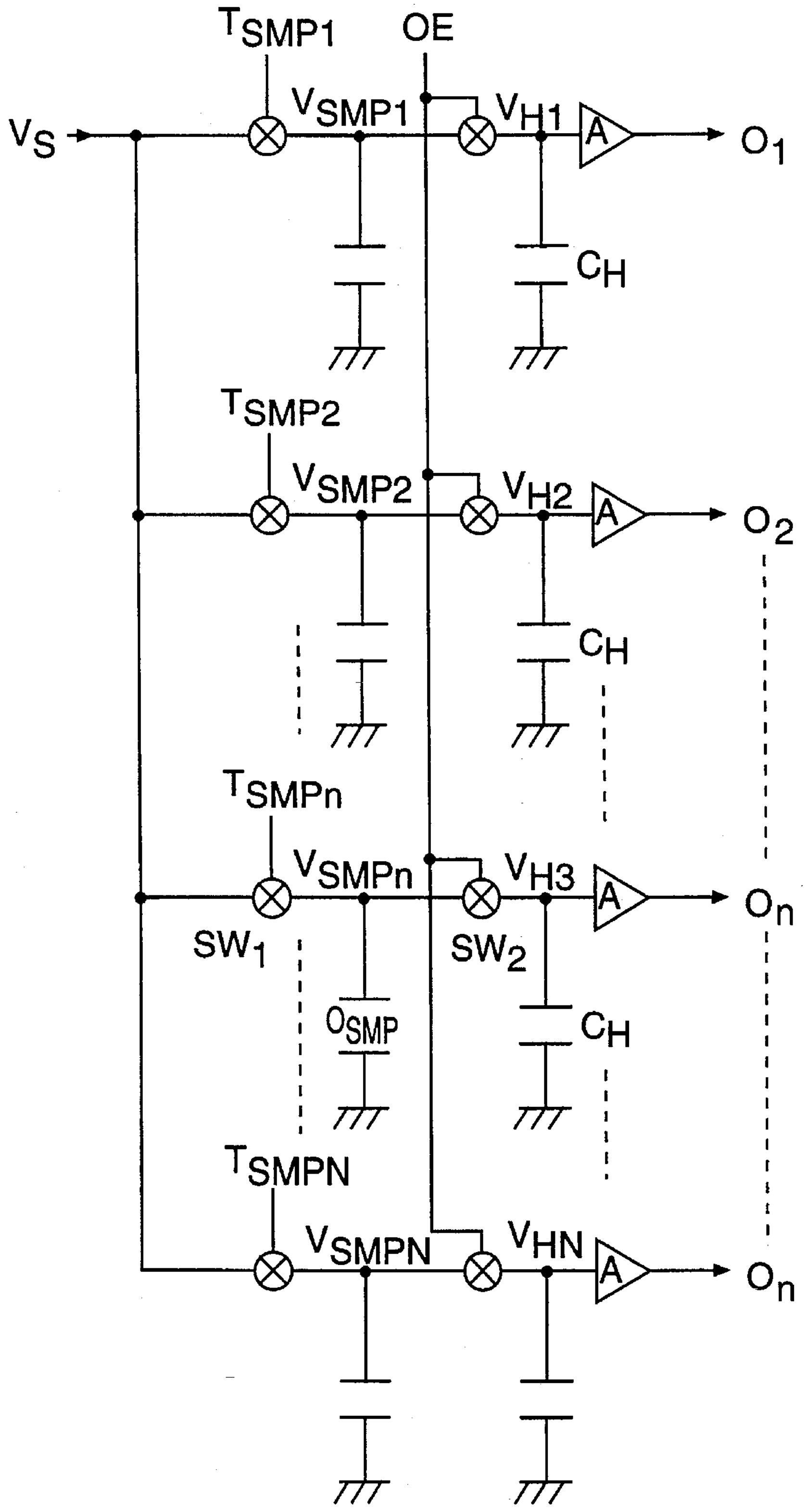
FIG. 47 PRIOR ART
FIG. 47 shows a circuit for an analog source driver in the prior art.
Figure 49:
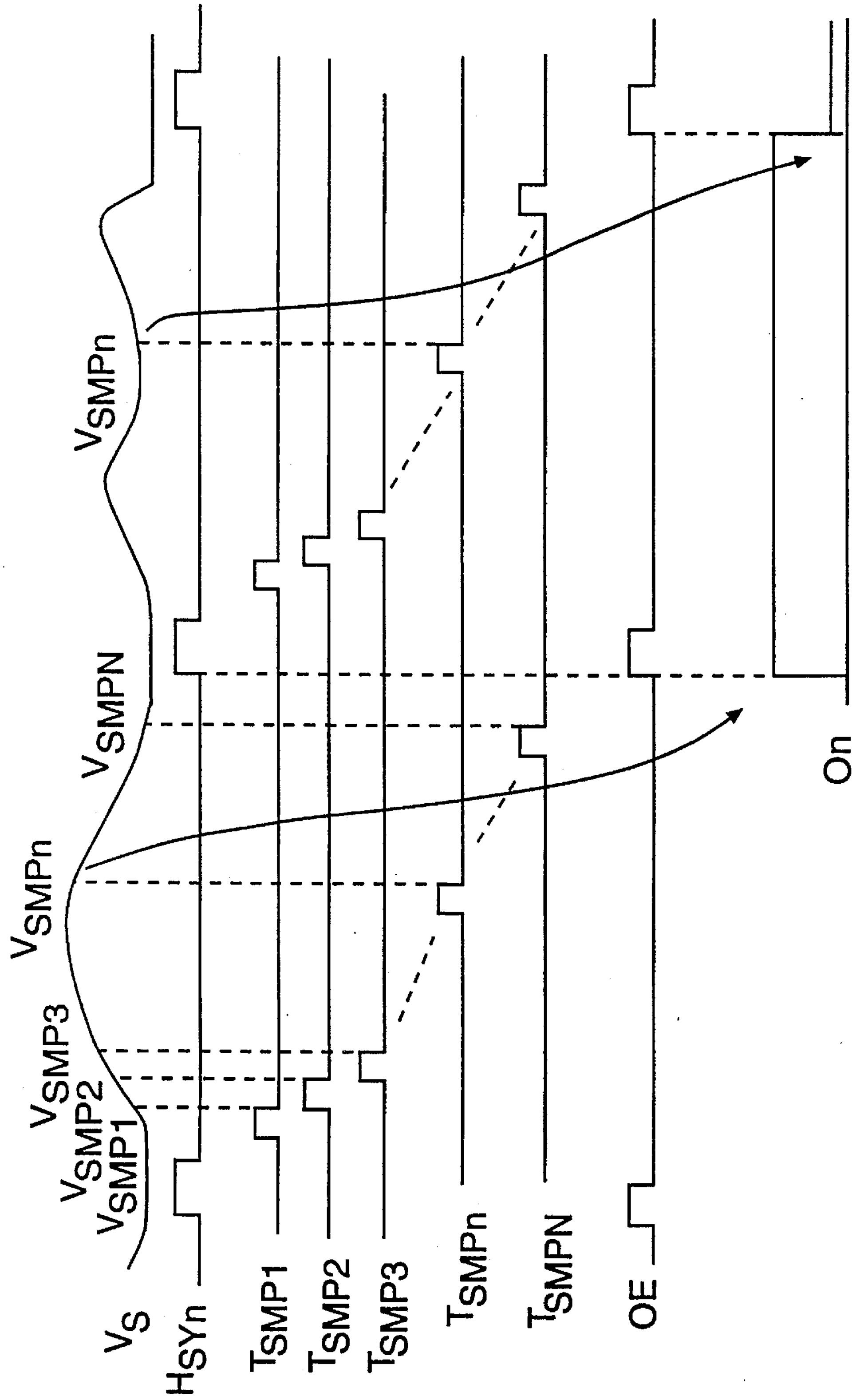
FIG. 49 PRIOR ART
FIG. 49 is a timing chart of an analog source driver in the prior art.
Figure 50:
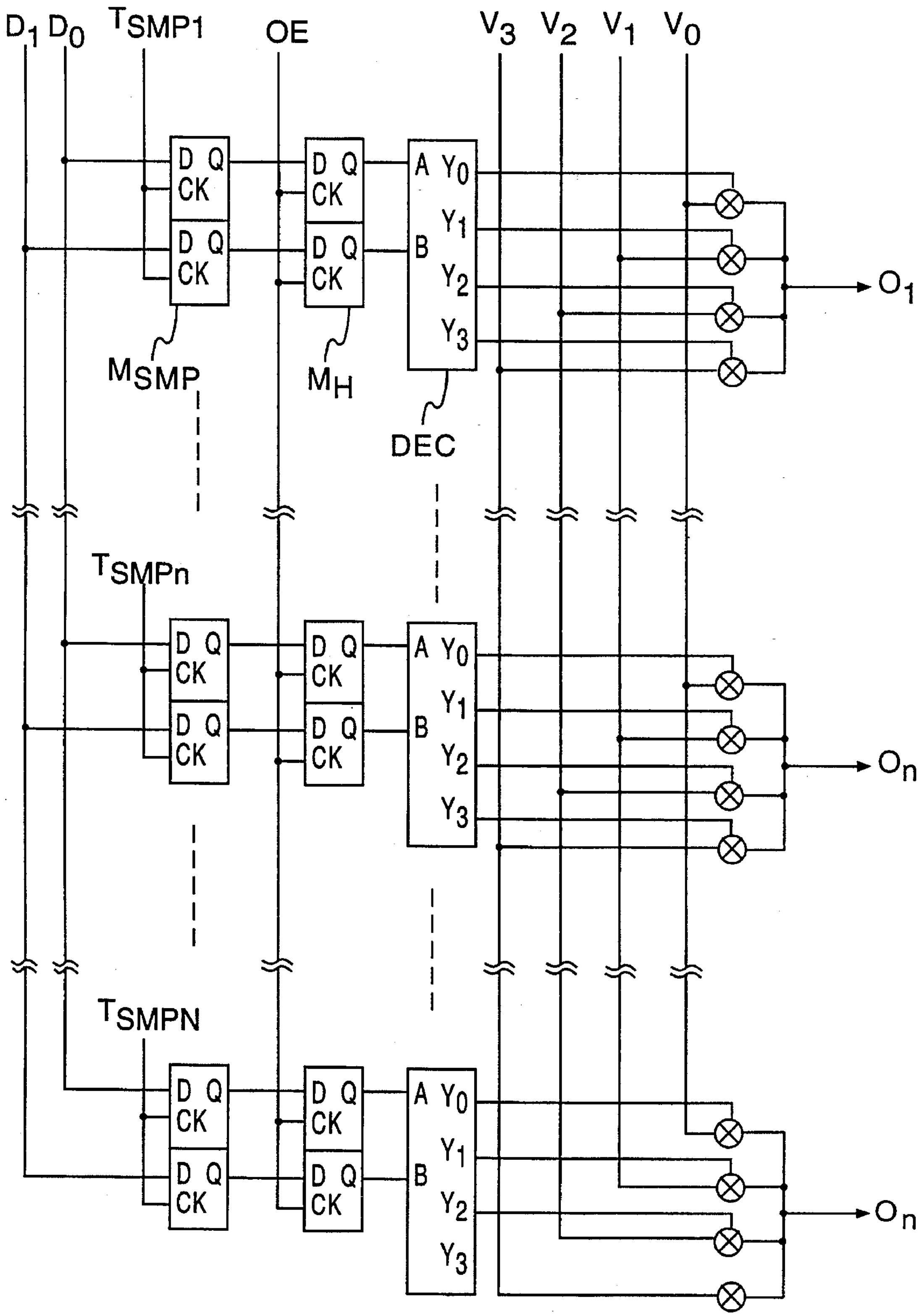
FIG. 50 PRIOR ART
FIG. 50 shows a circuit for a digital source driver in the prior art.

FIG. 46 shows a circuit for one output of the source driver 101 in the drive circuit. Digital video data input to the drive circuit consists of two bits.

The outputs $S_0$ to $S_3$ of the decoder DEC are input to one input of the AND circuits 4601 to 4604 respectively. The signals $t_6$ to $t_9$ are input to the other inputs thereof, respectively. The outputs of the AND circuits 4601 to 4604 are input to the OR circuit 4605. The output of the OR circuit 4605 is applied to the source line $\mathbf{0}_n$.

In this Example, any voltages between the voltages $V_D$ end $V_{gnd}$ can be obtained from the given voltages $V_D$ and $V_{gnd}$ by changing the duty ratios of the signals $t_6$ to $t_9$ appropriately, and can be applied to the source line. When mean values of the voltages generated based on the signals $t_6$ to $t_9$ are represented by $V_0$ to $V_3$ respectively, the relationship between he the pixels are shown in Table 15.

TABLE 15

| $D_1$ | $D_0$ | Voltages |
|---|---|---|
| 0 | 0 | $V_0$ |
| 0 | 1 | $V_1$ |
| 1 | 0 | $V_2$ |
| 1 | 1 | $V_3$ |

Four voltages can be obtained from two given voltages $V_D$ and $V_{gnd}$. The four voltages can be adjusted appropriately by changing the duty ratios of the signals $t_5$ to $t_9$.

Therefore, the drive circuit mentioned above can provide appropriate voltages regarding the portion of the non-linear characteristic shown in FIG. 35.

According to this invention, at least one complement voltage can be obtained from the given voltages, thereby the number of external sources for supplying voltages can be reduced drastically and the number of input terminals of the drive circuit can be decreased.

Accordingly it possible (1) to reduce the cost of the display apparatus and the device circuit for the display apparatus, (2) to produce easily the drive circuit suitable for the display apparatus which has multiple gradation levels, which cannot be produced in the prior art devices because of problems on an implementation of a LSI, and (3) to reduce the power consumption of the display apparatus.

When the drive circuits described in Example 1, Example 12 and Example 13 are used, additional advantages are obtained as follows:

(1) Any voltage can be applied to the pixel by changing the duty ratios of signals appropriately.

(2) A size of the drive circuit can become smaller than that of the prior art as no analog switch is used in the drive circuit.

When the drive circuits described in Example 1,2,4 and 10 to 13 are used, the drive circuit can provide voltages adjusted to the non-linear displaying characteristic.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of driving a display apparatus having a display section including a pixel and a switching element connected to said pixel, and a source line connected to said switching element, said method comprising the steps of:

receiving output requests in a drive circuit at predetermined intervals; and outputting an oscillating voltage from said drive circuit to said source line, said oscillating voltage including a component which repeatedly oscillates during one output period occurring from receiving one of said output requests to receiving a next one of said output requests and during said one output period said source line is connected to said pixel by said switching element for charging said pixel based on said oscillating voltage.

2. A method of driving a display apparatus according to claim 1, wherein said oscillating voltage oscillates between a first voltage and a second voltage during said one output period of time.

3. A drive circuit for display apparatus having a display section including a pixel and a switching element connected to said pixel, and a source line connected to said switching element, said drive circuit comprising:

receiving means for receiving output requests at predetermined intervals; and outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage.

4. A drive circuit for a display apparatus according to claim 3, wherein said oscillating voltage oscillates between a first voltage and a second voltage during said one output period of time.

5. A drive circuit for a display apparatus according to claim 3, wherein said outputting means comprises a logic circuit which receives a digital video input and plurality of oscillating signals for selecting one of said oscillating signals as a function of said digital video data input; and a voltage outputting circuit for outputting an oscillating voltage to said source line according to said oscillating signal, said oscillating voltage including at least a component which oscillates during said one output period.

6. A drive circuit for a display apparatus according to claim 5 further comprising a voltage outputting circuit for outputting a constant voltage as a function of a digital video data input.

7. A drive circuit or a display apparatus according to claim 3, wherein said outputting means comprises a plurality of switching elements, distinct voltages being supplied to said plurality of switching elements respectively, and said supplied voltages being outputted to said source line when said corresponding switching elements are in an ON state; and a selective control circuit for controlling to change the ON state and OFF state of at least one pair of said plurality of switching elements during said one output period of time.

8. A drive circuit for a display apparatus according to claim 7, wherein said selective control circuit controls to change ON state and OFF state of at least one pair of said plurality of switching elements at least once during said one output period of time, so that one of said pairs of said plurality of switching elements is in an ON state when the other of said pairs of said plurality of switching elements is in an OFF state.

9. A drive circuit for a display apparatus according to claim 8, wherein said selective control circuit controls to change the ON state and OFF state of at least one pair of said plurality of switching elements based on a clock signal having a duty ratio of 1:1.

10. A drive circuit for a display apparatus according to claim 7, wherein said selective control circuit controls to change the ON state and OFF state of at least one pair of said plurality of switching elements, so that one of said pairs of said plurality of switching elements is in n ON state and the other of said pairs of said plurality of switching elements is controlled to change to an ON state and OFF state at least once during said one output period of time.

11. A drive circuit for a display apparatus according to claim 10, wherein said selective control circuit controls to change the ON state and OFF state of at least one pair of said plurality of switching elements based on a clock signal having a duty ratio set to 1:1.

12. A drive circuit for a display apparatus according to claim 7, wherein said selective control circuit controls to change the ON state and OFF state of at least one pair of said plurality of switching elements, so that one of said pairs of said plurality of switching elements is in the ON state and the other of said pairs of said plurality of switching elements is in the 0N state during said one output period of time.

13. A drive circuit for a display apparatus having a display section including a pixel and a switching element connected to said pixel, and a source line connected to said switching element, said drive circuit comprising:

receiving means for receiving output requests at predetermined intervals;

outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

wherein said outputting means comprises;

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in an ON state when the other of said pairs of said plurality of switching elements is in an OFF state; wherein said selective control circuit controls to change the ON state and OFF state of at least one pair of said plurality of switching elements based on a plurality of clock signals having duty ratios set to 3:1 and 1:1.

14. A drive circuit for a display apparatus having a display section including a pixel and a switching element connected to said pixel, and a source line connected to said switching element, said drive circuit comprising:

receiving means for receiving output requests at predetermined intervals;

outputting means for outputting an oscillating voltage to source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

wherein said outputting means comprises:

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in an ON state when the other of said pairs of said plurality of switching elements is in an OFF state; wherein said selective control circuit controls to change the ON state and OFF state of at least one pair of said plurality of switching elements based on a plurality of clock signals having duty ratios set to 7:1, 6:2, 5:3 and 4:4.

15. A drive circuit for a display apparatus having a display section including a pixel and a switching element connected to said pixel, and a source line connected to said switching element, said drive circuit comprising:

receiving means for receiving output requests at predetermined intervals;

outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

wherein said outputting means comprises:

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in an ON state when the other of said pairs of said plurality of switching elements is in an OFF state; wherein said selective control circuit controls to change the ON state and OFF state of at least one pair of said plurality of switching elements based on a plurality of clock signals having duty ratios set to 31:1, 30:2, 29:3, 28:4, 27:5, 26:6, 25:7, 24:8, 23:9, 22:10, 21:11, 20:12, 19:13, 18:14, 17:15 and 16:16.

16. A display apparatus having a display section including a pixel and a switching element connected to said pixel, and a source line connected to said switching element, said display apparatus comprising:

receiving means for receiving output requests at predetermined intervals;

outputting means for outputting an oscillating voltage to said source line, said oscillating voltage including component which repeatedly oscillates during one output period occurring from receiving one of said output requests to receiving a next one of said output requests through said receiving means, and during said one output period said source line is connected to said pixel by said switching element for charging the pixel based on said oscillating voltage; and reducing means for reducing an amplitude of said component of said oscillating voltage, said oscillating voltage of which said amplitude of said component is reduced by said reducing means being applied to said pixel.

17. A display apparatus according to claim 16, wherein said oscillating voltage oscillates between a first voltage and a second voltage during said one output period of time.

18. A display apparatus according to claim 16, wherein said outputting means comprises a logic circuit which receives a digital video input and plurality of oscillating signals for selecting one of said oscillating signals as a function of said digital video data input; and a voltage outputting circuit for outputting an oscillating voltage to said source line according to said oscillating signal, said oscillating voltage including at least a component which oscillates during said one output period.

19. A display apparatus according to claim 18 further comprising a voltage outputting circuit for outputting a constant voltage as a function of a digital video data input.

20. A display apparatus according to claim 16, wherein said outputting means comprises a plurality of switching elements, distinct voltages being supplied to said plurality of switching elements respectively, and said supplied voltages being outputted to said source line when Said corresponding switching elements are in an ON state; and a selective control circuit for controlling to change the ON state and OFF state of at least one pair of said plurality of switching elements during said one output period of time.

21. A display apparatus according to claim 20, wherein said selective control circuit controls to change the ON state and OFF state of at least one pair of said plurality of switching elements at least once during said one output period of time, so that one of said pairs of said plurality of switching elements is in the ON state when the other of said pairs of said plurality of switching elements is in the OFF state.

22. A display apparatus according to claim 21, wherein said selective control circuit to change ON state and OFF state of at least one pair of said plurality of switching elements based on a clock signal of which a duty ratio is set to 1:1.

23. A display apparatus according to claim 20, wherein said selective control circuit controls to change the ON state and OFF state of at least one pair of said plurality of switching elements, so that one of said pairs of said plurality of switching elements is in ON state and the other of said pairs of said plurality of switching elements is controlled to change the ON state and OFF state at least once during said one output period of time.

24. A display apparatus according to claim 23, wherein said selective control circuit controls to change the ON and OFF state of at least one pair of said plurality of switching elements based on a clock signal of which a duty ratio is set to 1:1.

25. A display apparatus according to claim 20, wherein said selective control circuit controls to change the ON state and OFF state of at least one pair of said plurality of switching elements, so that one of said pairs of said plurality of switching elements is in the OFF state and the other of said pairs of said plurality of switching elements is in the ON sate during said one output period of time.

26. A display apparatus according of claim 16, wherein a part of said reducing means is formed by said source line.

27. A display apparatus according to claim 16, wherein part of said reducing means is formed by said pixel.

28. A display apparatus according to claim 16, wherein a part of said reducing means is formed by said switching element.

29. A display apparatus having a display section including a pixel and a switching element connected to said pixel, and a source line connected to said switching element, said display apparatus comprising:

receiving means for receiving output requests at predetermined intervals;

outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

reducing means for reducing an amplitude of said component of said oscillating voltage, said oscillating voltage of which said amplitude of said component is reduced by said reducing means being applied to said pixel;

wherein said outputting means comprises:

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in the ON state when the other of said pairs of said plurality of switching elements is in the OFF state;

wherein said selective control circuit controls to change ON state and OFF state of at least one pair of said plurality of switching elements based on clock signals of which duty ratios are set to 3:1 and 1:1.

30. A display apparatus having a display section including a pixel and a switching element connected to said pixel, and a source line connected to said switching element, said display apparatus comprising:

receiving means for receiving output requests at predetermined intervals;

outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

reducing means for reducing an amplitude of said component of said oscillating voltage, said oscillating voltage of which said amplitude of said component is reduced by said reducing means being applied to said pixel;

wherein said outputting means comprises:

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in the ON state when the other of said pairs of said plurality of switching elements is in the OFF state;

wherein said selective control circuit controls to change the ON state and the OFF state of at least one pair of said plurality of switching elements based on clock signals of which duty ratios are set to 7:1, 6:2, 5:3 and 4:4.

31. A display apparatus having a display section including a pixel and a switching element connected to said pixel, and a source line connected to said switching element, said display apparatus comprising:

receiving means for receiving output requests at predetermined intervals;

outputting means for outputting an oscillating voltage to said source line, said oscillating voltage including a component which repeatedly oscillates during one output period occurring from receiving one of said output requests to receiving a next one of said output requests through said receiving means, and during said one output period said source line is connected to said pixel by said switching element for charging said pixel based on said oscillating voltage;

reducing means for reducing an amplitude of said component of said oscillating voltage, said oscillating voltage of which said amplitude of said component is reduced by said reducing means being applied to said pixel;

wherein said outputting means comprises:

a plurality of switching elements, distinct voltages being supplied to said plurality of switching elements respectively, and said supplied voltages being outputted to said source line when said corresponding switching elements are in an ON state;

a selective control circuit for controlling to change the ON state and OFF state of at least one pair of said plurality of switching elements during said one output period of time;

wherein said selective control circuit controls to change the ON state and OFF state of at least one pair of said plurality of switching elements at least once during said one output period of time, so that one of said pairs of said plurality of switching elements is in the ON state when the other of said pairs of said plurality of switching elements is in the OFF state;

wherein said selective control circuit controls to change the ON state and OFF state of at least one pair of said plurality of switching elements based on clock signals of which duty ratios are set to 31:1, 30:2, 29:3, 28:4, 27:5, 26:6, 25:7, 24:8, 23:9, 22:10, 21:11, 20:12, 19:13, 18:14, 17:15 and 16:16.

32. An active matrix display, comprising:

a plurality of pixels arranged in a matrix, each of said pixels being connected to a switching element, each of said switching elements being connected to a source line;

a source of a plurality of source voltages, each of said plurality of source voltages being of a different amplitude;

drive means for applying an oscillating drive voltage signal having two alternating drive voltages of selected amplitudes to at least one of said pixels for one output period occurring from receiving one of a series of output requests to receiving a next of the series of output requests and during said one output period said source line is connected to said pixel by said switching element for charging said pixel based on said oscillating voltage and corresponds to a period of time when the switching element is in an ON state, said drive voltage signal repeatedly oscillates during the output period, said drive means including means for receiving digital input signals, and means for coupling a drive voltage signal composed of one or more said source voltages to a source line based on the digital value of each of said input signals.

33. An active matrix display according to claim 32, including a low-pass filter.

34. An active matrix display according to claim 33, wherein said low-pass filter includes the resistance and capacitance components of said drive means, said source line and said pixel.

* * * * *